United States Patent
Nix

(10) Patent No.: US 12,069,123 B2
(45) Date of Patent: *Aug. 20, 2024

(54) STORAGE MEMORY UNIT WITH A SHARED NONVOLATILE MEMORY INTERFACE FOR A RADIO

(71) Applicant: IoT and M2M Technologies, LLC, Evanston, IL (US)

(72) Inventor: John A. Nix, Evanston, IL (US)

(73) Assignee: IOT AND M2M TECHNOLOGIES, LLC, Evanston, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/871,701

(22) Filed: Jul. 22, 2022

(65) Prior Publication Data

US 2022/0360622 A1    Nov. 10, 2022

Related U.S. Application Data

(63) Continuation of application No. 17/276,818, filed as application No. PCT/US2019/051481 on Sep. 17, 2019, now Pat. No. 11,399,055.

(Continued)

(51) Int. Cl.
*H04L 67/06* (2022.01)
*H04L 9/32* (2006.01)
(Continued)

(52) U.S. Cl.
CPC ............ *H04L 67/06* (2013.01); *H04L 9/3247* (2013.01); *H04L 9/3263* (2013.01);
(Continued)

(58) Field of Classification Search
CPC . H04L 2209/80; H04L 63/0428; H04L 63/06; H04L 63/166; H04L 67/06;
(Continued)

(56) References Cited

U.S. PATENT DOCUMENTS 9,214,986 B2    12/2015    Charles
9,319,223 B2 *    4/2016    Nix .......................... H04L 9/006
(Continued)

OTHER PUBLICATIONS

GSMA Association, Remote Provisioning Architecture for Embedded UICC Technical Specification, Version 3.2, Jun. 27, 2017.
(Continued)

*Primary Examiner* — Alina A Boutah
(74) *Attorney, Agent, or Firm* — GrowIP Law Group LLC

(57) ABSTRACT

A storage radio unit (SRU) for a device can include a radio, embedded universal integrated circuit card (eUICC), a processor, an antenna, and nonvolatile memory. The SRU can support standards for removable storage form factors and record a file system for a device. The device can be associated with a service provider and the SRU can be associated with a network provider. The radio can support Narrowband Internet of Things (NB-IoT) standards. The SRU can operate a file system interface (FSI) for the radio, where the device records application data in a file of the FSI. The SRU can attach to a wireless NB-IoT network using credentials recorded in the eUICC. The SRU can read the file of the FSI, and compress, encrypt, and transmit the application data to a network provider via the radio. The network provider can transmit the application data via TLS to the service provider.

11 Claims, 16 Drawing Sheets

Related U.S. Application Data

(60) Provisional application No. 62/732,930, filed on Sep. 18, 2018.

(51) Int. Cl.
*H04L 67/1097* (2022.01)
*H04W 4/70* (2018.01)
*H04W 12/04* (2021.01)

(52) U.S. Cl.
CPC ........... *H04L 67/1097* (2013.01); *H04W 4/70* (2018.02); *H04W 12/04* (2013.01); *H04L 2209/80* (2013.01)

(58) Field of Classification Search
CPC ... H04L 67/1097; H04L 9/006; H04L 9/0841; H04L 9/3247; H04L 9/3263; H04W 12/04; H04W 4/70
See application file for complete search history.

(56) References Cited

U.S. PATENT DOCUMENTS

| | | | |
|---|---|---|---|
| 9,350,550 B2 | 5/2016 | Nix | |
| 10,149,335 B2 | 12/2018 | Gujral et al. | |
| 10,169,587 B1* | 1/2019 | Nix | H04W 12/041 |
| 10,546,222 B1 | 1/2020 | Milner et al. | |
| 11,080,414 B2 | 8/2021 | Nix | |
| 2005/0234825 A1 | 10/2005 | Andersson | |
| 2015/0095648 A1* | 4/2015 | Nix | H04L 9/0894 |
| | | | 713/170 |
| 2015/0143125 A1 | 5/2015 | Nix | |
| 2015/0309493 A1 | 10/2015 | Patel et al. | |
| 2016/0164678 A1* | 6/2016 | Nix | H04L 9/006 |
| | | | 380/270 |
| 2016/0234020 A1* | 8/2016 | Nix | G06F 21/35 |
| 2016/0270000 A1 | 9/2016 | Nix | |
| 2017/0295491 A1 | 10/2017 | Gehrmann | |
| 2018/0027405 A1 | 1/2018 | Holtmanns et al. | |
| 2018/0144147 A1 | 5/2018 | Nix | |
| 2018/0270059 A1* | 9/2018 | Nix | H04W 12/069 |
| 2019/0173673 A1 | 6/2019 | Nix | |
| 2021/0029193 A1 | 1/2021 | Li et al. | |

OTHER PUBLICATIONS

International Search Report and Written Opinion for application No. PCT/US2019/051481, mailed Dec. 12, 2019.
National Institute of Standards and Technology (NIST) document "NIST SP 800-56A, Recommendation for Pair-Wise Key Establishment Schemes Using Discrete Logarithm Cryptography", Mar. 2007.
Wikipedia, "Elliptic Curve Diffie-Hellman", Mar. 9, 2018.
Wikipedia, ECC Point Multiplication, May 15, 2019.

\* cited by examiner

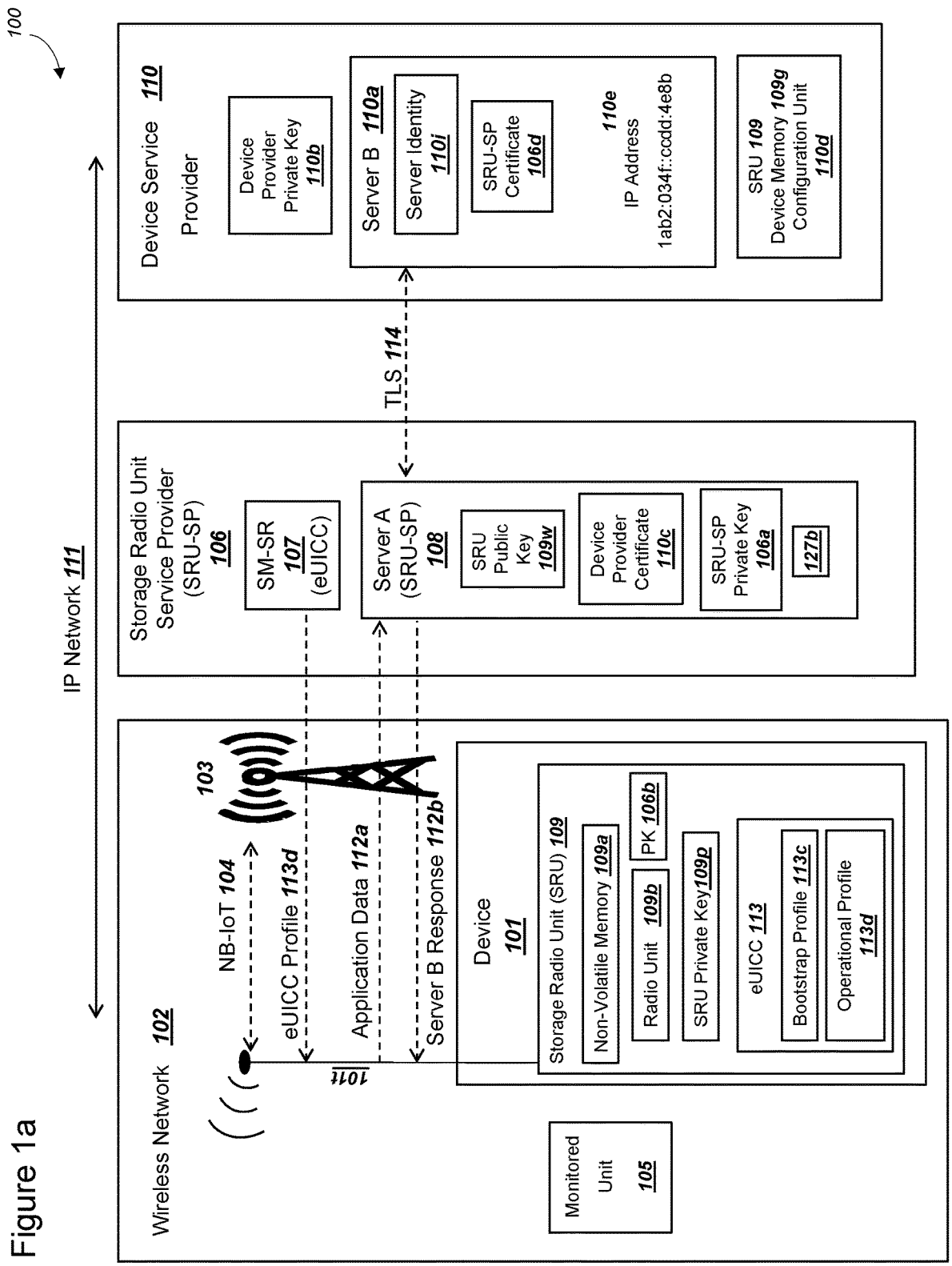

Figure 3a

Shared File System Interface 230' : Device Write and Radio Unit Read Files 191y in Directory 191x

```
File System Interface 230:  .../device_write/..    Directory 191x                                             191

-rw-rw-----  1 device_OS SRU_OS    403 Apr 12 2018 radio_parameters_input        191y
                                                                                 ⎱
-rw-rw-----  1 device_OS SRU_OS     93 Apr 22 2018 https_request                 191a
                                    ┌─────────────────────────────────┐
-rw-rw-----  1 device_OS SRU_OS  112a│ 75 Apr 22 2018 MO_sms          │         191b
                                    │                                 │
-rw-rw-----  1 device_OS SRU_OS   2451 Apr 22 2018 FTP_file_upload    │          191c
                                    └─────────────────────────────────┘
-rw-rw-----  1 device_OS SRU_OS    842 Mar 31 2018 command_script                191d -rw-rw-----  1 device_OS SRU_OS    395 Mar 31 2018 power_control_settings        191g -rw-rw-----  1 device_OS SRU_OS     16 Mar 30 2018 device_identity               191f -rw-rw-----  1 device_OS SRU_OS   2542 Feb  8 2017 cryptographic_parameters      101a -rw-rw-----  1 device_OS SRU_OS     22 Feb  8 2017 date-time-set                 191e ...                                                                            191h 301a   302a       302b       303a    304a       305a
```

Figure 3b

Shared File System Interface 230' – Device Read and Radio Unit Write Files 192y in Directory 192x

```
File System Interface 230 :.../radio-unit_write/..  Directory 192x                                192y
                                                                                                  ⎫
-rw-rw----- 1 device_OS SRU_OS    6582 Oct  4 2017 radio_parameters_loaded                        ⎭ 192a
-rw-rw----- 1 device_OS SRU_OS     766 Apr 22 2017 https_response                                   192b
-rw-rw----- 1 device_OS SRU_OS     423 Apr 22 2017 MT_sms                                           192c
-rw-rw----- 1 device_OS SRU_OS    9884 Apr 22 2017 FTP_file_download                                192d
                                                                                          ⎫ 112b
-rw-rw----- 1 device_OS SRU_OS   98244 Mar 31 2017 log_file                               ⎭         306
-rw-rw----- 1 device_OS SRU_OS      98 Mar 31 2017 Server_B_digital_sig.                            307
-rw-rw----- 1 device_OS SRU_OS      56 Feb  8 2017 power_control_settings                           192g
-rw-rw----- 1 device_OS SRU_OS    4877 Oct  4 2017 cryptographic_parameters                         192e
-rw-rw----- 1 device_OS SRU_OS     566 Feb  8 2017 radio_network_status                             308
-rw-rw----- 1 device_OS SRU_OS    3844 Feb  8 2017 error_log                                        309
-rw-rw----- 1 device_OS SRU_OS      32 Feb  8 2017 network-date-time                                309b
...
```

192

301b   302b                                          305b

STORAGE MEMORY UNIT WITH A SHARED NONVOLATILE MEMORY INTERFACE FOR A RADIO

CROSS-REFERENCE TO RELATED APPLICATIONS

This U.S. Continuation application claims the benefit of the filing date of U.S. Non-provisional application Ser. No. 17/276,818, filed Mar. 16, 2021, that claims the benefit of the filing date of International PCT application Serial No. PCT/US2019/051481, filed Sep. 17, 2019, that claims the benefit of the filing date of U.S. Provisional Patent Application Ser. No. 62/732,930, filed Sep. 18, 2018, which are hereby incorporated by reference in their entirety.

BACKGROUND

Technical Field

The present methods and systems relate to enabling communications between a device and a wireless network, and more particularly, to operating a storage radio unit (SRU) in the device, where the SRU operates (i) nonvolatile memory, (ii) a shared nonvolatile memory interface with the device, and (iii) a radio unit for transmitting application data from the device to the wireless network using the shared nonvolatile memory interface.

Description of Related Art

The ability to connect transducers such as sensors and actuators with a network is a growing field with many economical applications. As the cost for both electronic hardware and bandwidth continues to decrease, the use of networked transducers is expected to continue increasing over the coming decades. Connecting transducers to a network can be referred to as "machine-to-machine (M2M) communications" or "the Internet of Things (IoT)." Among many potential benefits, IoT technologies allow automated monitoring and/or control of assets, equipment, personnel, or a physical location where manual monitoring may not be economical. Many applications for the "Internet of Things" significantly reduce costs by using automated monitoring instead of manual techniques. Prominent examples of IoT applications today include monitoring and control for building heating/air-conditioning, automobiles, alarm systems, and tracking devices. Fast growing markets for IoT applications today include health applications such as the remote monitoring of a person's fitness activity, heartbeat, or glucose levels, monitoring of industrial equipment deployed remotely in the field, and also security systems.

IoT communications can provide remote control over actuators that may be connected to a device, such as turning on or off a power switch, locking or unlocking a door, adjusting a speed of a motor, or similar remote control. A decision to change or adjust an actuator associated with a connected device can utilize one or a series of sensor measurements. As one example, an IoT device for a truck can periodically report engine status to a remote server, and if the engine is operating outside specifications such as being too hot, including potentially an "alarm" condition, then temperature and an alarm code can be reported to a central server for the IoT device. The server can subsequently instruct the driver and/or a specified mechanic to investigate the engine for potential mechanical malfunctions or other causes. The previous example is just one of many possible applications for IoT technology.

Many IoT applications can leverage wireless networking technologies, in addition to wired technologies such as Ethernet. Wireless technologies such as wireless local area networks and wireless wide area networks have proliferated around the world over the past 20 years, and usage of these wireless networks is also expected to continue to grow. Wireless local area network (LAN) technologies include WiFi and wireless wide area network (WAN) technologies include $3^{rd}$ Generation Partnership Project's (3GPP) $3^{rd}$ Generation (3G) Universal Mobile Telecommunications System (UMTS) and $4^{th}$ Generation (4G) Long-term Evolution (LTE), LTE Advanced, Narrow-band Internet of Things (NB-IoT), as well as 5G networks. The many options to connect a transducer device to a network create opportunities for new products and services, but also create several classes of problems that need to be solved. Many of these problems or needs in the art pertain to conserving power for a device with transducers and operating a radio, such that a battery in the device can have a long lifetime. A need exists in the art to enable a device to conserve power by minimizing the time that a processor and a radio in a device are in active states and maximizing the time the processor and radio in a device are in sleep states.

Many devices can utilize or require nonvolatile memory in order record data within the device when the device is in a sleep, deep sleep, or even powered off state. The data required can include an operating system for the device. Additional data for a nonvolatile memory could be a logged record of transducer data, in order for the device to perform analysis or send summary information to a server. In addition, the device could continue to store transducer data for transmission at a subsequent time if a wireless network is not available. Consequently, a device may need a nonvolatile memory storage unit such as a standard SD card or micro SD card. Many devices also connect with wireless WAN networks instead of WiFi networks, such as tracking devices that move, equipment that might frequently change location such as medical equipment in an ambulance, and devices monitoring the temperature or environment for food supplies, and other examples exist as well. Thus, many devices also need a wireless WAN radio to connect with a wireless network, such as a network operated by a mobile network operator.

Conventional technology for IoT/M2M devices utilizes a separate storage unit (e.g. microSD card) and a separate radio module. A need exists in the art for a combined "storage radio unit", such that the storage radio unit includes both nonvolatile memory and a radio to connect with a wireless WAN. SD cards with WiFi radios and near field communication (NFC) radios have been introduced into the market, and conventional technology for SD cards with radios supports local area networks. A need exists in the art for a microSD card to support data transfer through wireless WAN networks such as traditional mobile networks. A need exists in the art for a microSD card to support data transfer through NB-IoT wireless networking technology.

The wide variety of operating systems for devices with transducers creates significant challenges for a manufacturer of radio WAN modules for the devices. A radio module for a wide variety of devices may need to include many different versions of drivers in order to support the different operating systems. Developing and supporting the different drivers can create significant additional overhead or resource requirements for a manufacturer of radio modules. Therefore, a need exists in the art for a device and a storage radio unit to communicate with each other via established and widely deployed standards, such that new software drivers do not need to be created, distributed, and supported in order to enable communication between devices and a storage radio unit. A need exists in the art for a storage radio unit with a radio to communicate with a device using SD card drivers, since the vast majority of operating systems for devices will automatically support SD cards and related drivers.

Connecting a device to a wireless WAN such as supported by a mobile network operator traditionally requires the use of a Subscriber Identity Module (SIM) card. The use of a SIM card with an IoT/M2M device may not be convenient for many reasons, including lack of space, a desire for the device to be hermetically sealed, end users may prefer devices received to be "ready to connect" and not require additional handling of inserting a SIM card. Consequently, a need exist in the art for a storage radio unit that provides both nonvolatile memory and a WAN radio to also support an embedded universal integrated circuit card (eUICC).

The use of an eUICC for a storage radio unit can also create other challenges for users of devices. An eUICC according to GSMA M2M eUICC specifications requires a subscription manager secure routing (SM-SR) function in order to receive profiles, where a profile for the eUICC provides the equivalent of SIM card functionality. A device user or entity deploying the devices may not operate or support an SM-SR, which requires technical expertise and specialized server equipment, in addition to contractual agreements with mobile network operators and authorizations from the GSMA. Consequently, a need exists in the art for a storage radio unit with an eUICC to be provided with integrated support from an SM-SR, such that a device user could simply request an operational profile. A need exists in the art for the storage radio unit to include a bootstrap profile, such that the device automatically has connectivity wherever deployed. A need exists in the art for the SM-SR function included with the storage radio unit to support changing the bootstrap profile to an operational profile based on requirements of the user for the device with the storage radio unit.

Narrowband wireless WAN technologies such as NB-IoT may not be able to efficiently use traditional IETF security protocols such as Transport Layer Security (TLS) and Datagram Transport Layer Security (DTLS). A device operating at low power to conserve battery may have a few tens of kilobits per second of bandwidth and hundreds of milliseconds of round-trip delay with a server communicating with the device. A full DTLS handshake may require ~3 KB and several seconds using conventional technology with a device connected to an NB-IoT network. A device may have only a hundred bytes or less to transmit in a report. Thus, conducting a DTLS session for each device report may waste considerable energy and bandwidth resources (e.g. >90% of bandwidth and energy used for overhead). TLS would take longer and more bandwidth, given the additional overhead of TLS compared to DTLS.

A device may transmit reports an exemplary few times a day or less frequently, which can be outside the allowed session resume times for TLS and DTLS, and thus new TLS and DTLS sessions have to be established for each report. Consequently, a need exists in the art for the device or a storage radio unit to secure communication with a server in a manner that does not require standard TLS and DTLS. A need exists in the art for a server to convert the secured communications to standard security protocols such as TLS in order to communicate with an application server for the device, where the application server can support standard security protocols such as TLS.

And other needs exist in the art as well, as the list recited above is not meant to be exhaustive but rather illustrative.

SUMMARY

Methods and systems are provided for (i) operating a radio unit (RU) within a storage radio unit (SRU) and (ii) using a shared nonvolatile memory interface for communications between (a) a device operating the SRU and (b) the RU. The storage radio unit can comprise the form factor of a micro SD card, solid state drive (SSD), or an integrated circuit soldered to a circuit board. The storage radio unit can also be referred to as a storage memory unit. A system supporting the communication for the device can include a wireless network, a SRU service provider, and a device service provider. The SRU service provider (SRU-SP) can operate a first server "server A", and the device service provider can operate a second server "server B". The wireless network, server A, and server B can be connected using the public Internet. The SRU-SP and the SRU can record a set of compatible cryptographic algorithms and cryptographic parameters, and the SRU-SP can also record at least one elliptic curve cryptography (ECC) private key. An objective of various embodiments of the disclosure is to address the needs in the art described above.

For an exemplary embodiment, a device can include electrical components of a processor, a transducer, random access memory (RAM), a battery, an antenna, a storage radio unit, and device service provider certificate, where the certificate includes a device service provider public key. The device can comprise a computing device to support M2M and IoT applications, in order to collect data regarding the state of a monitored unit and send the data to the second server, server B. The device can operate within range of a wireless wide area network, such as a network for a mobile network operator. The mobile network operator could support wireless narrowband technologies such as standards for "narrowband Internet of Things" (NB-IoT), which could be a subset of the "Long Term Evolution" LTE 4G standards. NB-IoT could also be supported by 5G networks as well.

Upon boot, the device can use an operating system with a driver for the storage radio unit, and libraries for (i) collecting data from a transducer, (ii) reporting data to a server in the form of application data, and (iii) writing the application data to the storage radio unit. The device can power the storage radio unit. The device can collect transducer data and write application data for server B to the storage radio unit. The processor for the device can enter and remain in a sleep state (a) after the device writes the application data to the storage radio unit until (b) SRU signals device 101 that the SRU has a server B response in a shared nonvolatile memory for the device to read. The processor for the device using this configuration for (i) entering and exiting the sleep state and (ii) using shared nonvolatile memory to read the server B response can conserve power. In other words, the processor can sleep for substantially the entire time between (a) writing application data in a shared nonvolatile memory and (b) server B response data is available for reading by the processor in the device.

A storage radio unit can be manufactured with nonvolatile memory, a radio unit, an external bus, an internal bus, a memory processor, a memory core interface, RAM, an eUICC, a RF clock, EEPROM, a power control unit, and electrical connection to the antenna in the device. The nonvolatile memory can include shared memory for the device and the SRU, general memory for the device, and protected memory for the SRU and radio unit. Upon boot or power up of the SRU, the memory processor can load boot firmware from the EEPROM and then SRU firmware recorded in the protected memory for the SRU. After the boot process, the memory processor can subsequently communicate with (i) the device using the external bus and (ii) internal components in the SRU using the internal bus. The protected memory for the SRU can record an elliptic curve cryptography (ECC) SRU private key and an SRU-SP public key corresponding to the SRU-SP private key.

The radio unit in the SRU can include a processor, a RF front-end connected to the device antenna, a RF transceiver unit, and a baseband unit. For some embodiments, the RF-front-end can be external to the SRU and connected to the SRU via a data bus. The timing of the radio unit can be driven by the RF clock. The radio unit can be connected to the memory processor and the nonvolatile memory in the SRU using an internal bus. The radio unit can conduct a boot process and load RU firmware from the protected memory of the SRU. The power control unit in the SRU can control the RU and instruct the RU to enter a sleep state after boot.

The SRU firmware loaded by the memory processor can include libraries for the SRU to access and control nonvolatile memory in the SRU via the memory core interface and the internal bus. The SRU firmware can also include a configuration process. The configuration process can read and detect the type of filesystem written to the general memory for the device. The configuration process can use filesystem drivers in the SRU firmware to configure the shared nonvolatile memory with the detected filesystem. The configuration process can write a device write and SRU read directory in the shared nonvolatile memory. The configuration process can write a SRU write and device read directory in the shared nonvolatile memory. The device write directory and the SRU write directory can comprise a shared filesystem interface between the device and the SRU. The configuration process can then load an initial set of files in the shared nonvolatile memory. The operating system for the device can mount the filesystem for the shared nonvolatile memory and the device general memory. The device can access the shared nonvolatile memory and the device general memory using a standard driver for the operating system of the device, such as an SD card driver or a driver for a solid state disk (SSD).

The device can write the application data to the device write directory in the shared filesystem interface operating in the nonvolatile memory of the SRU. The memory processor can process a trigger library from the SRU firmware to detect that application data has been written to the shared filesystem interface. The trigger library can instruct the power control unit to change the state of the radio unit from a sleep state to an active state. Upon entering the active state, the radio unit can attach to the wireless network using credentials recorded in a profile for the eUICC. The radio unit (RU) can then read the application data from the device write directory.

The RU can derive an ECC ephemeral PKI key pair comprising an ephemeral private key and an ephemeral public key. The RU can conduct an ECDH key exchange using as input the ephemeral private key, the SRU private key, and the SRU-SP public key. The output of the ECDH key exchange can comprise a secret shared key that also can be mutually derived by server A of the SRU-SP. The secret shared key can be input into a key derivation function in order to derive a symmetric ciphering key. The RU can compress the application data using a compression library included in SRU firmware. The RU can encrypt the compressed application data using the derived symmetric ciphering key and a symmetric ciphering algorithm. The RU can transmit a message to server A through the narrowband or wideband wireless network comprising (i) the encrypted, compressed application data along with (ii) the derived ephemeral public key and (iii) an identity of the SRU.

Server A of the SRU-SP can record an SRU public key corresponding to the SRU private key recorded by the SRU. Server A can receive the message from the RU via the wireless network and the Internet. Server A can read the SRU identity in the message and lookup the SRU public key as well as cryptographic parameters associated with the SRU and SRU public key. For some embodiments, the SRU identity can comprise a secure hash value over a static public key for the SRU. The SRU can read the ephemeral public key received in the message. The SRU-SP can conduct an ECDH key exchange using the received ephemeral public key, the SRU public key, and the SRU-SP private key in order to derive the secret shared key. The SRU-SP can input the secret shared key into a key derivation function in order to derive the symmetric ciphering key. The SRU-SP can decrypt the encrypted, compressed application data using the derived symmetric ciphering key and a symmetric ciphering algorithm. The SRU-SP can decompress the application data in order to read the plaintext application data. The SRU-SP can establish a TLS session with server B. The SRU-SP can forward the application data in the TLS session to server B.

Server B can receive the application data for the device. The application data can include a device identity. Server B can process the data and generate a server B response along with a digital signature for the server B response data using a SRU-SP private key. Server B can send Server A for the SRU-SP the server B response and the digital signature for the server B response data through the TLS session. Server A can map or track which sessions with server B are associated with which SRU via the SRU identity received in the message from the RU. The SRU-SP can receive the server B response and compress the data. The SRU-SP can encrypt the compressed data using the derived symmetric ciphering key. The SRU-SP can forward (a) the encrypted, compressed server B response data and (b) the digital signature for the server B response data to the RU via the Internet and the narrowband or wideband wireless network.

The RU in the SRU can receive (a) the encrypted, compressed server B response data and (b) the digital signature. The RU can decrypt the encrypted, compressed server B response data using the derived symmetric ciphering key and the symmetric ciphering algorithm. The RU can decompress the compressed server B response data. The RU can write (a) the server B response data and (b) the digital signature to the SRU write and device read directory in the shared nonvolatile memory. The power control unit can (i) return the RU to a sleep state and (ii) signal the device for the device to wake the processor in the device or change the processor in the device from the sleep state to the active state. The device can read the server B response data and the digital signature for the server B response data from the shared nonvolatile memory. The server B response data could include an actuator setting or other command for the device, or simply an acknowledgement that the application data was received. The device can verify the digital signature using the certificate recorded for the device service provider (which operates server B). After reading and processing the server B response data, the device can optionally delete the data from the shared nonvolatile memory.

For another exemplary embodiment, a device can include the radio unit and nonvolatile memory, without requiring the use of a storage radio unit. The device or a configuration unit can conduct a configuration process on the nonvolatile memory to configure a shared nonvolatile memory with a device write memory and a RU write memory. The device can write application data to the device write memory. The device can operate a power control unit and change the state of the RU from a sleep state to an active state after the device writes the application data. A processor in the device can then enter a sleep state until the radio unit writes server B response data to the RU write memory. The RU can wake from a sleep state and connect with a wireless network using an eUICC. The RU can read the application data from device write memory and conduct the steps for a RU listed above for the RU to transmit and send the application data.

Server A and server B can conduct the steps listed above for receiving and processing the application data. Server A and server B can conduct the steps for processing and communicating the server B response data and a digital signature from server B for the server B response data. The RU in the device can (i) receive the server B response data and digital signature via the wireless network and (ii) write the server B response data and the digital signature to the RU write memory. The RU in the device can signal the processor in the device to exit from a sleep state in order for the processor in the device to read the server B response data and the digital signature. The device can then verify the digital signature over the server B response data using a recorded certificate associated with server B. The device can then process and operate with the server B response data.

For another exemplary embodiment, a device can include a system on a chip, where the system on the chip includes a processor, nonvolatile memory, and a radio unit. The components in the system on the chip can be connected via an internal system bus. For embodiments with the "system on a chip" configuration, some components for an RU used in a storage radio unit configuration may be operated outside the system on a chip, such as an RF front end operated outside the system on a chip. An RF clock within the system on the chip can drive the internal timing of both the processor and the internal radio units. The nonvolatile memory can comprise a persistent memory or a nonvolatile RAM (NVRAM) memory. The system on a chip can operate with the steps for a device according to the steps for a device and a RU listed above in the previous two paragraphs, where (i) the processor writes application data for the RU to the nonvolatile memory in the system on a chip and (ii) the RU writes server B response data and a digital signature for the processor to the nonvolatile memory in the system on a chip.

The processor can signal the RU to wake after writing the application data and also enter a sleep state. The RU can signal the processor to wake after writing the server B response data and the digital signature, and also return to a sleep state. The processor can read the server B response data and the digital signature, verify the digital signature using a certificate associated with server B, and process and operate with the server B response data. In some exemplary embodiments, the server B digital signature can be omitted, and the processor can conduct encryption of the application data before writing the application data for the RU to the shared nonvolatile memory.

These as well as other aspects and advantages will become apparent to those of ordinary skill in the art by reading the following detailed description, with reference where appropriate to the accompanying drawings.

BRIEF DESCRIPTION OF THE DRAWINGS

Various exemplary embodiments are described herein with reference to the following drawings, wherein like numerals denote like entities.

FIG. 1a is a graphical illustration of an exemplary system, where a storage radio unit operates with a device, and the storage radio unit communicates with a service provider using a radio and a wireless network, in accordance with exemplary embodiments;

FIG. 3a is a graphical illustration of a shared filesystem interface for a radio storage unit and a device, using a device write directory, in accordance with exemplary embodiments;

FIG. 3b is a graphical illustration of a shared filesystem interface for a radio storage unit and a device, using a radio unit write directory, in accordance with exemplary embodiments;

DETAILED DESCRIPTION OF EXEMPLARY EMBODIMENTS OF THE INVENTION

FIG. 1a

Figure 1C:
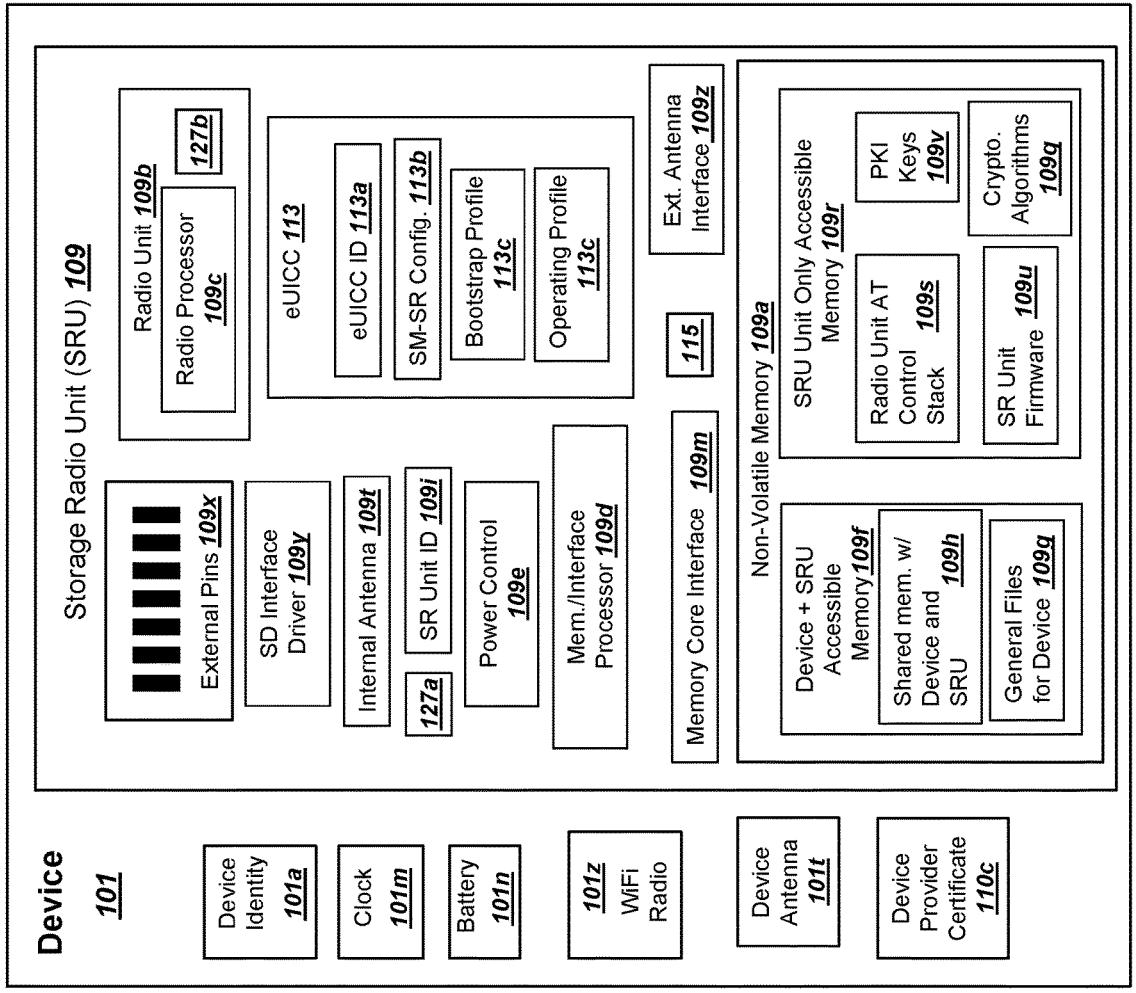
FIG. 1c is a graphical illustration of hardware, firmware, and software components for a device and a storage radio unit, in accordance with exemplary embodiments.

FIG. 1a is a graphical illustration of an exemplary system, where a storage radio unit operates with a device, and the storage radio unit communicates with a service provider using a radio and a wireless network, in accordance with exemplary embodiments. The system 100 includes a device 101, a wireless network 102, a storage radio unit service provider (SRU-SP) 106, and a device service provider 110. Device 101 can include a storage radio unit (SRU) 109 and an antenna 101t for connecting to the wireless network 102. Device 101 can be a wireless computing device to support applications for the "Internet of Things" or "Machine-to-Machine" communications including tracking devices, security systems, cameras, or health monitoring devices. Device 101 can also be a computing device, a mobile phone, a module, a drone, a laptop computer, a desktop computer, a server, a tablet, a "point of sale" cash register or payment terminal, and many other possibilities exist as well. Device 101 can be associated with or operate in conjunction with a monitored unit 105. Exemplary electrical and physical components operating within device 101 are also depicted and described in connection with FIG. 1b and FIG. 1c below. Although a single device 101 is depicted in FIG. 1a, a wireless network 102 could include a plurality of devices 101.

Device 101 can be associated with a monitored unit 105. Examples of a monitored unit 105 can include an ATM or vending machine, a truck or automobile, a refrigerated or standard ("dry") shipping container, or industrial equipment such as, but not limited to, an oil field pump, a transformer connected to an electrical grid or an escalator or elevator in a building. Additional examples of a monitored unit 105 include can also include a pallet for shipping or receiving goods, a refrigerator with food, a health monitoring device attached to a person such as, but not limited to, a heart monitor, and a gate or door for opening and closing. Device 101 can utilize a sensor (depicted in FIG. 1b) to measure and collect data regarding a parameter of monitored unit 105 such as, but not limited to, temperature, humidity, physical location potentially including geographical coordinates from a Global Positioning System (GPS) or other satellite system receiver, surrounding light levels, surrounding RF signals, vibration and/or shock, voltage, current, audio or sound, and/or similar measurements. Other possibilities exist as well for device 101 to associate with a monitored unit 105 without departing from the scope of the present disclosure. In some exemplary embodiments, a monitored unit 105 could be omitted, and data from a device 101 directly could be communicated through wireless network 102 to a server such as server A 108 and server B 110a.

Monitored unit 105 could also be controlled by device 101 via a transducer that is an actuator (depicted in FIG. 1b), where device 101 can change the actuator in order to change a state or parameter for monitored unit 105. For example, if monitored unit 105 is a door, then a transducer for device 101 could include a relay to activate a lock for the door. If monitored unit 105 is a lighting system in a building, then a transducer could comprise a switch to turn the lighting level up or down. Other examples exist for monitored unit 105 as well, and the above are intended to be illustrative instead of limiting. Device 101 could forward sensor data to device service provider 110 as application data 112a. Device service provider 110 can both (i) receive application data 112a from sensors in device 101 for monitored unit 105 and (ii) transmit server B response data 112b for actuators in device 101 in order to control monitored unit 105. Thus, in operation and by using the systems and methods described in subsequent figures below, device service provider 110 can remotely monitor and control monitored unit 105 using device 101, where device 101 obtains connectivity to wireless network 102 via SRU 109, or a radio unit operating in device 101.

Wireless network 102 can comprise a wide area wireless network operated by a mobile network operator and support wireless wide area network (WAN) technologies including 3rd Generation Partnership Project's (3GPP) $3^{rd}$ Generation (3G) Universal Mobile Telecommunications System (UMTS) and $4^{th}$ Generation (4G) Long-term Evolution (LTE), LTE Advanced, Narrow-band Internet of Things (NB-IoT), and 5G standards as well, including subsequent standards. Wireless network 102 could also support other wireless standards such as low power wide area networking such as Sigfox and LoRa. Wireless network 102 can operate a base station 103, which could comprise an "eNodeB" (for 4G networks), a "gNodeB" (for 5G networks), a picocell, a macrocell, or other wireless WAN radio access network technologies. For some exemplary embodiments, base station 103 could comprise an access point for an 802.11 network, such as, but not limited to, and 802.11 ac, 802.11 ax, or 802.11 ah network.

Wireless network 102 can require device 101 to record and operate with (i) a set of network access credentials such as an international mobile subscriber identity (IMSI) and key K for 4G networks, and/or (ii) a subscription permanent identity (SUPI) and master key for 5G networks, and other possibilities exist as well. Network access credentials for wireless network 102 can be recorded in an embedded universal integrated circuit card (eUICC) 113 in SRU 109 in device 102. Although a single wireless network 102 is depicted in FIG. 1a, a system 100 could include a plurality of wireless networks 102. In addition, wireless network 102 could support WiFi wireless networking, including, but not limited to, 802.11 based standards, such as "ac", "ah", and future or related versions of WiFi standards as well including 802.11 ax.

Device 101 can communicate with SRU-SP 106 via the wireless network 102. SRU-SP 106 can comprise an entity, business, or collection of computing devices associated with SRU 109 and providing data communications services to device 101 via SRU 109. SRU-SP 106 can include a Subscription Manager—Secure Routing (SM-SR) 107 function according to GSM Association standard SGP.02 version 3.2 titled "Remote Provisioning Architecture for Embedded UICC Technical Specification", which is herein incorporated by reference in its entirety. SM-SR 107 can record information pertaining to eUICC 113 in SRU 109, including an eUICC information set (EIS). SM-SR 107 could also communicate with a plurality of different Subscription Manager—Data Preparation (SM-DP) functions (not shown), where an SM-DP could be associated with wireless network 102. The SM-SR 107 can establish a secure channel with the eUICC 113 and transfer profiles to the eUICC through the secure channel, according to the specification in GSMA SGP.02. The SM-SR 107 can receive profiles for eUICC 113 from a SM-DP, based on requests or contractual agreements between the SM-SR 107 and the SM-DP.

SRU-SP 106 can also include at least one server A 108 for communicating application data 112*a* and server B response 112*b* data with SRU 109 via the wireless network 102. Server A 108 can comprise a server in order to communicate with a plurality of SRU 109 in different devices 101. Different devices 101 could operate with different wireless networks 102. Server A 108 and server B 110*a* for both SRU-SP 106 and device service provider 110 can be either different physical computers such as rack-mounted servers, or different logical or virtual servers or instances operating in a "cloud" configuration. Internal electrical and physical components for server A 108 and server B 110*a* can be equivalent to those depicted and described for a device 101 in FIG. 1*b* and FIG. 1*c* below, but with high capacities associated with servers. Server A 108 and server B 110*a* for both SRU-SP 106 and device service provider 110 can each be co-located within the same data center or geographically dispersed.

Server A 108 and server B 110*a* for both SRU-SP 106 and device service provider 110 can operate with an operating system for a server such as Linux or Windows Server, and other possibilities exist as well. Although a single server A 108 and server B 110*a* is depicted in FIG. 1*a*, server A 108 and server B 110*a* could each separately comprise a plurality of different servers or computing devices with different functions to operate collectively as a single server, such as a firewall, a database, a router, and an application such as a web server or an email server. In addition, although server A 108 and server B 110*a* are depicted as operating with separate entities, the function of server A 108 and server B 110*a* could be combined into a single server operating with one of the two entities SRU-SP 106 or device service provider 110.

Server A 108 can include a SRU public key 109*w* for each SRU 109, a device service provider certificate 110*c* for device service provider 110, and an SRU-SP private key 106*a*. SRU public key 109*w* can be selected based on an identity for SRU 109, and SRU public key 109*w* can also be recorded in a certificate. Certificates in the present disclosure can be formatted according to the X.509v3 and related standards, and record information about the public key, unit holding the corresponding private key, and cryptographic parameters associated with the public and private keys. In exemplary embodiments, public and private keys can be used with cryptographic algorithms supporting key exchange and digital signatures. Public and private keys can support either elliptic curve cryptography (ECC) or RSA-based cryptographic algorithms, and other cryptographic algorithms with public and private keys can be supported as well, including cryptographic algorithms and PKI keys supporting post-quantum cryptography, without departing from the scope of the present disclosure.

Device service provider 110 can comprise an entity, business, or collection of servers providing service to device 101. Device service provider 110 can include device service provider private key 110*b*, server B 110*a*, and configuration unit 110*d*. Device service provider private key 110*b* can comprise a private key corresponding to device service provider public key 110*c* (or certificate) recorded by SRU-SP 106 in server A 108. Server B 110*a* can comprise a server or computing device to receive data from device 101 over an IP network 111 and can also include data regarding monitored unit 105. Although not depicted in FIG. 1*a*, server B 110*a* can include a database recording application data 112*a* for a plurality of different devices 101.

Server B 110*a* can also function as a monitoring and controlling service for device 101, such as logging data and also sending commands or instructions to device 101 in server B data 112*b*. Server B 110*a* could support a wide variety of applications, such as tracking location of device 101, monitoring physical security status reported by device 101, monitoring health data for a user associated with device 101, monitoring the status or state of monitored unit 105, and other possibilities exist as well without departing from the scope of the present disclosure. In exemplary embodiments, server B 110*a* can be referred to as an application server. Server B 110*a* could support web interfaces to users for users or owners of device 101 to monitor the status of device 101. Although FIG. 1*a* depicted server B data 112*b* for device 101 as being transmitted through SRU-SP 106, in some embodiments application data 112*a* and server B data 112*b* could be communicated between device 101 and device provider 110 without passing through SRU-SP 106.

In some embodiments, device service provider 110 can operate both server A 108 and server B 110*a*. For these embodiments, SRU-SP 106 could continue to operate SM-SR 107 but not operate server A 108. For these embodiments, device service provider 110 obtains the benefits for the use of a server A 108, where communication and encryption of data between server A 108 and RU 109*b* can comprise a first protocol optimized for an NB-IoT 104 network or other narrowband wireless network technology. Communication between server A 108 and server B 110*a* can utilize standard IETF security protocols such as TLS between the two servers. In other words, TLS or DTLS may not be optimal or preferred for the bandwidth and power/energy requirements of device 101 with RU 109*b* operating on a battery and with narrowband wireless technologies. Consequently, a first server comprising server A 108 can manage the communication with RU 109*b* over the narrowband wireless technology using a first protocol for communication and security, and server A 108 can manage the communication and security with server B 110*a* using a second protocol for communication and security, such as TLS. Additional details regarding communication between RU 109*b*, server A 108, and server B 110*b* are provided below in FIG. 4*b* and related figures.

Server B 110*a* can include an Internet Protocol (IP) address 110*e*, which could comprise an address according to IPv4 or IPv6 standards. Other servers and computing devices depicted in FIG. 1*a* could include an IP address as well and connect to an IP network 111. Data between the nodes and entities depicted in FIG. 1*a* can be communicated via the IP network 111 using IP addresses such as IP address 110*e*. IP network 111 can comprise either the globally routable public Internet or also a private network which could be an intranet. IP network 111 could comprise a combination of intranets linked to the globally routable public Internet.

Configuration unit 110*d* for device service provider 110 can comprise a device for (i) configuring device nonvolatile memory 109*a* in SRU 109 and (ii) recording firmware, software, and data for device 101 in the configured memory 109*a*. By inserting SRU 109 in configuration unit 110*d* before SRU 109 is inserted into device 101, memory 109*a* can record data for device 101 before device 101 begins operation. Although not depicted in FIG. 1*a* (but depicted and described in connection with FIG. 1*c* and FIG. 2*a* below), (x) memory 109*g* for device 101 in SRU 109 can reside within nonvolatile memory 109*a* in SRU 109, and (y) a configuration unit 101*d* could configure memory 109*g* in memory 101*a*. The use of a configuration unit 110*d* can be omitted in some embodiments, and a device 101, user or SRU 109 manufacturer can configure memory 109*g* for those embodiments. Although a configuration unit 110*d* is depicted in FIG. 1*a* as associated with a device service provider 110, for some exemplary embodiments a SRU-SP 106 could operate a configuration unit 110*d*.

Figure 8:
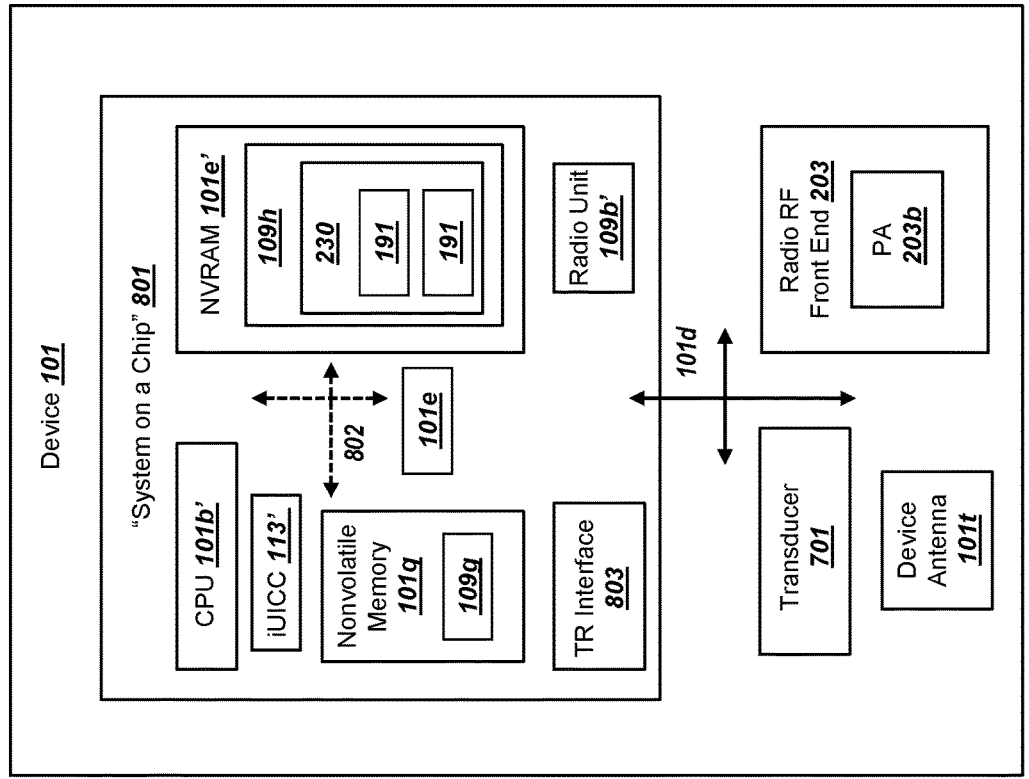
Figure 7:
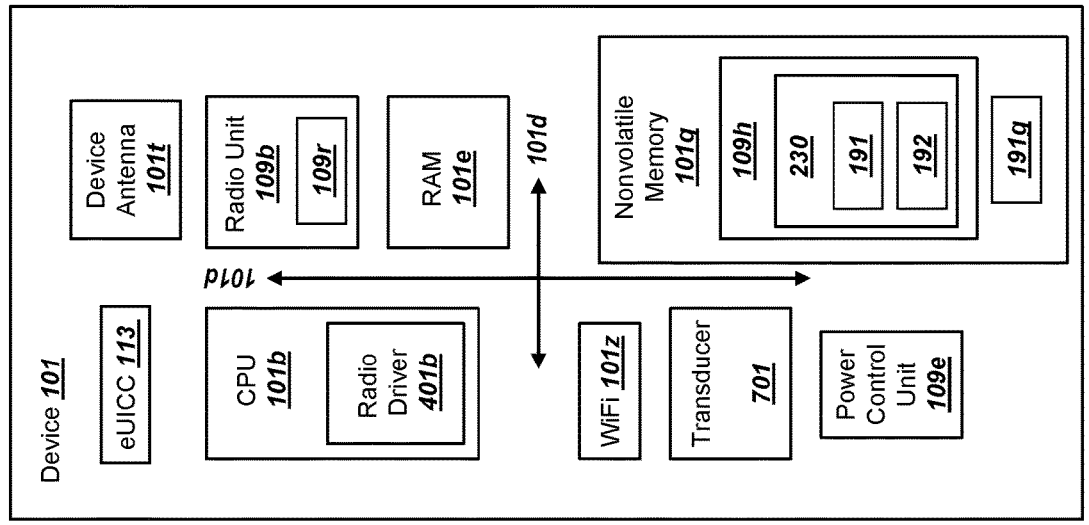
FIG. 7 is a graphical illustration of hardware, firmware, and software components for a device, in accordance with exemplary embodiments; and, FIG. 8 is a graphical illustration of hardware, firmware, and software components for a device, in accordance with exemplary embodiments.

Storage radio unit 109 can comprise a computing device that can be inserted into device 101 and include nonvolatile memory for the computing device. In some exemplary embodiments, storage radio unit (SRU) 109 can comprise a Secure Digital (SD) card supporting physical standards maintained by the SD Card Association (SDA). SRU 109 can have a physical form compatible with (i) standard SD cards and dimensions of 32 mm×24 mm×2.1 mm, or (ii) micro SD card and dimensions of 15 mm×11 mm×1.0 mm. Other possibilities exist as well for the physical form of SRU 109, including the "miniSD" size, or a solid state disk (SSD). SRU 109 could also comprise an integrated circuit that could be soldered onto a circuit board for device 101. SRU 109 could also comprise a wafer level chip scale package (WLCSP), which could be included in a separate integrated circuit, such as a "system on a chip" for device 101 (as depicted in FIG. 8 below). Note that in some exemplary embodiments, the components depicted for storage radio unit 109 could be operated by other electrical components within device 101, such as depicted in FIG. 7 and FIG. 8 below, and in this case an SRU 109 could be omitted while obtaining the benefits and functionality of the present disclosure, including the use of a shared nonvolatile memory interface for radio unit 109*b* and device 101 as described below in FIG. 2*b*, FIG. 2*f*, FIG. 3*a*, FIG. 3*b*, etc.

Storage radio unit 109 can include nonvolatile memory 109*a*, radio unit 109*b*, SRU private key 109*p*, SRU-SP public key 106*b*, and eUICC 113. In exemplary embodiments, each of nonvolatile memory 109*a*, radio unit 109*b*, SRU private key 109*p*, and eUICC 113 comprise either (i) wafer level chip scale packages (WLCPS) or (ii) separate components etched and processed within a single silicon chip or package, in order to support a micro SD card form factor. SRU private key 109*p* can comprise the private key corresponding to SRU public key 109*w* recorded with SRU-SP 106 and described in this FIG. 1*a* above. SRU-SP public key 106*b* can be the public key corresponding to the SRU-SP private key 106*a* recorded and operated by server A 108 with SRU-SP 106.

Non-volatile memory 109*a* can comprise a physical memory of NAND or NOR flash memory, such that data recorded in non-volatile memory 109*a* continues to be recorded when electrical power is removed from storage radio unit 109. The data within non-volatile memory 109*a* can subsequently be read and/or re-written when power is restored to storage radio unit 109. Exemplary values for the amount of memory available non-volatile memory 109*a* for SRU 109 operating as an SD card physical form factor can range from 512 megabytes to 128 gigabytes, and other possibilities exist as well. For some embodiments, nonvolatile memory 109*a* can comprise a persistent memory or nonvolatile RAM memory (NVRAM), such as that depicted in FIG. 8 below.

Non-volatile memory 109*a* can include occasional bit errors due to the nature of the physical memory, such as small memory cell sizes, but error correcting codes operating in a memory processor in SRU 109 (depicted as processor 109*d* in FIG. 1*c* below) can normally correct the errors, such as limiting errors in a file read by device 101 from non-volatile memory 109*a* to less than one part per billion during the normal, operating lifetime of storage radio unit 109. As contemplated herein, error correcting codes can comprise either (i) convolution codes operating on a bit by bit basis on memory or data from memory, such as a Veterbi decoder, or (ii) block codes, such as a Hamming codes or Reed-Solomon codes. Other possibilities for the physical structure of non-volatile memory 109*a* and error correcting codes exist as well without departing from the scope of the present disclosure, and generally (i) non-volatile memory 109*a* includes addresses and blocks, such that binary data can be recorded and subsequently read in a nonvolatile state, and (ii) error correcting codes attempt to identify and correct the presence of bit errors in either physical memory and/or data read from the physical memory.

Radio unit 109*b* operating in SRU 109 can comprise a radio with standard radio components such as RF filters, RF amplifiers, a clock, a controller or processor, and phased loop logic (PLL), and may be connected with an antenna such as antenna 101*t* for device 101. Additional details for radio unit 109*b* are depicted and described in connection with FIG. 2*a* below. In exemplary embodiments, radio unit 109*b* supports the wireless WAN standards for wireless network 102, which could comprise a network supporting NB-IoT 104 radio frequency signaling and standards. NB-IoT was initially standardized with 3GPP Release 13, and large mobile networks in the United States such as T-Mobile and AT&T are deploying NB-IoT networks nationwide throughout 2018 and 2019. Benefits of NB-IoT 104 communications for radio unit 109*b* include low power and high sensitivity, such as using sub-channels or carriers totaling ~180 kHz and bit rates on the order of ~100 kbps, or lower for "deep penetration" in buildings or remote locations. Other narrowband wireless technologies could be used with RU 109*b* and wireless network 102 as well.

In exemplary embodiments, radio unit 109*b* supports subsequent and related standards for NB-IoT 104, including updates through 3GPP Release 16, which is the latest in formal draft phase as of 2018. Radio unit 109*b* could also support other relatively low electrical power and low processing power standards or protocols, including Sigfox and Lora. In general, the radio protocols supported by radio unit 109*b* are characterized by (i) low transmit power such as a maximum transmit power of 30 dBm or less, and (ii) relatively narrow frequency channels such as less than 2 MHz, and preferably approximately equal to less than 200 kHz. For NB-IoT applications, narrow sub-channels or carriers such as 15 or 3 kHz could be utilized. For some embodiments, wireless network 102 and RU 109*b* could support LTE CAT M1, which comprises using approximately 1 MHz of RF spectrum. RU 109*b* could operate in either half duplex mode or a full duplex mode. The RF bands for radio unit 109*b* could use either frequency division duplex (FDD) or time division duplex (TDD).

eUICC 113 operating with SRU 109 can operate according the GSMA standards in SGP.02 for an eUICC, including subsequent and related standards. eUICC 113 can be manufactured by an eUICC Manufacturer (EUM) certified by the GSMA. eUICC 113 can include an Issuer Security Domain—Root (ISD-R) and an eUICC Controlling Authority Security Domain (ECASD), along with an internal processor and memory and a bus. eUICC 113 could also comprise a secondary platform bundle operating within a "Smart Secure Platform" within SRU 109. Separate profiles can be recorded in Issuer Security Domains—Profile (ISD-P), which can be created based on commands from the SM-SR 107 and SM-DP associated with wireless network 102. A profile can contain the data equivalent to that recorded in a traditional SIM card comprising network access credentials (e.g. IMSI and key K) and wireless network 102 parameters (e.g. frequencies or channels to use, network codes, timers to implement, etc.)

Figure 1B:
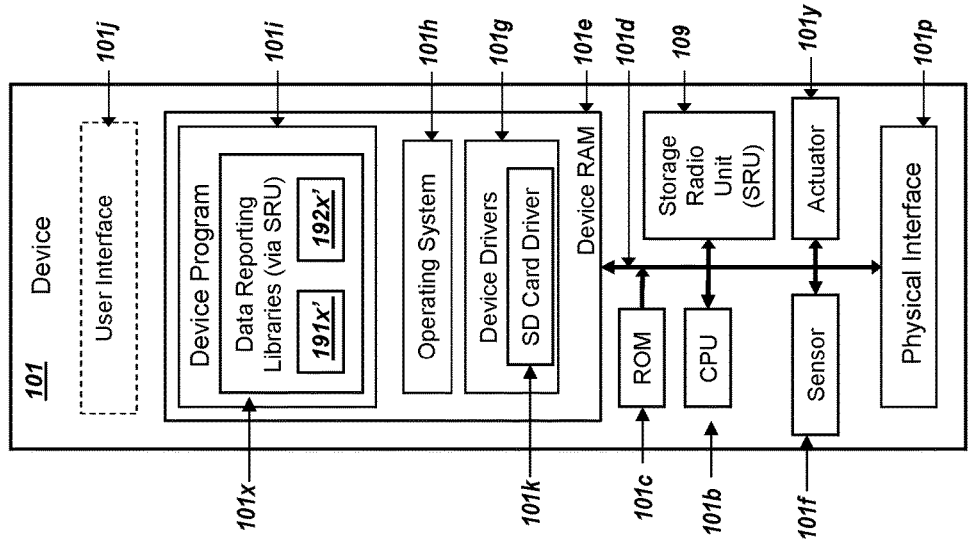
FIG. 1b is a graphical illustration of hardware, firmware, and software components for a device, including a storage radio unit, in accordance with exemplary embodiments.

In exemplary embodiments, eUICC 113 includes a bootstrap profile 113c and an operational profile 113d. Bootstrap profile 113c can be written to eUICC 113 by the SM-SR 107 function, or specified by SM-SR 107 and written by the EUM. For some embodiments, eUICC 113 could use GSMA standards SGP.22 for consumer devices (where device 101 can include a user interface 101j as depicted in FIG. 1b below). Use of SGP.02 may be preferred if device 101 does not operate a user interface. In exemplary embodiments, eUICC 113 can support both SGP.02 and SGP.22.

Bootstrap profile 113c provides initial or fallback connectivity on a global basis, and could be associated with a globally operating wireless network 102 such as AT&T or Vodafone. Operational profile 113d could be downloaded or updated using the steps specified for a profile download procedure with an eUICC from GSMA standards. Operational profile 113d could be used by SRU 109 and device 101 based on updated contractual agreements with a wireless network 102 or for use in specific geographies. Although a single eUICC 113 is depicted for SRU 109 in FIG. 1a, in some exemplary embodiments an SRU 109 could include multiple different eUICC 113 and select the eUICC 113 based on preferences in SRU 109 firmware (such as SRU firmware 109u in FIG. 1c, 2a, 2e, etc. below). Benefits of SRU 109 containing multiple eUICC 113 units is that SRU 109 can select a profile to use from each of the multiple different eUICC 113 based on the operational profile 113d in each of the different eUICC 113.

According to the current GSMA specifications for eUICCs in embedded devices (such as with SGP.02), an operational profile 113d cannot be changed without a command from or interaction with an SM-DP (except for fallback or bootstrapping cases). By using multiple different eUICC 113 in SRU 109, the SRU 109 can select a different eUICC 113 with different operational profiles 113d in each eUICC 113 in order to have access to multiple profiles without involving an SM-DP. The selection of an eUICC 113 by SRU 109 is described with step 406a in FIG. 4 below. An eUICC 113 can also be referred herein and within related literature as an "integrated universal integrated circuit card" (iUICC), as depicted with FIG. 8 below. In exemplary embodiments, the same SM-SR 107 could be used with each of the different eUICC 113 operating in device 101. Or, in some embodiments a single eUICC can be used with SRU 109 and device 101.

Using the components depicted for a system 100, a device 101 with an SRU 109 and a radio unit 109b can connect with a first wireless WAN network 102, such as using NB-IoT 104 standards. Wireless WAN network 102 can provide access to IP network 111 and SRU-SP 106 and/or device service provider 110. The SM-SR 107 function of SRU-SP 106 can support sending an operational profile 113d to the eUICC 113 operating in SRU 109. SRU 109 can use the operational profile 113d to connect with a second wireless network 102, based on the network access credentials and network parameters in the downloaded operational profile 113d. Device 101 can then send application data 112b to SRU-SP 106 via the second wireless network 102 and IP network 111. SRU-SP 106 can establish a secure session with device service provider 110 such as TLS session 114. SRU-SP 106 can then forward the application data 112a to device service provider 110 via a TLS session 114.

The device service provider 110 can receive and process the application data 112a from the TLS session 114 using server B 110a. The device service provider 110 can send server B response 112b data to SRU-SP 106 via the TLS session 114. The SRU-SP 106 can then forward server data 112b for device 101 via the second wireless network 102 and the SRU 109 operating within device 101. Server B response 112b data could be a response or confirmation or command for device 101 based on the application data 112a received by device service provider 110. SRU 109 can write the server B response 112b to an interface operating in nonvolatile memory 109a, which can be subsequently read by device 101. In this manner, device 101 can use an SRU 109 to communicate with device service provider 110.

Note that the use of SRU-SP 106 can support standard IETF protocols such as TLS version 3 (e.g. draft-ietf-tls-tls13-28) through IP network 111 with device service provider 110. However, narrowband wireless network technologies such as NB-IoT may not be suited for TLS due to the low bandwidth and potential higher latency (for "deep" building penetration or remote locations). For example, device 101 may prefer not to establish a TLS or DTLS session with server B 110a each time device 101 sends small reports or data such as an exemplary ~50 or ~100 bytes. Transmitting small sets of application data 112a to server B 110a (via wireless network 102 with NB technology and server A 108) may be better supported including a longer battery life for device 101 through a system 100. Also note that application data 112a can be compressed and encrypted by SRU 109 before transmission to SRU-SP 106 and server data 112b can be decrypted and decompressed by SRU 109 after receipt from SRU-SP. In this manner, a system 100 can address needs in the art described in the background above. Additional details regarding the operation of a system 100 and components will be provided in figures below.

FIG. 1b

FIG. 1b is a graphical illustration of hardware, firmware, and software components for a device, including a storage radio unit, in accordance with exemplary embodiments. FIG. 1b is illustrated to include many electrical components that can be used by device 101. Device 101 may also operate in a wireless configuration in order to connect with a wireless network 102. Device 101 may consist of multiple components in order to collect sensor data or control an actuator associated with a monitored unit 105. The physical interface 101p can include associated hardware to provide connections to components such as user interface 101j, a power supply, external transducers, a display or light-emitting diodes, etc. Device drivers 101g can communicate with the physical interfaces 101p, providing hardware access to higher-level functions on device 101. Device drivers 101g may also be embedded into hardware or combined with the physical interfaces.

Device drivers 101g can include a SD card driver 101k, which can be utilized by a device 101 and operating system 101h in order to read and write data to storage radio unit 109, including communicating with a radio unit 109b within storage radio unit 109. SD card driver 101k can operate (i)

an SD bus or (ii) a serial peripheral interface (SPI) for physical interface 101a with SRU 109. Other device drivers and data busses than supporting an SD card can be utilized by a device 101 as well in order to communicate with an SRU 109. Additional details regarding the communication between device 101 and radio unit 109b within storage radio unit 109 are described in additional figures below, including FIG. 2b and FIG. 2d. Device 101 may preferably include an operating system 101h to manage device drivers 101g and hardware resources such as physical interface 101p and RAM 101e within device 101. The operating systems described herein can also manage other resources such as processor 101b and may support multiple software programs or software libraries operating on device 101.

The operating system 101h can include Internet protocol stacks such as a User Datagram Protocol (UDP) stack, Transmission Control Protocol (TCP) stack, a domain name system (DNS) stack, etc., and the operating system 101h may include timers and schedulers for managing the access of software to hardware resources, including storage radio unit 109. The operating system shown of 101h can be appropriate for a low-power device with limited memory and CPU resources (compared to a server 106 or 110a). Example operating systems 101h for a device 101 includes Linux, Android® from Google®, IoS from Apple®, Windows® Mobile, or Open AT® from Sierra Wireless®. Additional example operating systems 101h for device 101 include eCos, uC/OS, LiteOs, Contiki, OpenWRT, Raspbian, and other possibilities exist as well without departing from the scope of the present disclosure.

A device program 101i may be an application programmed in a language such as C, C++, Java, and/or Python, and could provide functionality to support M2M applications such as monitoring of sensors and activation or control of actuators. Device program 101i could also be a software routine, subroutine, linked library, or software device, according to one preferred embodiment. As contemplated herein, a device program 101i may be an application operating within a smartphone, such as an iPhone® or Android®-based smartphone, and in this case device 101 could comprise the smartphone. The application functioning as a device program 101i could be downloaded from an "app store" associated with the smartphone or operating system for the device 101. Note that the use of a smartphone for device 101 is not required for some exemplary embodiments.

Device program 101i can include data reporting libraries 101x, which can provide the functionality or CPU 101b instructions for (i) collecting sensor data, and (ii) sending messages such as application data 112a to SRU 109 via a structure of device write directory 191x'. In other words, a structure of device write directory 191x' is different than a device write directory 191x (from FIG. 3a below), where device write directory 191x could reside in a shared nonvolatile memory 101h, while the structure of device write directory 191x' in a data reporting libraries 101x can comprise instructions, structure, and format such that data reporting libraries 101x can write to a device write directory 191x in memory 109h.

Similarly, data reporting libraries 101x can store a structure of RU write directory 192x', where a structure is stored in 101x and the actual RU write directory 192x can reside in shared nonvolatile memory 109h. Data reporting libraries 101x can provide CPU 101b instructions for (i) reading server B response 112b data from shared nonvolatile memory 109h. Device program 101i can also include the logic for connecting with a server A 110a (via SRU 109), sending a device identity 101a to the server A 110a, receiving a challenge or nonce from server A 110a, and sending a digital signature for the challenge or nonce to the server, where the digital signature can be calculated using a certificate 110c recorded in device 101.

Note that device 101 may also optionally include user interface 101j which may include one or more devices for receiving inputs and/or one or more devices for conveying outputs. User interfaces are known in the art and generally are simple for devices such as a few LED lights or LCD or OLED display, and thus user interfaces are not described in detail here. User interface 101j could comprise a touch screen if device 101 operates as a smartphone or mobile phone. As illustrated in FIG. 1b, device 101 can optionally omit a user interface 101j, since no user input may be required for many M2M applications, although a user interface 101j could be included with device 101.

Device 101 may be a computing device that includes computer components for the purposes of collecting data from a sensor 101f or triggering an action by an actuator 101y. Device 101 may include a central processing unit (CPU) 101b, a random access memory (RAM) 101e, and a system bus 101d that couples various system components including the random access memory 101e to the processing unit 101b. The system bus 101d may be any of several types of bus structures including a memory bus or memory controller, a peripheral bus, and a local bus using any of a variety of bus architectures including a data bus. Device 101 can operate a plurality of different busses 101d such as a memory bus, an I2C bus, a USB bus, a SD bus, and a SPI bus, a serial bus with a universal asynchronous receiver-transmitter (UART), a Peripheral Component Interconnect (PCI) bus, or a Peripheral Component Interconnect Express (PCIe) bus. Other possibilities exist as well for a device 101 to use a bus 101d to connect electrical components without departing from the scope of the present disclosure.

Device 101 may include a read-only memory (ROM) 101c which can contain a boot loader program. Although ROM 101c is illustrated as "read-only memory", ROM 101c could comprise long-term memory storage chipsets or physical units that are designed primarily for writing once and reading many times, such as Electrically Erasable Programmable Read-Only Memory (EEPROM). As contemplated within the present disclosure, a read-only address could comprise an address within a read only memory such as a ROM 101c memory address or another hardware address for read-only operations accessible via bus 101d. Changing data recorded in a ROM 101c can require a technician have physical access to device 101, such as removing a cover or part of an enclosure, where the technician can subsequently connect equipment to a circuit board in device 101, including replacing ROM 101c. ROM 101c could also comprise a nonvolatile memory, such that data is stored within ROM 101c even if no electrical power is provided to ROM 101c. In exemplary embodiments, ROM 101c could be (i) optionally omitted and storage radio unit 109 used for nonvolatile memory within device 101, or (ii) included in a memory unit within CPU 101b (not shown).

Device 101 can include a storage radio unit 109, and storage radio unit 109 can be removable. Storage radio unit 109 is also depicted and described in connection with FIG. 1a above and additional details regarding storage radio unit 109 are depicted and described in connection with FIG. 1c and FIG. 2a below. Additional details for the operation of storage radio unit 109 are provided in subsequent figures. An exemplary storage radio unit 109 form factor could comprise a standard SD card, a mini SD card, a micro SD card, a mini UICC, a micro UICC, or a nano UICC, and other possibilities exist as well without departing from the scope of the present disclosure. Storage radio unit 109 could also comprise a solid state hard drive with a suitable small form factor for operation with device 101. Storage radio unit 109 can include electrical contacts (such as external pins 109x depicted in FIG. 1c) which provide electrical connectivity to bus 101d.

Storage radio unit 109 can be inserted in a housing in device 101, such that storage radio unit 109 can be manually inserted into or manually removed from device 101 after device 101 is manufactured. The manual operation of insertion of storage radio unit 109 can be performed by entities in some embodiments, such as device service provider 110 or an end user of device 101. Storage radio unit 109 can include NAND or NOR flash memory in order to record data when device 101 is not powered, and other nonvolatile memory technologies can be used in a storage radio unit 109 as well without departing from the scope of the present disclosure. Storage radio unit 109 can be separately manufactured from device 101 and accessed and loaded with data by a configuration unit 110d before insertion into device 101, when storage radio unit 109 includes support for operating as removable media. Storage radio unit 109 could also operate as an "embedded" unit, such that storage unit comprises an integrated circuit soldered to a circuit board in device 101, and in these embodiments storage radio unit 109 can be fixed and not removable.

In exemplary embodiments, storage radio unit 109 can include a radio unit 109b and an eUICC 113 (both not shown in FIG. 1b, but shown in FIG. 1c), and additional details regarding the components and operation of an eUICC 113 and radio unit 109b are depicted and described in additional figures below, including FIG. 1c and FIG. 2a. The inclusion of (i) a radio unit 109b supporting wireless WAN networks 102 and (ii) an eUICC 113, plus the operation of radio unit 109b with eUICC 113 in storage radio unit 109 can add functionality for storage unit 109 that is not normally included in commercially available removable storage media in the market as of 2018, such as SD cards or UICC cards.

Both radio unit 109b and eUICC 113 within storage unit 109 can include a processor, bus, and memory similar (but with less power and on a smaller scale) as the CPU 101b, bus 101d, and RAM 101e and ROM 101c. Both eUICC 113 and SRU 109 can perform cryptographic functions such as (i) internally deriving a private key, recording a private key, or deriving a symmetric key via an elliptic curve Diffie Hellman (ECDH) key exchange, (ii) recording the private key in a protected memory such that device 101 or external parties cannot feasibly or cost-effectively read the private key or derived symmetric key, and (iii) generating or verifying digital signatures using a recorded private key.

Although the exemplary environment described herein employs ROM 101c, RAM 101e, and storage radio unit 109, it should be appreciated by those skilled in the art that storage radio unit 109 could also comprise other types of computer readable media which can store data that is accessible by a device 101, such as memory cards, subscriber identity device (SIM) cards, local miniaturized hard disks, and the like, may also be used in the exemplary operating environment without departing from the scope of the disclosure. The memory and associated hardware illustrated in FIG. 1b provide nonvolatile storage of computer-executable instructions, data structures, program devices, device program 101i, and other data for computer or device 101.

Note the device 101 may include a physical data connection at the physical interface 101a such as a miniaturized universal serial bus adapter, firewire, optical, or other another port and the computer executable instructions such as device program 101i, data reporting steps 101x, operating system 101h, or device driver 101g can be initially loaded into memory such as ROM 101c or storage radio unit 109 through the physical interface 101a before device 101 is given to an end user, shipped by a manufacturer to a distribution channel, or installed by a technician. Further, device program 101i, data reporting steps 101x, operating system 101h, or device driver 101g can be separately loaded into storage radio unit 109 before or after distribution of device 101, and then storage radio unit 109 can be inserted into device 101.

A number of program devices may be stored in RAM 101e, ROM 101c, or storage radio unit 109, including an operating system 101h, device driver 101g, an http client (not shown), a DNS client, and related software. Storage radio unit 109 can record program devices as well within boot firmware, boot configuration, or operating software for storage radio unit 109, which is further depicted and described in connection with FIG. 1c and FIG. 2a, where the program devices in SRU 109 may be focused on storage within a nonvolatile memory 109a and a radio unit 109b. Program devices include routines, sub-routines, programs, objects, components, data structures, etc., which perform particular tasks or implement particular abstract data types. Aspects of the present disclosure may be implemented in the form of (i) a device program 101i and/or data reporting libraries 101x which are executed by the device 101 working in conjunction with (ii) firmware on storage radio unit 109 (depicted as SRU firmware 109u in FIG. 1c and FIG. 2a) to support communications of device 101 with a wireless network 102 and device service provider 110 through SRU 109 with RU 109b.

A user may enter commands and information into device 101 through an optional user interface 101j, such as a keypad, keyboard (possibly miniaturized for a mobile phone form-factor), and a pointing device. Pointing devices may include a trackball, an electronic pen, or a touch screen. A user interface 101j may also include a display such as a device screen. A display may also be connected to system bus 101d via an interface. The display can comprise any type of display devices such as a liquid crystal display (LCD), a plasma display, and an organic light-emitting diode (OLED) display. Device 101 may also include a camera (not shown) connected to or integrated with device 101 through a physical interface 101a, and the camera can comprise a video camera for the device 101 to collect sensor data that includes video or images. The camera (not shown) can be a CCD (charge-coupled device) camera, a CMOS (complementary metal-oxide-semiconductor) camera, or a similar device to collect video input. Other arrangements could be used as well, without departing from the disclosure.

The device 101, comprising a computer, may operate in a networked environment using logical connections to one or more remote computers, such as the servers 108 and 110a illustrated in FIG. 1a. Servers 108 and 110a can also function as general purpose servers to provide files, programs, disk storage, remote memory, database records, cryptographic data, and other resources to device 101 usually through a networked connection such as via wireless network 102 and IP network 111. Additional remote computers with which device 101 communicates may include another device 101 or mobile device, an M2M node within a capillary network, a personal computer, other servers, a client, a router, a network PC, a peer device, a wireless network 102, an access point, or other common network node. A server 108 or 110a or a remote computer typically includes many of the elements described above relative to the device 101, including a CPU, memory, and physical interfaces. It will be appreciated that the network connections shown throughout the present disclosure are exemplary and other means of establishing a wireless or wired communications link may be used between mobile devices, computers, servers, corresponding nodes, and similar computers.

The device program 101i and data reporting libraries 101x operating within device 101 illustrated in FIG. 1b can provide computer executable instructions to hardware such as CPU 101b through a system bus 101d in order for a device 101 to (i) transmit and receive data with a device service provider 110, (ii) monitor a sensor 101f and/or change the state of an actuator 101y, (iii) send or receive data with a server B 110a, and (iv) authenticate with a server B 110a or SRU service provider 106, thus allowing server B 110a to remotely monitor or control a monitored unit 105 in an authenticated and secure manner. The device program 101i and/or data reporting steps 101x can enable the device 101 to authenticate and communicate with a server B 110b (via SRU 109 and server A 108) by recording data in memory such as RAM 101e, where the data can include sensor data, a destination IP address number such as the exemplary IP address number 110e in FIG. 1a, a packet or packet header value, an encryption or ciphering algorithm and key, a digital signature and public key, etc. The data recorded in RAM 101e can be subsequently read by the operating system 101h or the device driver 101g.

The operating system 101h or the device driver 101g can write the data to a physical interface 101a comprising electrical pins 109x on SRU 109 using a system bus 101d in order to use a physical interface 101a to send application data 112a to SRU 109 and radio unit 109b and wireless network 102. Alternatively, the device program 101i and/or data reporting steps 101x can write the application data 112a directly to the SRU 109 using the system bus 101d.

The device program 101i and/or data reporting steps 101x, or operating system 101h can include steps to process the data recorded in memory such as logging data, selecting a destination address, or encoding sensor data acquired by (i) a sensor 101f or (ii) through a physical interface 101a such as a thermocouple, shock or vibration sensor, light sensor, or global positioning system (GPS) receiver, etc. The device 101 can use the physical interface 101a such as a radio to transmit or send (i) the application data 112a from a sensor or (ii) a digital signature of device 101 for application data 112a to SRU 109, where SRU 109 includes a radio unit 109b to send the application data to server A 108 via wireless network 102.

Moreover, those skilled in the art will appreciate that the present disclosure may be implemented in other computer system configurations, including hand-held devices, netbooks, portable computers, multiprocessor systems, microprocessor based or programmable consumer electronics, network personal computers, minicomputers, mainframe computers, servers, and the like. The disclosure may also be practiced in distributed computing environments, where tasks are performed by remote processing devices that are linked through a communications network. In a distributed computing environment, program devices may be located in both local and remote memory storage devices. In addition, the terms "mobile node", "mobile station", "mobile device", "M2M device", "M2M device", "networked sensor", or "industrial controller" can be used to refer to device 101 as contemplated herein.

FIG. 1c

FIG. 1c is a graphical illustration of hardware, firmware, and software components for a device and a storage radio unit, in accordance with exemplary embodiments. The illustrated exemplary components for a device 101 in FIG. 1c can include a device identity 101a, a device clock 101m, a battery 101n, a WiFi radio 101z, a device antenna 101t, a device service provider certificate 110c, and storage radio unit 109. Device identity 101a can be a unique string or numeric identifier for device 101, such as an international mobile equipment identity (IMEI), a MAC (media access control) address, a manufactured serial number, or similar identifier. Battery 101n for device 101 can store electrical energy such that device 101 can be powered when disconnected from an external power source. Clock 101m can be a clock source such as a TCXO or VCTXO to provide a timing source for (i) CPU 101b and bus 101d as well as (ii) SD card driver 101k or other device drivers 101k.

WiFi radio 101z can be a radio module supporting wireless local area network (LAN) connections via standards such as 802.11 from the IEEE. Device antenna 101t can transmit and receive radio frequency signals with other nodes or devices, such as a WiFi router or other devices via WiFi direct. In exemplary embodiments, device antenna supports ultra-high frequency signals in the range of 400 MHz to 6 GHz. Device antenna 101t can have impedance that matches a radio such as 50 ohms. In some exemplary embodiments, device antenna 101t is connected to SRU 109 via electrical pins 109x, such as pins 1 and 8 as shown in FIG. 2a, where pins 1 and 8 are not used the 1-bit SD bus mode. Or SRU 109 could include electrical pins or connectors (separate from electrical ping 109x for an SD bus), such as with an external antenna interface 109z depicted and described in connection with FIG. 2a. Although the term "SD bus" is used in the present disclosure, other bus technologies can be used for SRU 109 could include versions of a UHS bus, an SD express bus, as well as future, related versions of these bus technologies for removable storage media. Further, although the term "SD card" or "micro SD card" is used for some embodiments of the present disclosure, related card technologies could be use such as cards supporting SDHC, SDXC, SDUC, and subsequent or related versions.

The illustrated components for a storage unit 109 in FIG. 1c can include external pins 109x, an SD interface driver 109y, a radio unit 109b, an internal antenna 109t, a storage radio unit identity (SRU-ID) 109i, a power control unit 109e, a memory/interface processor 109d, an eUICC 113, a memory core interface 109m, an interface to an external antennal 109z, a nonvolatile memory 109a, a memory controller 115, and a symmetric key 127a. The external pins 109x of storage radio unit 109 can provide an electrical interface for storage radio unit 109 to connect with a bus 101d of device 101, such that a CPU 101b of device 101 can communicate with the internal elements of storage radio unit 109, using SD card driver 101k.

Note that the use of an SD card and SD bus is not required for storage radio unit 109, and other formats are possible as well, such as storage radio unit 109 comprising an integrated circuit with a PCIe bus or a SPI bus, etc. As mentioned two paragraphs above, other bus technologies for SRU 109 include a version of UHS and SD Express. An SD card can include SDXC, SDUC, SDHC, or future, related versions, and other possibilities exist as well. For the embodiments which do not use SD card formats, then "SD card driver 101*k*" and "SD interface driver 109*y*" could comprise drivers appropriate for the physical form of storage radio unit 109 (such as possibly using a PCIe interface with a PCIe driver or similar). The external pins 109*x* can include pads or electrical contacts for electrical input into storage radio unit 109 and such as a power voltage, electrical ground, a clock input, and data lines to communicate binary data. The external pins 109*x* can support electrical output from storage unit 109 as well. Exemplary details for pins 109*x* are depicted and described in connection with FIG. 2*a* below.

In exemplary embodiments, the interface to an external antenna 109*z* can comprise a female receptacle for the SD card on the opposite side of the electrical pins 109*x*. The interface to an external antenna 109*z* can receive 2× male pin connectors preferably less than 0.6 mm in diameter (in order to support the height of a micro SD card), and also a pitch between the center of the 2 pins of less than 2.5 mm in order to reduce space used inside the SRU 109 housing. The length of the male pins can be less than 5 mm in exemplary embodiments. Or, in other exemplary embodiments, the interface to an external antenna 109*z* can comprise a standard connector on the outside of the SD card housing 227 (depicted in FIG. 2*a* below), such as the male receptacle for an u.fl antenna connection. The interface of the external antenna 109*z* can comprise a connector both (i) mounted on the opposite side/face as pins 109*x* and also (ii) on the other end of a housing 227 (shown in FIG. 2*a* below) as pins 109*x*.

In an exemplary embodiment, the external pins of storage unit 109 could support an SD bus or a serial peripheral interface (SPI) bus mode with a micro SD card, such that pin 6 would be ground, pin 4 would be power, pin 3 would be serial data in, pin 7 would be serial data out, pin 5 would be a clock signal, etc. Other possibilities exist as well for the possible pin layouts and bus supported by the external pins 109*x* of an SD card, such as a one-bit SD bus mode or a four-bit SD bus mode. If storage unit 109 comprises a UICC, then the PIN layout of external pins 109*x* could comply with 3GPP standards and the interface, such as standard 3GPP TS 31.102. In another embodiment, external pins 109*x* can support either (i) a parallel bus such as a member of the Peripheral Component Interconnect (PCI) standards or a Peripheral Component Interconnect Express (PCIe) standard, or (ii) other serial interfaces such as a universal serial bus (USB).

Interface driver 109*y* within storage unit 109 can provide or be associated with the firmware to support the selected physical bus type and communications protocol for the external pins 109*x*. The interface driver 109*y* can provide functionality similar to device driver 101*k* or 101*g* in FIG. 1*b*. For example, interface driver 109*y* could support one-bit or four-bit SD bus mode for data transfer between (i) the memory/interface processor 109*d* in SRU 109 and (ii) CPU 101*b* in device 101, and other possibilities exist as well. The memory/interface processor 109*d* can comprise a processor similar to CPU 101*b*, but embedded into the storage radio unit 109 and consequently potentially with less resources than a CPU 101*b*, such as (i) less cache memory, (ii) operating potentially at a slower speed or clock rate, (iii) fewer internal registers, (iv) lower power consumption due to reduced thermal dissipation for a storage radio unit 109 compared to device 101, etc. Memory/interface processor 109*d* can also manage and sequence the flow of data between non-volatile memory 109*a* and the external pins 109*x*, among other functions such as receiving updated data for radio unit 109*b* through external pins 109*x*.

As of 2018, and for the foreseeable future, large capacity removable storage media, such as SD cards or micro SD cards with a gigabyte of memory or more, can include non-volatile memory such as non-volatile memory 109*a*. Properly managing reading and writing to the non-volatile memory 109*a* can require relatively computationally intensive operations to be performed inside the removable storage media such as an SD card or storage radio unit 109. These operations performed by memory/interface processor 109*d* include (i) error correcting codes to reduce or eliminate bit errors in nonvolatile memory 109*a*, (ii) leveling write wearing in order to spread the number of data writes as uniformly as possible across the physical memory 109*a*, (iii) registers and tables to keep track of memory, block and page addresses in order to perform operations such as reads and writes to a memory core interface 109*m*, etc.

These operations can be relatively computationally intensive for a small form factor storage unit such as a micro SD card and can comprise thousands of machine code instructions for a single operation of (i) selecting a page of physical memory within a block of memory, (ii) reading the selected page of physical memory, (iii) error correcting the data read and also write the error corrections back to the physical memory, and (iv) transferring the data through electrical pins 109*x* via interface driver 109*y*. The above exemplary operations be performed by a processor or multiple processors embedded in the storage unit 109 in the form of a memory/interface processor 109*d*. Exemplary microcontrollers embedded in an SRU 109 include modified versions of an 8051 processor or an ARM® processor, such as an exemplary processor that is a member of the ARM® Cortex M family of processors, and other possibilities exist as well without departing from the scope of the present disclosure. As contemplated herein, memory/interface processor 109*d* can be referred to as "processor 109*d*", "controller 109*d*", or "memory controller 109*d*" or "interface controller 109*d*".

Secret symmetric key 127*a* within SRU 109 can be a secret key for use with symmetric ciphering algorithms. In exemplary embodiments, secret symmetric key 127*a* can be uniquely associated with SRU 109 using SRU-ID 109*i* and can also be loaded in storage radio unit 109 either (i) upon manufacturing of storage radio unit 109, or (ii) before distribution of storage radio unit 109 such that symmetric key 127*a* cannot be subsequently changed or altered after symmetric key 127*a* is recorded in storage unit 109. A SRU 109 can record multiple secret symmetric keys 127*a*, such (A) that a first key 127*a* remains permanently recorded in SRU 109 before installation of SRU 109 with a device 101, while (B) subsequent keys 127*a* could be recorded in SRU 109 after distribution of storage radio unit 109. As one example, SRU 109 could conduct an ECDH key exchange with SRU-SP 106 using (i) a private key from SRU PKI keys 109*p* and (ii) a public key from SRU-SP such as public key 106*b* corresponding to key 106*a* in order to derive a subsequent, second key 127*a* for use with encrypting and decrypting application data with SRU-SP 106. In other words, these subsequent symmetric keys 127*a* could be changed or altered after the first symmetric key 127*a* was written before distribution of storage unit 109.

Symmetric key 127*a* or 127*b* in FIG. 1*c* could comprise a pseudo random number or random number of sufficient length such as an exemplary 128 or 256 bits, such that output of a symmetric ciphering algorithm such as the Advanced Encryption Standard (AES) could not feasibly be decrypted without the use of a symmetric key 127*a* or 127*b*. Among many possible uses for symmetric key 127*a* in the present disclosure, symmetric key 127*a* could be utilized to decrypt SRU unit firmware 109u, where symmetric key 127a was used to encrypt the SRU firmware 109u before SRU firmware 109u was loaded into storage unit 109. In this manner, SRU unit firmware 109u can be resistant to reading or tampering by end users or other external parties other than the manufacturer of SRU 109 or authorized parties who also have symmetric key 127a. A symmetric key 127a could also be derived from the network access credentials, such as a key K associated with an IMSI or SUPI, in order to encrypt application data 112a transferred to Server A 108.

Storage radio unit 109 can also include a memory core interface 109m, where memory core interface 109m provides processor 109d and/or radio unit 109b access to physical memory such as non-volatile memory 101a and/or RAM 213 (not shown in FIG. 1c but depicted and described in connection with FIG. 2a below). Controller 109d and/or radio unit 109b can read data from physical memory by writing an address of a memory page and/or block to memory core interface 109m, and memory core interface 109m returns the data from the page in physical nonvolatile memory 109a or RAM 213.

Similarly, memory processor 109d and/or radio unit 109b can write data from physical memory by writing an address of a memory block and/or page to memory core interface 109m plus the data to be recorded in physical memory, and memory core interface 109m can subsequently write the data to physical memory at the block and page address specified. Other possibilities exist as well for the use of a memory core interface 109m without departing from the scope of the present disclosure. In exemplary embodiments, individual cells within a page can be addressed by a memory core interface 109m as well, and other possibilities for the structure and naming conventions of memory are possible without departing from the scope of the present disclosure.

Storage radio unit 109 can include radio unit 109b, where radio unit 109b was also depicted and described in connection with FIG. 1a above, and additional details regarding radio unit 109b are depicted and described in connection with FIG. 2a below. Radio unit 109b can include radio processor 109c for controlling radio unit 109b, where processor 109c can be similar to (a) CPU 101b for device 101 from FIG. 1b, or (b) memory/interface processor 109d described above. Radio processor 109c can be referred to herein as "processor 109c". The processor 109c in radio unit 109b can function similar to processor 109d for SRU 109 as described above, with a form factor, speed, and computational capacity suitable for radio unit 109b. Processor 109c in radio unit 109b could be a processor belonging to the exemplary MIPS®, ARM®, or Intel® family of processors, and other possibilities exist as well.

Symmetric key 127b can be equivalent to symmetric key 127a for SRU 109 described above. In exemplary embodiments, a first symmetric key 127b can be used with a TLS-PSK session with SM-SR 107, and in this embodiment the first symmetric key 127b can be recorded in eUICC 113. In addition, a second symmetric key 127b can be used with a DTLS-PSK session with server A 108, where application data 112a is encrypted with the second symmetric key 127g and a symmetric ciphering algorithms, and server B response 112b data is decrypted with the second symmetric key 127b and the symmetric ciphering algorithm. Thus, a radio unit 109b can also operate with multiple symmetric keys 127b, and the multiple pre-shared secret symmetric keys 127b can also include or each be associated with a MAC key, where a MAC key is depicted and described in connection with FIG. 4b below. A symmetric key 127b can also separately be used to encrypt and decrypt data for radio unit 109b which is stored in memory 109r.

Processor 109c can include components such as registers, accumulators, and logic elements to add, subtract, multiply, and divide numerical values, and processor 109c can be connected to an internal bus 212 for SRU 109 depicted in FIG. 2a below. The timing of processor 109c by an internal clock for SRU 109 as RF clock 205 depicted in FIG. 2a below. Note that in some exemplary embodiments, the timing of processor 109c is not driven by device clock 101m (which can be less precise than requirements for NB-IoT communications 104 in FIG. 1a), and rather processor 109c is driven by a separate, internal clock 205 within SRU 109. Processor 109c can provide (i) the hardware for radio unit 109b to perform calculations for radio communications with wireless network 102 in addition to (ii) the general operation of radio unit 109b and managing communication between radio unit 109b and other components within SRU 109 via an internal bus 212 of SRU 109 (shown in FIG. 2a below). Although processor 109c is depicted in FIG. 1c as internal to radio unit 109b, processor 109c could be external to radio unit 109b. Further, in some exemplary embodiments, processor 109d and processor 109c could be combined into a single processor. For these embodiments, the combined processor could have the functionality of the separate processors 109d and 109c depicted in FIG. 1c.

The storage radio unit identity (SRU-ID) 109i can comprise a globally unique identifier for SRU 109, such that nodes communicating with device 101 using storage radio unit 109 can properly identify SRU 109 using the SRU-ID 109i. SRU ID 109i can be a string or a number, such as a hexadecimal number with sufficient length such as an exemplary 8 bytes of data for the SRU-ID 109i, although other possibilities exist as well without departing from the scope of the present disclosure. In exemplary embodiments, SRU-ID 109i can be written to hardware such as an EEPROM in SRU 109 upon manufacturing of SRU 109 or configuration by an SRU-SP 106 and SRU-ID 109i is not normally modified or changed after distribution of SRU 109 from an SRU-SP 106 or receipt of SRU 109 by a user. Other possibilities exist as well for the format, recording location, and use of a SRU-ID 109i without departing from the scope of the present disclosure. In exemplary embodiments, SRU-ID 109i can be written to protected memory or a hardware address within SRU 109 such that a device 101 could not feasibly modify or change the SRU-ID 109i.

eUICC 113 in SRU 109 can comprise an embedded universal integrated circuit card supporting standards such as GSMA SGP.02 or GSMA SGP.22, including subsequent or related versions of these standards. For embodiments where eUICC 113 supports standard SGP.22, then device 101 could operate a local profile assistant (LPA) as an application in device programs 101i, and the eUICC interface family ES10 from SGP.22 could be passed to eUICC 113 via electrical pins 109x. eUICC 113 was also depicted and described above in connection with FIG. 1a. eUICC 113 can include an eUICC ID 113a in order to unique identify eUICC 113 across a plurality of globally distributed eUICCs. Although not depicted in FIG. 1c, eUICC 113 can record a set of ECC PKI keys for both eUICC and at least one certificate authority. In exemplary embodiments, eUICC 113 records a root certificate for the GSMA for eUICC operations, which eUICC 113 can use to authenticate an SM-DP. eUICC 113 includes a set of cryptographic algorithms for conducting ECDH key exchanges, symmetric ciphering, and digital signature algorithms using elliptic curve cryptography. eUICC 113 can establish a TLS session with SM-SR 107 using a pre-shared secret key (PSK), which could comprise a symmetric ciphering key 127b recorded within eUICC 113 and also be associated with SM-SR configuration data 113b.

As depicted in FIG. 1c, eUICC 113 also records SM-SR configuration data 113b, which could include an IP address, domain name, and domain name service (DNS) server IP address in order for the eUICC 113 to resolve a name for SM-SR 107 into an IP address equivalent to IP address 110e depicted in FIG. 1a. SM-SR configuration data 113b could also include a PSK for use with a TLS session with SM-SR 107, where the PSK can be a symmetric ciphering key 127b and an associated MAC key (where a MAC key is depicted and described in connection with FIG. 4b). eUICC 113 can communicate internally with radio unit 109b using an internal bus 212 as depicted and described in connection with FIG. 2a below.

eUICC 113 can record a bootstrap profile 113c, which can include information equivalent to that recorded in a traditional SIM card for connection to a first wireless network 102. eUICC 113 can record an operational profile 113d, which can include information equivalent to that recorded in a traditional SIM card for connection to a second wireless network 102. Or, the bootstrap profile 113c could be used by RU 109b to connect with the second wireless network 102 in a "roaming" mode, and the operational profile 113c could be used by RU 109b to connect with the second wireless network 102 in a "native" mode or with credentials or key K also recorded by the second wireless network 102. The bootstrap profile 113c can be used in a startup or "initial" or "failover" state for eUICC 113 and radio unit 109b, such that connectivity to wireless network 102 could be obtained if a working operational profile 113d is not available for eUICC 113. Operational profile 113d can be used by eUICC 113 and radio unit 109b for preferred operation of device 101 within a wireless network 102.

Although illustrated as a separate unit from radio unit 109b in FIG. 1c, in exemplary embodiments, eUICC 113 could also be optionally combined with radio unit 109b or processor 109c (where processor 109c could also be combined with processor 109d). In other words, a single physical processor similar to CPU 101b could perform the function of radio processor 109c and eUICC 113. eUICC 113 could comprise also a trusted execution environment (TEE), "secure processing environment", "smart secure platform" or similar secured environment within a larger, more generalized processor such as processor 109c.

Non-volatile memory 109a in storage radio unit 109 can include device and SRU accessible nonvolatile memory 109f and SRU only accessible nonvolatile memory 109r. The two types of memory can be identified by separate addresses within the physical memory comprising non-volatile memory 109f, or similarly different sectors assigned by a file system written to the physical nonvolatile memory. Further, memory 109f and 109r could represent different partitions within a memory 109a, where memory 109a has been formatted with a file system. In an exemplary embodiment the two types of memory 109f and 109r can be segmented logically, where memory 109r is encrypted with a symmetric key 127a within SRU 109 by a memory controller 115, where memory controller 115 is also depicted and described in connection with FIG. 2a below.

Device and SRU accessible memory 109f can include shared nonvolatile memory 109h and device general memory 109g. Device general memory 109g can comprise memory that device 101 can access in non-volatile memory 109a such as recording firmware for device 101 or other long-term and non-volatile storage of data or files for device 101. In exemplary embodiments, operating system 101h for device 101 can be recorded in device general memory 109g. Device and SRU accessible memory 109f can record a file system for both device 101 and SRU 109 to access, such as exemplary file systems of FAT16, FAT 32, NTFS, ext3, ext4, UDF, and other file systems for memory 109g and memory 109h are possible as well without departing from the scope of the present disclosure.

As contemplated herein, memory 109f can represent physical memory cells within a nonvolatile memory 109a, and memory 109f and memory 109r can represent separate file systems or logical and secure separation of memory 109f and 109r. In exemplary embodiments, a file system within memory 109f can be specified as compatible with a file system for OS 101h for device 101, while a file system within memory 109r can be a different file system and file system type preferred for internal use by SRU 109. For an exemplary embodiment, the file system type for memory 109f can comprise a FAT32 or exFAT file system, and memory 109r can comprise a JFFS2 or ext2 file system. Other possibilities exist as well regarding the use of a file system for memory 109f and memory 109r, without departing from the scope of the present disclosure. Additional details regarding the format, structure, and files within nonvolatile memory 109a and 109h will be described below in connection with FIGS. 2a, 2b, 2e, and 2f, as well as other descriptions herein.

Shared memory 109h in nonvolatile memory 109f can include memory accessible by both a device 101 and SRU 109, such as a portion of a file system recorded in memory 109f. Exemplary use of device and SRU shared memory 109h is depicted and described in connection with FIG. 2a below. In exemplary embodiments, both device 101 and SRU 109 can both read and write to device and SRU shared nonvolatile memory 109h, which can also be referenced herein as shared nonvolatile memory 109h or shared memory 109h. As illustrated in FIG. 1c, shared memory 109h can be a subset of device and SRU accessible memory 109f, and device and SRU accessible memory 109f can also include general memory 109g for device 101. Note that (i) RU 109b can read and write directly to shared memory 109h, or (ii) RU 109b can read and write to shared memory 109h through a memory processor 109d in SRU 109. In other words, for (ii) RU 109b could communicate to memory processor 109d via an internal bus, and processor 109d could read and write to memory 109h on behalf of RU 109b.

In exemplary embodiments, the SRU 109 may have access to general memory 101g, such as to support commands or instructions from SRU-SP 106, or device 101, or device service provider 110, which could comprise instructions to fix memory, reallocate file space or structure, or other system administration operations. However, without outside instruction to SRU 109 from device 101 or SRU-SP 106 or device service provider 110, in regular operating modes SRU 109 may preferably not use memory 109g for the internal operation of SRU 109, where memory 109g can comprise memory and files for general nonvolatile storage of data for device 101. In exemplary embodiments, memory 109h can comprise a first directory within a file system for memory 109f and memory 109g for device 101 can comprise a second directory within a file system for memory 109f. Other possibilities for the configuration of a nonvolatile memory 109a are possible as well, such that storage radio unit 109 can provide nonvolatile memory (i) dedicated to device 101, (ii) dedicated to SRU 109, and (iii) shared between device 101 and SRU 109 for communicating data between device 101 and RU 109b, without departing from the scope of the present disclosure.

Data utilized by radio unit 109b may logically or physically separated for use by radio unit 109b and processor 109c or processor 109d through the use a memory controller 115. The data used by radio unit 109b and processors 109c and 109d can be recorded in SRU only accessible nonvolatile memory 109r. As contemplated herein, SRU only accessible nonvolatile memory 109r can be also be referred to as "SRU memory 109r", "SRU 109 protected memory 109r", "SRU accessible memory 109r", or "protected memory 109r".

Memory controller 115 can provide physical or logical isolation of SRU 109 only accessible memory 109r such that device 101 could not read or write to SRU only accessible memory 109r. Memory controller 115 could prevent device 101 from reading or writing data to SRU 109 only accessible memory 109r. As one example, the physical memory in storage unit 109 comprising non-volatile memory 109a could have a portion of the physical addresses reserved for reading and writing by SRU 109 only, such as an exemplary top 50 blocks of non-volatile memory 109a, and other values are possible as well. Memory controller 115 could intentionally disallow the transfer of data from or to non-volatile memory 109r with external bus 202, where the block address is in the exemplary top 50 blocks.

Memory controller 115 could also operate on a lower level than a block address for non-volatile memory 109a as well, such as only allowing SRU 109 or processor 109c and processor 109d to allow a specified range of pages within non-volatile memory 109a, where the specified range of pages could belong to SRU only accessible memory 109r. In this manner, memory controller 115 could operate as a firewall to restrict access to SRU only accessible memory 109r. Other possibilities exist as well for the operation of a memory controller 115 in order to isolate and separate SRU only accessible memory 109r such that interface controller 109d or device 101 cannot utilize physical memory addresses for recording and reading data utilized in a RU only accessible memory 109g.

In another embodiment, memory controller 115 could perform hardware-based encryption/decryption using (i) a symmetric key 127b to encrypt and decrypt data transferred between RU 109b and SRU only accessible memory 109r, or (ii) symmetric key 127a to encrypt and decrypt data transferred between processor 109d and SRU memory 109r. In an exemplary embodiment, SRU only accessible memory 109r can be formatted with a file system with a separate partition from the memory that device 101 accesses within memory 109f. A file system on SRU only accessible memory 109r could be encrypted using a symmetric ciphering algorithm (from cryptographic algorithms 109q) and (i) a symmetric key 127b recorded by RU 109b or (ii) symmetric key 127a used by processor 109d, such that even if RU only accessible memory 109r could be accessed by device 101, no useful data could be extracted or tampered with (since symmetric keys 127a and 127b could also include MAC keys for data integrity). Although memory controller 115 is depicted in FIG. 1c as a separate element from memory core interface 109m, memory controller 115 could also be optionally integrated with memory core interface 109m, and other possibilities exist as well for the operation and location of a memory controller 115 for ciphering data or restricting access to data recorded in storage unit 109 for SRU 109 with protected memory 109r, without departing from the scope of the present disclosure.

As depicted in FIG. 1c, SRU memory 109r can include a radio unit AT control stack 109s, SRU firmware 109u, PKI keys 109v, and cryptographic algorithms 109q. Other data for the operation of SRU 109 and radio unit 109b can be recorded in SRU memory 109r as well, such as the exemplary data depicted and described below for protected memory 109r in FIG. 2a. AT control stack 109s can comprise software and firmware for SRU 109 and processor 109d to operate as an AT client for radio unit 109b, where processor 109c operates as an AT host for radio unit 109b. As of 2018, most commercially available radio modules for devices such as an RU 109b may be driven or operated with an AT command set.

An SRU 109 could include a commercially available radio unit 109b or similarly a module (possibly as a wafer level chip scale package) in order to fit within a micro SD card or SRU 109 with a housing 227 from FIG. 2a below. A commercially available module for RU 109b may require AT command sets such as those specified by 3GPP in TS 27.007. Consequently, in order to utilize a commercially available module for radio unit 109b, SRU 109 could record radio unit AT control stack 109s. For embodiments where AT command controls are not utilized by radio unit 109b, then SRU 109 could record and use the client-side commands and instructions in stack 109s.

SRU firmware 109u can comprise the firmware, software, operating system, and various libraries or packages for SRU 109 to operate after a boot process. Additional details regarding SRU firmware 109u are provided in FIG. 2e below. PKI keys 109v can record private keys for use by SRU 109 and RU 109b, such as a SRU private key SRU SK 109p from FIG. 1a and public keys for SRU-SP 106 such as SRU-SP PK 106b. PKI keys 109v can include multiple PKI keys, such as a public key for SRU-SP 106 to use with code verification or signatures on SRU firmware 109u. In other words, SRU-SP 106 could provide or record the firmware 109u with a digital signature, and SRU 109 could verify the digital signature using a public key from SRU-SP 106 in memory 109r. PKI keys 109v could also record ephemeral PKI keys derived by SRU 109 or RU 109b. PKI keys 109v could also record a public key for SRU 109 for use by device 101 or SRU-SP 106 or device service provider 110, such as SRU public key SRU PK 109w, and SRU PK 109w could be recorded with a certificate for SRU 109. PKI keys 109v can also record a set of cryptographic parameters 191e or cryptographic settings 192e (depicted in FIG. 2b below and later figures as well, such as FIG. 4b).

Figure 2A:
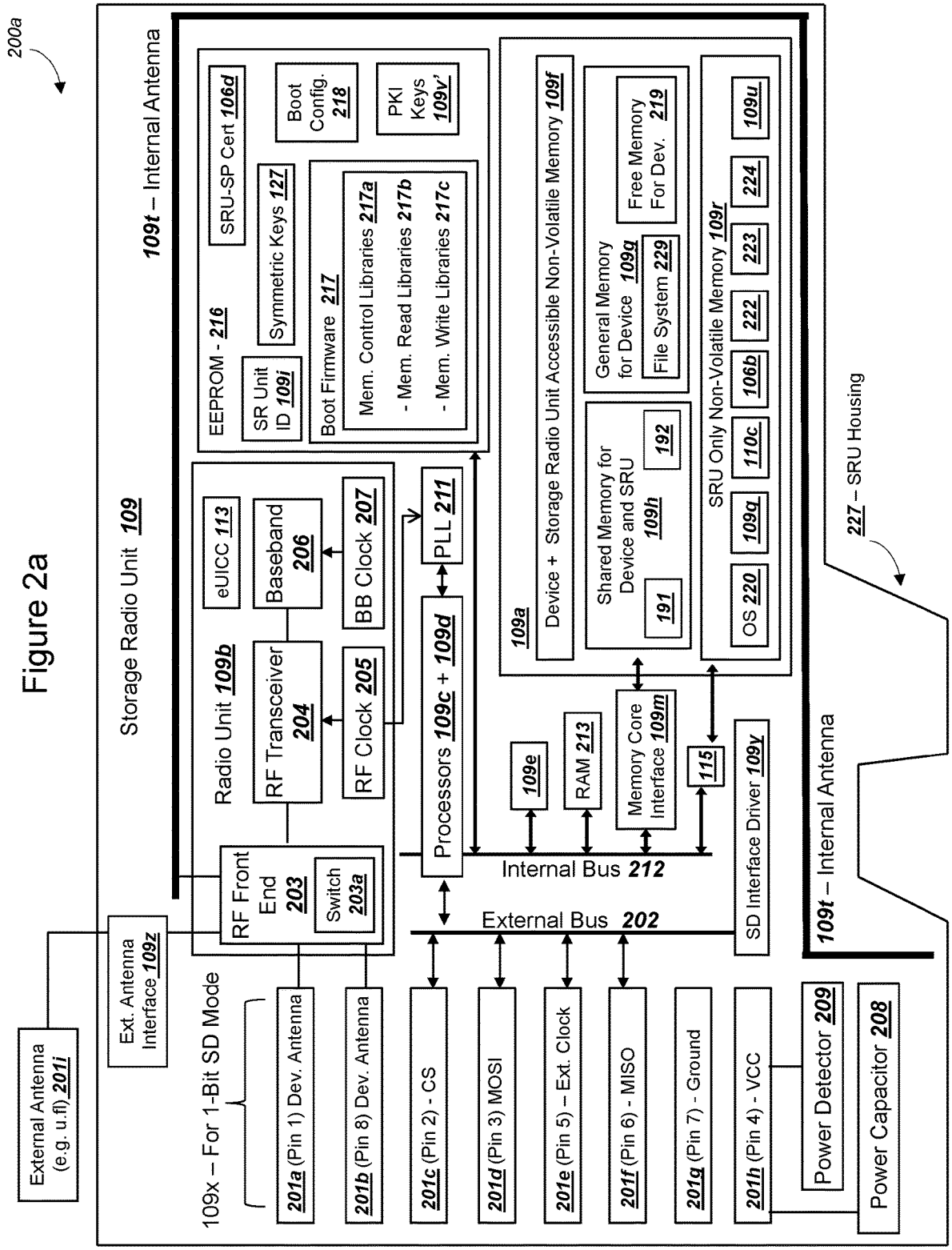
FIG. 2a is a graphical illustration of components within a storage radio unit, in accordance with exemplary embodiments.

In exemplary embodiments, initial PKI keys for SRU 109 (such as keys 109p and 106b, as well as associated certificates and certificate issuer root certificates) may be recorded in EEPROM as shown in FIG. 2a, and subsequent or updated versions of the keys can be recorded in memory 109r. PKI keys 109v can also record a set of root certificates for SRU 109 to use with verification of certificate authority digital signatures for certificates such as certificate 110c. Root certificates recorded in PKI keys 109v can comprise the list or a subset of the list of included root certificates from the Mozilla Foundation with Mozilla projects, where the aggregate list of community approved root certificates and associated parameters is in the widely distributed file certdata.txt from the Mozilla web site.

Cryptographic algorithms 109q in memory 109r can comprise digital signature algorithms such as ECDSA or DSA, symmetric ciphering algorithms such as AES and TripleDES, key exchange algorithms, key pair generation algorithms, random number generators, secure hash algorithms such as SHA-2 or SHA-3, and asymmetric ciphering algorithms such as El gamal or RSA. Libraries in cryptographic algorithms 109q could be from standard open source libraries such as OpenSSL, crypto++, Bouncy Castle, or Mozilla libraries from Network Security Services, and other possibilities exist as well.

FIG. 2a

FIG. 2a is a graphical illustration of components within a storage radio unit, in accordance with exemplary embodiments. FIG. 2a depicts additional details for a radio unit 109b and storage radio unit 109 illustrated in FIG. 1c. A system 200a can comprise a SRU 109 and an external antenna 201i. Note that external antenna 201i could be within device 101 and could also be the same as a device antenna 101t. Storage radio unit 109 can include nonvolatile storage memory 109a, radio unit 109b, eUICC 113, phased loop logic (PLL) 211, memory core interface 109m, memory/interface processor 109d, radio processor 109c, external data bus 202, an internal bus 212, electrical pins 109x, power detector 209, power capacitor 208, RAM memory 213, memory controller 115, EEPROM 216, internal antenna 109t, interface to external antenna 109z, and SD driver 109y, and power control unit 109e. Storage radio unit 109 can be enclosed in an SRU housing 227, where SRU housing 227 can be compatible with standard physical housings such as a standard SD card, a micro SD card, a mini UICC, or possibly an integrated circuit package. FIG. 2a also depicts an external antenna 201i which can be connected to the interface to external antenna 109z. Although radio processor 109c is depicted external to radio unit 109b in FIG. 2a, radio processor 109c could also comprise a logical or physical component in radio unit 109b. Or, the function of radio processor 109c and memory/interface processor 109d could be combined into a single processor.

Electrical pins 109x are depicted as the pins for a micro SD card supporting 1 bit SD bus mode, although other possibilities exist as well for the physical electrical connections for SRU 109. Electrical pins 109x can comprise pin 1 201a and pin 8 201b for connection to a device antenna such as device antenna 101t in FIG. 1c, pin 2 201c for chip select (CS), pin 3 201d for data input (MOSI) to SRU 109, pin 5 201e clock input from an clock in device 101 such as clock 101m, pin 6 201f for data output (MISO) from SRU 109, pin 7 201g for electrical ground, and pin 4 201h for powering voltage input (which ranges from 2.7 to 3.6 volts for the micro SD card format).

Electrical pins 109x can be connected to an external bus 202, which can be connected to memory/interface processor 109d. Electrical pins 109x do not need to be electrically combined into a single circuit, and the separate pins, traces, or wiring lines can be separately connected to processor 109d, and the external facing pins can collectively be considered an external bus 202. In exemplary embodiments, an SD card format and electrical pin connections are not required, and other physical forms of electrical connections could be supported as well, such as PCIe, SPI, serial, or USBv3. Note that pins 1 201a and pin 8 201b can be used as signaling lines for various SD bus technologies, and not with a device antenna for some embodiments, such as embodiments with the use of an external antenna 201i.

As depicted in FIG. 2a, radio unit 109b can include an RF front end 203, an RF transceiver 204, an RF clock 205, a baseband unit 206, a baseband clock 207, and an eUICC 113. Radio unit 109b can be connected to internal bus 212 in order to send and receive electrical signals with both radio processor 109c and memory/interface processor 109d, as well as the other electrical components connected to internal bus 212. As noted above, RU processor 109c could also operate within RU 109b. RF front end 203 can include SAW filters, a power amplifier for a transmit chain, a low noise amplifier for a receive chain, a switching circuit for to switch between transmit and receive in half-duplex mode, and logic and circuits to convert radio frequency signals between an antenna and an intermediate frequency for processing by the RF transceiver 204. RF front end 203 can include an oscillator, phased loop logic, and a mixer and supporting components.

In exemplary embodiments, RF front end 203 includes an antenna switch 203a. Antenna switch 203a can provide connectivity to each of device antenna 101t through pin 1 201a and pin 8 201b, the interface to external antenna 109z, and internal antenna 109t. In an exemplary embodiment, switch 203a can be selected or set to use one of the three antennas by radio processor 109c using general purpose input/output (GPIO) lines, or similar signals from radio processor 109c. In another exemplary embodiment, switch 203a can automatically determine which of the three antennas (101t in device 101, 109t, or 201i) to use with RF front end 203 based on detecting a 50 ohm impedance along the three possible connections (e.g. pins 1,8 of 109x, through 109z, or with 109t). In exemplary embodiments where RU 109b detects a matching impedance for at least two of the exemplary three antennas depicted (e.g. 101t in device 101 in FIG. 1a, 109t, or 201i), then RU 109b could use multiple in and multiple out (MIMO) radio modulation.

RF transceiver 204 can include electrical components to convert between (a) intermediate frequencies with RF front end 203 and (b) baseband frequencies and signals with baseband unit 206. RF transceiver 204 can include digital to analog converters, analog to digital converters, and also use input from RF clock 205 for timing signals. RF transceiver 204 can implement (i) OFDM and QPSK signal modulation and (i) separate RF channels with multiple sub-carriers required by wireless network 102, if wireless network supports LTE and 5G and related standards. High order modulation could be supported such as 16-QAM, 64-QAM, 256-QAM, etc. For low bandwidth applications, BSPK or QPSK could be used.

In exemplary embodiments, RF clock 205 frequency is selected to match or support the wireless WAN networking protocol, such as using a RF clock frequency of 38.4 MHz for LTE NB-IoT applications, although other frequencies could be utilized as well, such as, but not limited to, 19.4 Mhz. Note that SRU 109 may need a separate, internal clock comprising RF clock 205 than clock 101m and input clock via 201e, since that clock source for SD cards or an SD bus or similar PCI or SPI busses is normally not sufficiently accurate or stable for a radio unit 109b. RF transceiver 204 can implement logic and algorithms for an intermediate frequency in order to support the protocol used by wireless network 102, which could be NB-IoT, 5G, and other possibilities exist as well.

Baseband unit 206 can include electrical components to convert between baseband frequency signals communicated with RF transceiver 204 and data with radio processor 109c. Baseband unit 206 can implement radio control functions such as signal modulation, encoding, radio frequency shifting, carrier selection, frequency tuning. For NB-IOT 104 networks, baseband unit 206 can implement baseband physical channels, such as processing narrowband primary synchronization signal (NPSS) and narrowband secondary synchronization signal (NSSS) to synchronize its frequency and timing with an eNB. Radio unit 109b can adjust or offset clock input from clock 205 in order to synchronize timing with an eNB.

After RU 109b synchronizes timing with wireless network 102, baseband unit 206 by receiving data from RF transceiver 204 can process and read data from a narrowband broadcast control channel (NPBCH). Narrowband physical random access channel (NPRACH) can be implemented by baseband unit 206 to establish initial association with wireless network 102. Baseband unit 206 can structure downlink and uplink data packets with a narrowband physical downlink shared channel (NPDSCH) and narrowband physical uplink shared channel (NPUSCH), respectively. Although baseband unit 206 is depicted as separate from radio processor 109c and RF transceiver 204, baseband unit 206 could be combined with either radio processor 109c and/or RF transceiver 204. In exemplary embodiments, baseband unit 206 can be driven by a baseband clock 207, which can operate at a different and lower frequency than RF clock 205. In some exemplary embodiments, baseband clock 207 operating at 32.768 kHz, although other possibilities exist as well.

As depicted in FIG. 2a, eUICC 113 can also be implemented within radio unit 109b, and connected to a processor 109c operating in radio unit 109b via an internal bus for radio unit 109b. Or, eUICC 113 can be implemented as external to radio unit 109b and connected to radio unit 109b and processor 109c via internal bus 212 for SRU 109 (which is depicted in FIG. 1c). PLL 211 operating in SRU 109 can comprise a timing circuit to convert RF clock 205 into a frequency to drive processors 109c and/or 109d. In an exemplary embodiment, radio transceiver 204 can be driven by a RF clock 205 with a frequency in a range of less than 50 MHz, such as an exemplary 38.4 or 19.2 MHz, while processors 109c and 109d can preferably be driven at a higher frequency such as a frequency greater than 100 Mhz.

PLL 211 can step up or convert the frequency of RF clock 205 into a higher value or frequency. In an exemplary embodiment where RF clock 205 operates at 38.4 MHz, PLL 211 can multiple the frequency of RF clock 205 to a higher value of 5× times, and thus output a frequency of 192 MHz to drive processor 109c and processor 109d. PLL 211 could use different multiplying RF clock value 205 other than the exemplary value of 5, such as exemplary integer values in the range of 3× to 8×, and other possibilities exist as well. Note that the output of PLL 211 can also be input to eUICC 113, since eUICC 113 can operate with an internal processor in order to perform cryptographic operations. PLL 211 can implement separate multiplication values of RF clock 205 in order to drive each of processor 109c, processor 109d, and eUICC 113 with different clock input values, using RF clock 205 as a source. PLL 211 can function as an oscillator (i) receiving input from RF clock 205, and (ii) outputting a CMOS timing signal at 100 megahertz or higher.

Random access memory 213 in SRU 109 can function similar to RAM 101e for device 101, with a form factor, speed, and storage capacity suitable for SRU 109. RAM 213 can be connected to internal data bus 212 in storage radio unit 109, and can store data for processors 109c and 109d in a volatile state, such that data recorded in RAM 213 can be essentially flushed or reset when electrical power to storage radio unit 109 and radio unit 109b is removed. Random access memory 213 can store data such as tables of memory addresses and sectors for memory 109f and memory 109r, since these tables are ordinarily larger than the registers provided by processors 109c and 109d. RAM 213 can be shared or allocated between processors 109c and 109d, or RAM 213 can comprise two separate RAM units, where one RAM memory unit is allocated to processor 109c and a second RAM memory unit is allocated to processor 109d.

In addition, for some exemplary embodiments, RAM 213 can comprise a nonvolatile RAM (NVRAM) as described in connection with FIG. 5a and depicted for a RAM memory 101e' in FIG. 8. Since SRU 109 may be powered off frequently and at times not controlled by SRU 109 (such as under the control of device 101), for some exemplary embodiments RAM 213 comprises an NVRAM. For these embodiments, the time required for a boot process for SRU 109 and RU 109b can be reduced (since a last operating state can be stored in RAM 213 as NVRAM), and thus power or energy consumption by SRU 109 can be reduced.

EEPROM 216 in SRU 109 can include SRU ID 109i, a certificate 106d for SRU-SP 106 with an initial SRU-SP public key SRU-SP PK 106b corresponding to the SRU-SP private key SRU-SP SK 106a, symmetric keys 127, SRU boot firmware 217, SRU boot configuration 218, and PKI keys 109v' for SRU 109. Symmetric keys 127 can comprise a collection of pre-shared secret keys 127a and 127b. EEPROM 216 could also comprise a read only memory, where the data in EEPROM 216 is written once upon manufacturing of storage unit 109. EEPROM 216 could also function as a read only memory for SRU 109 similar to ROM 101c for device 101 above. In other words, EEPROM 216 does not need to be erasable and reprogrammable, although some data in EEPROM 216 could be re-written in exemplary embodiments.

Data within EEPROM 216 can comprise SRU boot firmware 217 and CU boot configuration 218. Upon startup or powering of storage radio unit 109, processor 109d could load and operate on instructions provided by boot firmware 217 and boot configuration 218 from EEPROM 216. Boot firmware 217 and boot configuration 218 can provide instructions to processor 109d in the format of machine executable code. The instructions in boot firmware 217 can provide instructions for processor 109d and possibly processor 109c to initialize and subsequently load SRU firmware 101u from memory 109r via internal bus 212. Data or files can be written to EEPROM 216 by a configuration unit similar to configuration unit 110d, where the configuration unit for EEPROM 216 can be operated by (i) the manufacturer of SRU 109 or (ii) SRU-SP 106. The data in EEPROM 216 can be written into EEPROM 216 in SRU 109 before SRU 109 is distributed to a device service provider 110, an SRU distributor, or an end user of device 101, such as during a step 260 depicted and described in connection with FIG. 2f below.

PKI keys 109v' in EEPROM 216 can comprise an initial set of PKI keys 109v depicted and described in connection with FIG. 1c, with a difference being (a) PKI keys 109v' could be recorded in a read-only state upon manufacturing of SRU 109, and (b) PKI keys 109v in nonvolatile memory 109a could comprise a subsequently updated version of the initial set of PKI keys 109v'. PKI keys 109v' can include a certificate for SRU 109. A certificate for SRU 109 in PKI keys 109v' can include the SRU identity 109i, SRU public key SRU PK 109w for SRP private key SRU SK 101p, certificate parameters, and a certificate authority digital signature.

SRU certificate for SRU 109 (and other certificates herein) can be formatted according to the X.509 v3 specifications, among other possible formats, and stored as a plain text file, *.pem file, or *.crt file or similar file formats. SRU certificate in PKI keys 109v' can be used by SRU 109 in order to (i) verify identity of SRU 109 to device 101 or SRU-SP 106. SRU private key 109p in PKI keys 109s can be used to generate a digital signature. In exemplary embodiments, parameters in a SRU certificate in PKI keys can include an expiration time of longer than the expected operational lifetime of storage radio unit 109, and in this manner SRU certificate in PKI keys 109s can remain valid whenever storage unit 109 is utilized. An exemplary expiration time of SRU certificate in PKI keys 109s could be 20 years, although other possibilities exist as well. For embodiments where a certificate for SRU 109 is updated (such as changing a set of cryptographic parameters 191e), then the updated certificate for SRUP 109 could be stored or recorded in PKI keys 109v in protected memory 109r and the original certificate could continue to be recorded in EEPROM 216.

SRU boot firmware 217 in EEPROM 216 can provide machine executable code for processor 109d to initiate operations when electrical power is provided to SRU 109 via the electrical pins 109x. Although not illustrated in FIG. 2a, processor 109d may also include a ROM memory with processor 109d instructions for processor 109d to fetch boot firmware 217 and boot configuration 218 upon startup when power is provided to processor 109d. SRU boot firmware 217 can include memory control libraries 217a. SRU boot firmware 217 in EEPROM 216 could also include instructions for SRU 109 to load SRU firmware 109u recorded in non volatile memory 109a, if present, as depicted in FIG. 2a.

In exemplary embodiments, SRU firmware 109 could be (i) recorded in memory 109r as encrypted with symmetric key 127a, and (ii) decrypted with a symmetric key 127a recorded in EEPROM 216 within symmetric keys 127. Authorized providers of SRU firmware 109u, such as SRU-SP 106 or device service provider 110, could have access to symmetric key 127a for SRU 109 with SRU ID 109i, and consequently only the authorized providers could properly encrypt SRU firmware 109u using the symmetric key 127a. In exemplary embodiments, symmetric key 127a is unique for each SRU 109 and associated with each unique SRU-ID 109i. SRU firmware 109u could be transmitted to a device 101 over network 102 in the encrypted format and encrypted with the symmetric key 127a for SRU 109.

Or, SRU firmware 109u can be written to SRU 109 by a configuration unit similar to configuration unit 110d and operated by SRU-SP 106 or device service provider 110 or a manufacturer for SRU 109, and other possibilities exist as well for the source and recording of an initial SRP firmware 109u for SRU 109 before SRU 109 is inserted in device 101. Symmetric key 127a within EEPROM 216 can comprise a shared secret key. Symmetric key 127b for SRU 109 can comprise a different key for other purposes than decrypting SRU firmware 109u. A configuration unit 110d could write a symmetric key 127b to EEPROM 216 or protected memory 109r, where the symmetric key 127b could be used to encrypt application data 112a and decrypt a response 112b. In some exemplary embodiments, SRU firmware 109u is not required for SRU 109 to operate, and SRU 109 could operate using SRU boot firmware 217. SRU firmware 109u can be loaded into storage unit 109 for embodiments where the firmware for SRU 109 is desired to be updated.

Memory control libraries 217a could include software or firmware to manage and schedule the operation of SRU 109, such as machine code or machine executable instructions for (i) instructing processor 109d to write data to bus 212 for memory controller 115 when data is recorded in memory 109r (e.g. memory write libraries 217b), (ii) read data from external bus 202 when data from device 101 is passed to SRU 109 (e.g. memory read libraries 217c), and (iii) reading SRU firmware 109u from protected memory 109r for SRU 109. For embodiments where processor 109c and processor 109d are combined, memory control libraries 217a can include the software libraries and firmware for the combined processor to manage all input and output of SRU 109 upon boot. Other possibilities exist as well for memory control libraries 217a to support the operation of SRU 109 via program instructions provided to processor 109d without departing from the scope of the present disclosure. In exemplary embodiments, boot firmware 217 and boot configuration 218 can provide boot instructions and setup for both processor 109c and processor 109d.

SRU only accessible memory 109r within nonvolatile memory 109a could be accessed by SRU 109 and processors 109d and 109c via an internal bus 212 and memory controller 115. SRU only accessible memory 109r within nonvolatile memory 109a can comprise a protected memory (such that memory 109r cannot be read by device 101 or written to by device 101). As contemplated herein, SRU only accessible memory 109r can also be referred to as protected memory 109r. Internal bus 212 and memory controller 115 can be utilized to physically or logically separate protected memory 109r from memory 109f and memory 109g in FIG. 1c, in order to prevent device 101 or external parties with physical access to storage unit 109 from reading the data or writing data in protected memory 109r. In other words, and as illustrated in FIG. 2a, internal bus 212 and memory controller 115 can limit (A) the ability to read and write data to protected memory 109r only to (B) SRU 109 in exemplary embodiments. In contrast, access by device 101 to memory 109f could be accomplished through the separate data bus 202 and interface controller 109d.

In exemplary embodiments, memory processor 109d can provide the functionality to device 101 for storage radio unit 109 to operate as a standard flash memory storage unit via data bus 202. Internal bus 212 and memory controller 115 can provide memory resources to SRU 109 in a manner that prevents device 101 from accessing protected memory 109r, including the description of memory controller 115 above. Internal bus 212 is not required in some exemplary embodiments, and memory controller 115 could be connected to data bus 202, but limit access to physical memory cells comprising memory 109r to processors 109d and 109c. Other possibilities for (i) limiting access to memory 109r to SRU 109, while (ii) supporting shared access to memory 109h with device 101 are possible as well without departing from the scope of the present disclosure. In an exemplary embodiment, memory 101f, and 109r could represent separate partitions for nonvolatile memory 109a.

SRU only accessible memory 109r in nonvolatile memory 109a can include data for the operation of SRU 109 which would not normally be read or utilized by device 101. In addition to the exemplary data depicted and described for protected memory 109r in FIG. 1c, memory 109r can include an operating system (OS) 220 for SRU 109, cryptographic algorithms 109q, device service provider certificate 110c, an SRU-SP public key SRU-SP PK 106b, radio unit firmware 222, derived secret shared key 223, free memory 224 for SRU 109, and SRU firmware 109u. Data within memory 109r can be recorded in a file system similar to file system 229 for device memory 109g. OS 220 for SRU 109 can be an OS similar to the OS 101h for device 101, but selected for the operating environment of SRU 109. Cryptographic algorithms 109q were described above in connection with FIG. 1c. Device service provider certificate 110c can be used to verify a digital signature for data in a server B response 112b. SRU-SP public key SRU-SP PK 106b corresponds to SRU-SP private key SRU-SP SK 106a from FIG. 1a. Radio unit firmware 222 can comprise software, firmware, and operating libraries for radio unit 109b, including radio unit processor 109c.

Derived secret shared keys 223 can comprise secret shared keys derived between SRU 109 and SRU-SP 106 using an ECDH key exchange and SRU private key SRU SK 109p and SRU-SP public key SRU-SP PK 106b. Derived shared secret keys 223 can also comprise secret shared keys derived with SRU-SP using an ephemeral private key derived by SRU 109 such as ephemeral private key 409a as depicted and described in FIG. 4a and FIG. 4b below. Free memory 224 for SRU 109 can comprise memory allocated for SRU 109 in protected memory 109r that is available for future use by SRU 109 during operations after a boot process. SRU firmware 109u is described above in FIG. 1c and also below in FIG. 2e. Other data could be recorded in protected memory 109r as well, including an updated boot configuration 218, which could include boot parameters for the operation of RU 109 that are different than initially stored SRU boot configuration 218 in EEPROM 216.

Power control unit 109e can manage the power utilization by SRU 109. Since many applications of device 101 may operate on a battery 101n, current flow and energy consumption by SRU 109 can be managed by power control unit 109e. Power control unit 109e can also include a voltage regulator in order to limit a maximum input voltage from pins 109x to components in SRU 109 (and can be connected to bus 202). Power control unit 109e can smooth or reduce voltage fluctuations from power received by device 101. In exemplary embodiments, power control unit 109e can either (i) disable power input into radio unit 109b or (ii) force radio unit 109b to enter a sleep state when device 101 writes to memory 109a. The disabled or sleep state for radio unit 109b could comprise current utilization for radio unit 109b of less than an exemplary 5 micro amps. Power control unit 109e can also (i) change radio unit 109b from a booted but sleep state to (ii) an active mode or operating mode (e.g. ready to receive data and transmit data) with operating power for radio unit 109b after data is written by device 101 into shared memory 101h, such as application data 112a from device 101 for server B 110a. In other words, power control unit 109e can keep radio unit 109b in a deep sleep state until SRU receives data from device 101 in shared memory 109h, where the data from device 101 in shared memory 109h is for radio unit 109b to transmit through wireless network 102. Exemplary additional steps and function for a power control unit 109e are depicted and described in subsequent figures below, including FIG. 6a and FIG. 6b.

Further, power control unit 109e could disable writes or erases by device 101 into device memory 109g when radio unit 109b is transmitting, since those writes or erases in combination with radio unit 109b transmitting may exceed specified or preferred current consumption thresholds for storage radio unit 109. In exemplary embodiments, radio unit 109b can consume approximately 200 mA of current for several seconds when transmitting at full power of 23 dBm. Similarly, SRU 109a can consume approximately 50-75 mA of current when erasing blocks of memory for device 101 in general memory 109g. Other possibilities exist as well, but those values are typical for radio units and flash memory units commercially available in 2018.

In addition, power control unit 109e could prevent writes or erases of data in device memory 109g when radio unit 109b is transmitting in order to reduce possible internal radio frequency noise. Power control unit 109e could control power input or supply voltage to radio unit 109b, such that input power to radio unit 109b must pass through power control unit 109e. Power control unit 109e could have electrical connections to radio unit 109b to signal sleep and wake signals, possibly through internal bus 212. For some exemplary embodiments, RU 109b can comprise a radio supporting 802.11 ah standards, which are also known at WiFi Halow. The sleep of RU 109b and/or SRU 109 can be controlled by a power control unit 109e, and power control unit 109e can receive a target wake time (TWT) from a wireless network 102. Power control unit 109e can power up or down the radio unit 109b and SRU 109 based on the TWT received. In exemplary embodiments, SRU 109 can write the TWT and a corresponding date/time value to device read memory 192, such that device 101 can read the TWT and plan or schedule to take sensor measurements based on the TWT received from the wireless network 102 by radio unit 109b.

Power control unit 109e could also utilize power detector 209. Power detector 209 could be connected to power control unit 109e via an internal bus 212. Power detector 209 can (i) detect when power or voltage is removed from pin 4 201g (or similar pins for voltage input with other busses) and (ii) send a shutdown signal to power control unit 109e. Power control unit 109e can receive the shutdown signal and conduct a clean shutdown of SRU 109 and radio unit 109b. For embodiments where RAM 213 comprises NVRAM, then a shutdown command from power control unit 109e after (x) power detector 209 determines that power from device 101 has been removed can then (y) instruct SRU 109 to store the last operating state in NVRAM (similar to a "hibernate" shutdown for a personal computer). Thus, SRU 109 can resume operation more quickly once power is restored to SRU 109 using the last operating state from NVRAM. Power detector 209 and power control unit 109e operating together can remove power from RU 109b within fractions of a millisecond when RU 109b is transmitting and power is removed from SRU 109.

Power capacitor 208 could provide sufficient charge storage to allow SRU 109 to operate for at least a few milliseconds after power supply voltage is removed from pin 4 201g (or similar pins/connectors for voltage input with other busses). In this manner, power control unit 109e can complete outstanding write operations to memory 109f (e.g. memory 109h and memory 109g) or memory 109r, and avoid data being corrupted. In an exemplary embodiment, power capacitor could be a surface mount capacitor supporting approximately 20-200 micro farads at the low voltage needed by SRU 109, such as a maximum supporting voltage of 5 volts. SRU could consume an exemplary 25-50 mA during a device 101 write operation to memory 109f or radio transmission by RU 109b (such as with 0-15 dBm RF transmit power). Voltage supplied to SRU 109 can be an exemplary 3.3 volts.

As an exemplary calculation, if power was suddenly removed from pin 4 201g, then SRU could use charge stored in power capacitor 208 with an exemplary 100 microfarads and a voltage drop of 0.6 volts and a current draw of 33 mA to operate SRU 109 for an additional 2 milliseconds. SRU 109 using all of power detector 209, power capacitor 208, and power control unit 109e could reliably close memory write processes in less than 2 milliseconds, in order for SRU 109 to shut down without inducing errors in memory 109a or RAM 213 operating as NVRAM. However, under preferred operating conditions, SRU 109 receives both (i) a shutdown command from device 101 (equivalent to a "remove" or "dismount" command from device 101 for SRU 109) and (ii) at least 10s of milliseconds of power on pin 4 201g before device 101 terminates power input and supplied voltage to pin 4 201g. Power capacitor 208 could be utilized if power is suddenly removed from SRU 109 without a shutdown command from device 101. Note that power capacitor 208 could be used with power control unit 109e to smooth voltage fluctuations received through pins 109x, such that a more stable voltage can be supplied to components connected via internal bus 212.

In exemplary embodiments, power control unit 109e delays the completion of the startup of SRU 109 until after power capacitor 208 is sufficiently charged, such as being charged to a level of >75% of capacity. In these exemplary embodiments, the delay of startup of SRU 109 from the application of power to SRU 109 from device 101 can normally be delayed to less than a few tens of milliseconds. The benefit of delaying startup of SRU 109 until power capacitor 208 is charged is that fluctuations in power from device 101 can be smoothed out, such as a transient power applied of a few milliseconds would not start SRU 109 in a state where SRU 109 cannot be cleanly shut down through the operation of power capacitor 208. Note that "power capacitor" herein contemplates a capacitor of sufficient size to power SRU 109 for at least a few milliseconds, which is different than a power capacitor for larger electrical circuits such as power supplies, which could use capacitors on the order of farads. Further, upon a power source with device 101 being removed, power control unit 109e could shut down radio 109b before shutting down processor 109c, while using stored electrical energy from power capacitor 208 in order to reduce current drain and allocate power resources to processor 109c cleanly shutting down processes when device 101 removes power from SRU 109.

Many of the logical steps for operation of SRU 109 and RU 109b can be performed in software and hardware by various combinations of processor 109d, processor 109c, firmware 109u or boot firmware 217 and other components in FIG. 2a. When SRU 109 or RU 109b is described herein as performing various actions such reading a file, writing a file, transmitting or sending data, receiving data, encrypting a ciphertext, conducting a key exchange, etc., specifying herein that SRU 109 or RU 109b performs an action can refer to software, hardware, and/or firmware operating within SRU 109 illustrated in FIG. 2a performing the action.

FIG. 2b

Figure 2B:
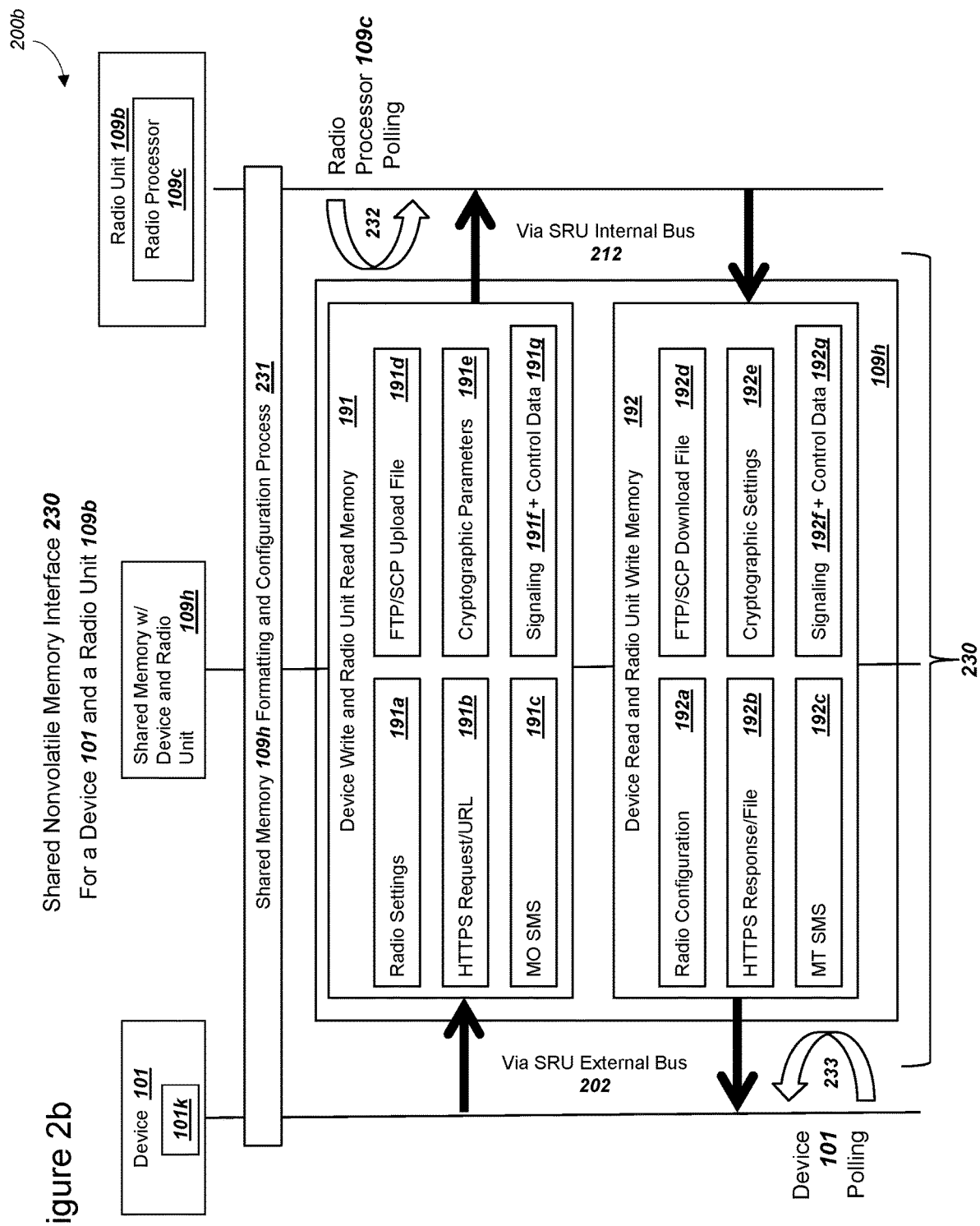
FIG. 2b is a graphical illustration of an exemplary system, where a device and a radio unit communicate through a shared nonvolatile memory in a storage radio unit, in accordance with exemplary embodiments.

FIG. 2b is a graphical illustration of an exemplary system, where a device and a radio unit communicate through a shared nonvolatile memory in a storage radio unit, in accordance with exemplary embodiments. Device 101 and radio unit (RU) 109b can preferably communicate through an interconnected electrical interface and mutually accessible nonvolatile memory 109h in storage radio unit 109, in order to transfer data between the two elements. Exemplary embodiments for a system supporting communication through a shared nonvolatile memory 109h is illustrated in FIG. 2b. Device 101 and RU 109b can both mutually access a shared memory 109h, which could comprise a selected portion of memory 109f, where memory 109f can comprise a selected portion of overall nonvolatile memory 109a as depicted and described in connection with FIGS. 1c and 2a above. A system 200b supporting a shared nonvolatile memory 109h can comprise a device 101, a shared memory 109h, an SRU external bus 202, and SRU internal bus 212, RU polling 232, device polling 233 and RU 109b. For some embodiments, mutually accessible nonvolatile memory 109h or shared nonvolatile memory 109h could operate in device 101 outside of a SRU 109, such as depicted in FIG. 7 below.

A shared nonvolatile memory 109h can operate as a shared nonvolatile memory interface 230. A shared nonvolatile memory interface 230 can be referred to herein as a shared memory interface 230, where the shared memory interface 230 can operate in a nonvolatile memory (such that data stored in the nonvolatile memory is recorded when power is removed from the memory cells recording the data). As contemplated herein, a shared memory interface 230 can be referred to as a "shared filesystem interface" 230', for embodiments where shared nonvolatile memory 109h is formatted or structured with a filesystem for both device 101 and RU 109. In other words, a shared filesystem interface 230' can be a subset or specific configuration for a shared memory interface 230, where a shared filesystem interface 230' records a filesystem in a shared nonvolatile memory interface 230.

Note that the use of a shared filesystem interface 230' as the structure for shared nonvolatile memory 109h is not required, and other structures are possible as well, such as simply addressing specific memory cells by both device 101 and RU 109b for the data depicted in FIG. 2b. Some embodiments may use a shared filesystem interface 230' within shared nonvolatile memory 109h in order to "reuse" widely adopted technology and existing, compatible technology of filesystem in device 101 and SRU 109 for addressing, reading, and writing to storage nonvolatile memory. Shared filesystem interface 230' can also include a configuration process 231 and a device write and radio unit read memory 191 and device read and radio unit write memory 192. As contemplated herein, a "shared filesystem interface" 230' may also be described or referred to as "shared filesystem" 230'.

The use of a shared filesystem 230' for shared memory 109h can be desirable to establish communication between device 101 and RU 109b when (i) RU 109b resides on a storage radio unit 109 and (ii) SRU 109 operates with (i) established standards for removable media or (ii) external storage from CPU 101b, such as (a) using generic removable media drivers for device driver 101g and/or (b) using established filesystem and device drivers in device 101 for memory 109h and filesystem 230. The generic or pre-existing device driver 101g installed on a wide variety of devices 101 (or pre-included in various OS 101h for many different devices 101) may not include specific interfaces for communication with RU 109b operating inside a SRU 109, but communication between device 101 and RU 109b can be desirable in exemplary embodiments. For example, electrical pins 109x and device driver 101g could support a one-bit SD bus for removable media such as a micro SD card and resulting file or memory operations within the micro SD card (via SD card driver 101k), and SD card driver 101k included in device 101 may not require specific support to send data directly to RU 109. Data reporting libraries 101x could include the logic of using a standard device driver 101g such as an SD card driver 101k to write file or data to nonvolatile memory 109a, which SRU 109 could structure as a shared memory 109h, such that RU 109b could read the data written by data reporting libraries 101x.

The manufacturer of an SRU 109 may incur high commercial expenses in order to create device drivers 101g for the very wide variety of devices 101 and device OS 101h, as described in the needs of the art detailed above. However, the manufacturer of an SRU 109 could more quickly and for lower cost establish compatibility with a wide variety of devices 101 using an SD card driver 101k interface for SRU 109. Note that other common drivers besides SD card driver 101k could be utilized, such as a USB interface, PCIe interface, SPI interface, SATA interface, serial interface, etc.

Other possibilities exist as well, where a wide variety of manufactured devices 101 can (A) support standards-based storage media such as SD cards, but (B) lack pre-installed drivers 101g with protocols for communicating directly with RU 109b through a shared nonvolatile memory 109h. Storage radio unit 109 and RU 109b could subsequently utilize system 200b in order to communicate with device 101, where support for a device 101 to read and write to nonvolatile memory 109a, memory 109f, and memory 109h could be widely supported by existing devices 101 and device OS 101h. Further, device 101 could use system 200b in order to communicate with radio unit 109b using a system 200b and a shared filesystem interface 230'.

A shared memory 109h with a shared filesystem interface 230' can be compatible with a generic or widely distributed media device driver 101g (such as SD card driver 101k). Use of a standard media device driver 101g can allow device 101 to (i) write data to memory 191 or files in storage radio unit 109, (ii) read data o from memory 192 or files in storage radio unit 109, and (iii) quickly and reliably mount or attach the shared memory 109h within an SRU 109. Using system 200b, RU 109b and device 101 can subsequently utilize this standard capability to communicate and share data, while SRU 109 also conducts or performs the function of non-volatile memory storage for device 101.

In other words, for device 101 to send data to RU 109b in an exemplary embodiment, device driver 101g can write the data to memory 191 in shared memory 109h, where RU 109b can subsequently read data in the memory 191 in shared memory 109h using read libraries 217a within memory control libraries 217. Other, similar embodiments are possible as well, such as RU 109b using memory read and writes libraries in SRU firmware 109u (in which case read and write libraries in EEPROM 217 would be for boot functions). Or, SRU 109 using memory processor 109d and firmware 109u could conduct a read of memory 191 and send the data to RU 109b via internal bus 212.

RU 109b with processor 109c can conduct periodic polling 232 of files in memory 191 within shared memory 109h to determine that device 101 has written data for RU 109b to subsequently read (e.g. polling can detect if the timestamp for a file has been changed or updated since a previous polling, or if a new file is available for reading by RU 109b). Further, in order for device 101 to read data from RU 109b, RU 109b could write the data to a file system in memory 192 in shared memory 109h using write libraries 217b within memory control libraries 217. Device 101 could subsequently read the data from memory 192 in shared memory 109h using device driver 101g. Device 101 can use periodic device polling 233 of memory 192 in shared memory 109h to determine that RU 109b has written data for device 101 to subsequently read.

As contemplated herein, RU polling 232 or device polling 233 could comprise a logical loop operating with processor 109c or processor 101b, respectively, where the loop determines that a file or value recorded in memory has been updated or changed by the other node (where device 101 and RU 109b can comprise the two nodes). The loop timing for RU polling 232 or device polling 233 could operate at specified frequencies, such as an exemplary every 10 or 50 milliseconds, although other possibilities exist as well without departing from the scope of the present disclosure. In addition, other mechanisms exist for SRU 109 to use instead of a polling 232, such as the use of a trigger library 245 depicted and described in FIG. 2e below. With a trigger library or function, data from device 101 passes through memory/interface processor 109d before being written to memory 109h, and processor 109d could include a library with a "trigger" such that processor 109d notifies processor 109c and/or RU 109b if a file is being written from device 101 to memory 191 for RU 109b to read.

In an exemplary embodiment, the memory/interface processor 109d could be coupled to the power control unit 109e. The normal or default state for radio unit 109b could be an off or a sleep state and radio unit 109b could be in the sleep state. Data from device 101 to be stored in memory 109h (such as application data 112a) could trigger memory/interface processor 109d to signal power control unit 109e to wake radio unit 109b. Radio unit 109b could transition from the sleep state to a wake or operational state and subsequently read the application data 112a and transmit to the wireless network 102. Or, a processor 109c could operate the trigger instead of a memory/interface processor, such that processor 109c wakes radio unit 109b upon receipt of application data 112a.

Before recording shared data in shared memory 109h, (i) SRU 109 or (ii) a configuration unit 110d for device service provider 110 or (iii) a configuration unit for SRU-SP 106 could perform a shared memory filesystem formatting and configuration process 231. The process 231 could comprise the standard steps for partitioning, formatting nonvolatile storage media such as an SD card, where a file system is applied to the available memory. Process 231 could include formatting memory 109h to standards supported by device 101 such as exemplary file systems of FAT16, FAT 32, exFAT, NTFS, ext3, ext4, exFAT, JFFS2, or UDF. Other file systems for memory 109f and memory 109h are possible as well without departing from the scope of the present disclosure. Process 231 could also format all of non-volatile memory 109a (which can include shared memory 109h). Additional details regarding a process 231 are provided in FIG. 2f below. At the conclusion of a configuration process 231 on shared memory 109h, device 101 and RU 109b can mutually access a shared filesystem 230', where the shared filesystem 230' resides within storage radio unit 109 that also operates radio unit 109b.

In other words, device 101 or device service provider 110 can normally be responsible for selecting the format of a file system of memory 109g for general files 109g used by device 101. During a configuration process or step 231, the first portion of configuration 231 can comprise selecting, formatting, and writing a regular file system format for standard storage nonvolatile memory 109g or storage media, including removable media. In exemplary embodiments with the use of inserted media in device 101 such as, but not limited to, a SD card or micro SD card, the regular file system format can support existing SD cards that may not include a RU 109b in SRU 109. A second portion of configuration process 231 can comprise SRU 109 subsequently detecting and utilizing the selected file system from the first portion of a configuration process 231 over memory 109g for device 101.

In this manner RU 109b within a storage radio unit 109 can support the use of existing device drivers 101g in devices 101 (where device drivers 101g in device 101 are known to be compatible with the file system in memory 109g since memory 109g is structured to be read by device 101 using device drivers 101g). Communication between device 101 and RU 109b using a system 200b can utilize a device program 101i depicted and described in connection with FIG. 1b for a device 101 (such as application data reporting libraries 101x) (i) to write data to memory 191 in shared memory 109h, (ii) read data from memory 192 in shared memory 109h, and (iii) conduct a periodic device polling 233. Additional details regarding a configuration process 231 are depicted and described in connection with FIG. 2f below.

After a configuration 231 step, either device 101 or SRU 109 can load shared memory 109h with an initial set of values or files supporting the operation of RU 109b in SRU 109. In exemplary embodiments, the initial set of values or files for (x) shared memory 109h and a shared filesystem 230' could be included in (y) SRU firmware 109u. Additional details for firmware or libraries to support a shared filesystem 230' in shared memory 109h are depicted and described in connection with FIG. 2e below. Device 101 could write data into device write and SRU read memory 191 in the format of either (i) multiple different files, or (ii) a single file with multiple values recorded in the file.

The file or files in memory 191 could include the depicted values of radio settings 191a, http(s) request/URL 191b, "mobile originated" (MO) SMS 191c, upload file 191d, cryptographic parameters 191e, signaling data 191f (to RU 109b), and control data 191g (for RU 109b). RU 109b could write data into RU write and device read memory 192 in the format of either (i) multiple different files, or (ii) a single file with multiple values recorded in the file. The file or files in memory 192 could include the depicted values of radio configuration 192a, http(s) response/file 192b, "mobile terminated" (MT) SMS 192c, download file 192d, cryptographic settings 192e, signaling data 192f (to device 101), and control data 192g (for device 101). Other possibilities exist as well for the values or data recorded in shared memory 109h without departing from the scope of the present disclosure, and the exemplary data above is illustrative as opposed to limiting. "Http(s)" shows that the data could be for transmission as either hypertext transfer protocol (http) or secured hypertext transfer protocol (https) such as using TLS or DTLS.

As an example of the data flow supported by a shared filesystem interface 230' in a system 200b, after configuration process 231, device 101 could write a MO SMS to 191c. RU 109b could conduct polling 232 in filesystem interface 230' within shared memory 109h to detect that a new MO SMS from device 101 is written to 191c. Power control unit 109e could power up components from a powered down or deep sleep state to a fully powered or operational state with RF front end 203, RF transceiver 204, eUICC 113, and baseband unit 206, such that RU 109b could connect with wireless network 102. RU 109b can subsequently read MO SMS from 191c and transmit the MO SMS to wireless network 102. After transmission of MO SMS to wireless network 102, power control unit 109e could power down for force components within RU 109b from the previous sentence into a powered off or deep sleep state if no inbound data for device 101 is received within an exemplary time such as 10 seconds (although other time values are possible as well, such as 3 or 15 seconds). The time settings for power down after transmission of the MO SMS by RU 109b could be specified in radio settings 191a. Other possibilities exist as well for both (i) the values in shared memory 109h and (ii) the steps of transferring the data between device 101 and RU 109b (and transfer of data to wireless network 102 and/or SRU-SP 106) without departing from the scope of the present disclosure.

FIG. 2c

Figure 2D:
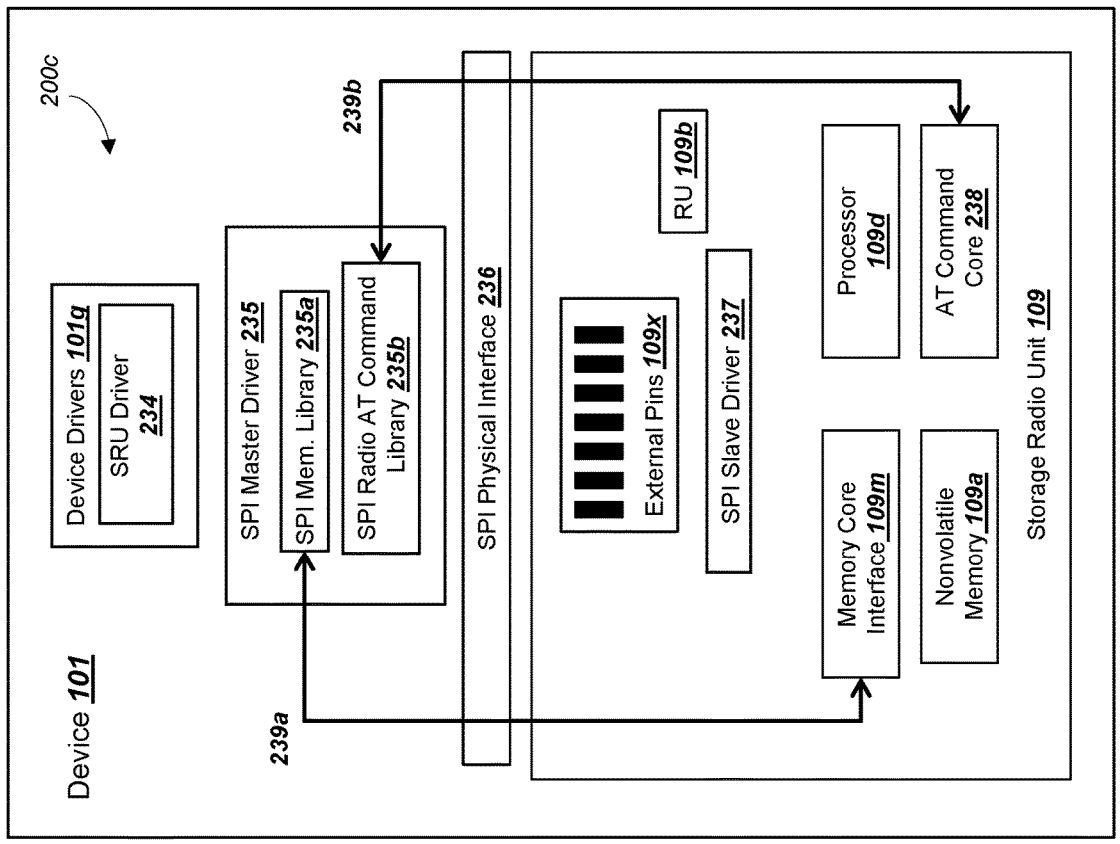
FIG. 2d is a graphical illustration for using an interface between a device and a storage radio unit, in accordance with exemplary embodiments.
Figure 2C:
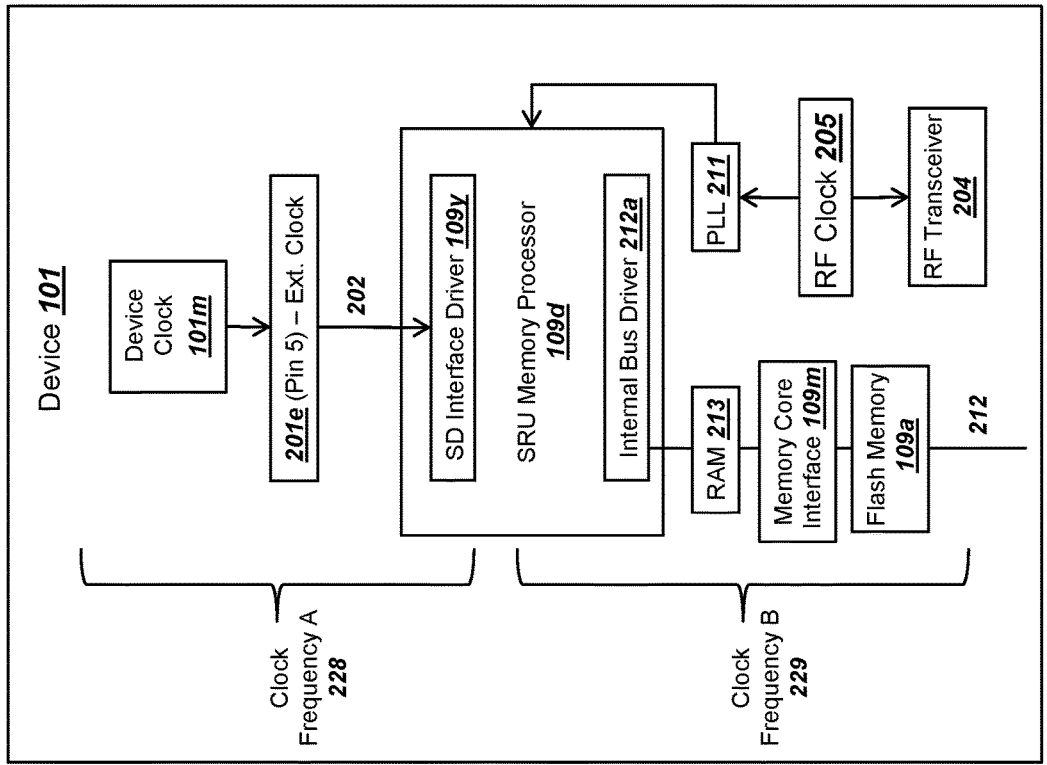
FIG. 2c is a graphical illustration of a storage radio unit utilizing two clock inputs, in accordance with exemplary embodiments.

FIG. 2c is a graphical illustration of a storage radio unit utilizing two clock inputs, in accordance with exemplary embodiments. SRU 109 can include a SRU memory/interface processor 109d in order to communicate with both (i) device 101 using an external bus 202 and (ii) internal components of SRU 109 using an internal bus 212. As contemplated herein, and "external bus" 202 can comprise an external-facing bus 202 such as the electrical pins 109x, while external bus 202 may otherwise reside within SRU 109. FIG. 2c depicts a solution to the needs in the art described above in the section "Description of Related Art", where an SRU 109 may operate more efficiently, faster, and more reliably from using an internal clock source that is different than an external clock from device 101, where an external clock is input via a pin such as pin 5 for the micro SD card physical interface. The sources of timing for a memory/interface processor 109d depicted in FIG. 2c can be utilized with other interfaces as well, such as, but not limited to, an SPI, PCIe, USB, serial interface, or enhanced SPI (eSPI).

In exemplary embodiments, a physical interface 202 between SRU 109 and device 101 can utilize a clock input 201e from the "master" or "host" (e.g. device 101). The flow of signals or electrical pulses between SRU 109 and device 101 can be timed based on clocking signals such as CMOS square waves on clock input 201e. These clock signals could be in exemplary ranges of 10-50 MHz for an SD bus interface operating on bus 202, where the speed is determined by device 101 and derived from device clock 101m. The frequency of clock input 201e can comprise clock frequency 228, which can be input into processor 109d in order to operate interface driver 109y. In other words, interface driver 109y can be driven with the clock input 201e at a clock frequency of 228.

Although clock input 201e for SRU 109 can be required in order to transfer data between SRU 109 and device 101 over bus 202, the frequency and stability of clock input 201e can be far from desirable for an optimal operation of SRU 109. For example, although clock input 201e could be suitable for communication via bus 202 and pins 109x, clock input 201e could have relatively high jitter, noise, phase variation, etc. Using a relatively "noisy" clock input 201e in SRU 109 to drive internal bus 212 and internal components in SRU 109 (such as RAM 213, memory core interface 109b, etc.) could induce a higher level of errors for components in SRU 109 and connected via internal bus 212.

A typical clock input 201e from a low-cost device could have typical phase noise at the input frequency of −40 to −45 dBc/Hz. Note that significant "spikes" or "timing signal drops" much worse are possible, depending on the operation and power states of components in device 101, and these spikes of poor clock timing signals on clock input 201e could induce errors SRU 109. In contrast, internal RF clock 205 for SRU 109 could be a VTCXO or TCXO with a typical phase noise of −55 dBc/Hz at the output frequency. Note that SRU 109 controls RF clock 205 and thus can operate with a clock source with many fewer "spikes" or "drops". Although the timing output of RF clock 205 may be set for RF transceiver 204 (such as an exemplary 38.4 MHz with 4G LTE NB-IoT or CATM1), PLL 211 can scale clock 205 with low noise to a level such as an exemplary 192 MHz, where the output of PLL 211 can drive processor 109d as depicted in FIG. 2c. The frequency of the output of PLL 211 as an input to processor 109b can comprise clock frequency 229, which can be an independent numerical value from clock frequency 228.

In exemplary embodiments and as depicted in FIG. 2c, SRU memory/interface processor 109d can utilize clocking signal output from PLL 211 at a clock frequency 229 in order to drive (i) internal clock signals within processor 109d (excluding interface driver 109y) and (ii) internal bus 212 with internal bus driver 212a, and (iii) SRU 109 components attached to bus 212. In this manner, SRU 109 can control and/or reduce phase noise, "spikes" and "drops" in clocking signal timing from clock input 201e. Thus in exemplary embodiments, SRU processor 109d can utilize two clock inputs with two different frequencies, where the first clock input drives external facing bus 202 and the second clock input drives processor 109d and components on internal bus 212. In this manner, errors for communications and signals within processor 109d and electrical components in SRU 109 such as RAM 213 and nonvolatile memory 109a can be reduced.

FIG. 2d

FIG. 2d is a graphical illustration for using an interface between a device and a storage radio unit, in accordance with exemplary embodiments. Other interfaces besides interfaces for SD cards and micro SD cards can be used between device 101 and storage radio unit 109. System 200c in FIG. 2d depicts the use of a serial peripheral interface (SPI), and other possibilities exist as well for the physical interface between device 101 and SRU 109 without departing from the scope of the present disclosure. In other words, the use of a filesystem interface 230' in shared memory 109h is not required for some exemplary embodiments, and the benefits of a system 100 in FIG. 1, system 200a in FIG. 2a, system 200b in FIG. 2b, and system 400 in FIG. 4, can be obtained without the use of a filesystem interface for a shared memory interface 230.

Device drivers 101g can include an SRU driver 234, where SRU driver controls the operation of SRU 109. SRU driver 234 could comprise a driver similar to a modem or module driver for a typical radio module for devices, with the addition of also controlling files in a nonvolatile memory of 109a of SRU 109. In other words, SRU 109 can include a radio and nonvolatile memory for device 101, and SRU driver 234 can comprise a driver using conventional technology for SRU 109 (e.g. a specific driver for the device OS 101h). When using an SPI interface in system 200d, device 101 can also include an SPI master driver 235. SPI master driver 235 can include both an SPI memory library 235a and an SPI radio AT command library 235b.

SPI memory library 235a can support a first, memory interface 239a to memory core interface 109m operating in SRU 109. The memory interface 239a can pass through an SPI physical interface 236 for device 101, external pins 109x for storage radio unit 109, and SPI slave driver 237 in SRU 109 in order to communicate data with memory core interface 109m. Processor 109d can also be in the flow and control data sent and received over memory interface 239a between device 101 and memory core interface 109m. Device 101 can write and read data in nonvolatile memory 109a using memory interface 239a, where memory interface 239a uses an SPI interface. Other interfaces besides an SPI interface could be used as well, such as, but not limited to, a PCIe interface, serial interface, etc.

SPI radio AT command library 235b can support a second, AT interface 239b to radio unit 109b. The AT interface 239b can pass through an SPI physical interface 236 for device 101, external pins 109x for storage radio unit 109, and SPI slave driver 237 in SRU 109 in order to communicate data with AT command core 238. Processor 109d can also be in the flow and control data sent and received over memory interface 239b between device 101 and AT command core 238. AT command core 238 can drive and control radio unit 109b with conventional technology for an AT command set using AT command stack 109s, which is typical and standard for radio units, modules, and modems as of 2018. Device 101 can write AT commands to radio 109b via AT interface 239b and receive responses from radio 109b via AT interface 239b. In other words, AT interface 239b can operate as a traditional SPI interface for SRU 109 in some exemplary embodiments. Although an SPI interface is depicted in FIG. 2d, other physical interfaces could be supported using the components and logic shown, such as an I2C, PCIe, PCI, UART, or serial interfaces, and other possibilities exist as well. An AT interface 239b and/or memory interface 239a could use a point-to-point protocol at a higher level than the physical layer in order to support communication between a device 101 and storage radio unit 109b.

FIG. 2e

Figure 2E:
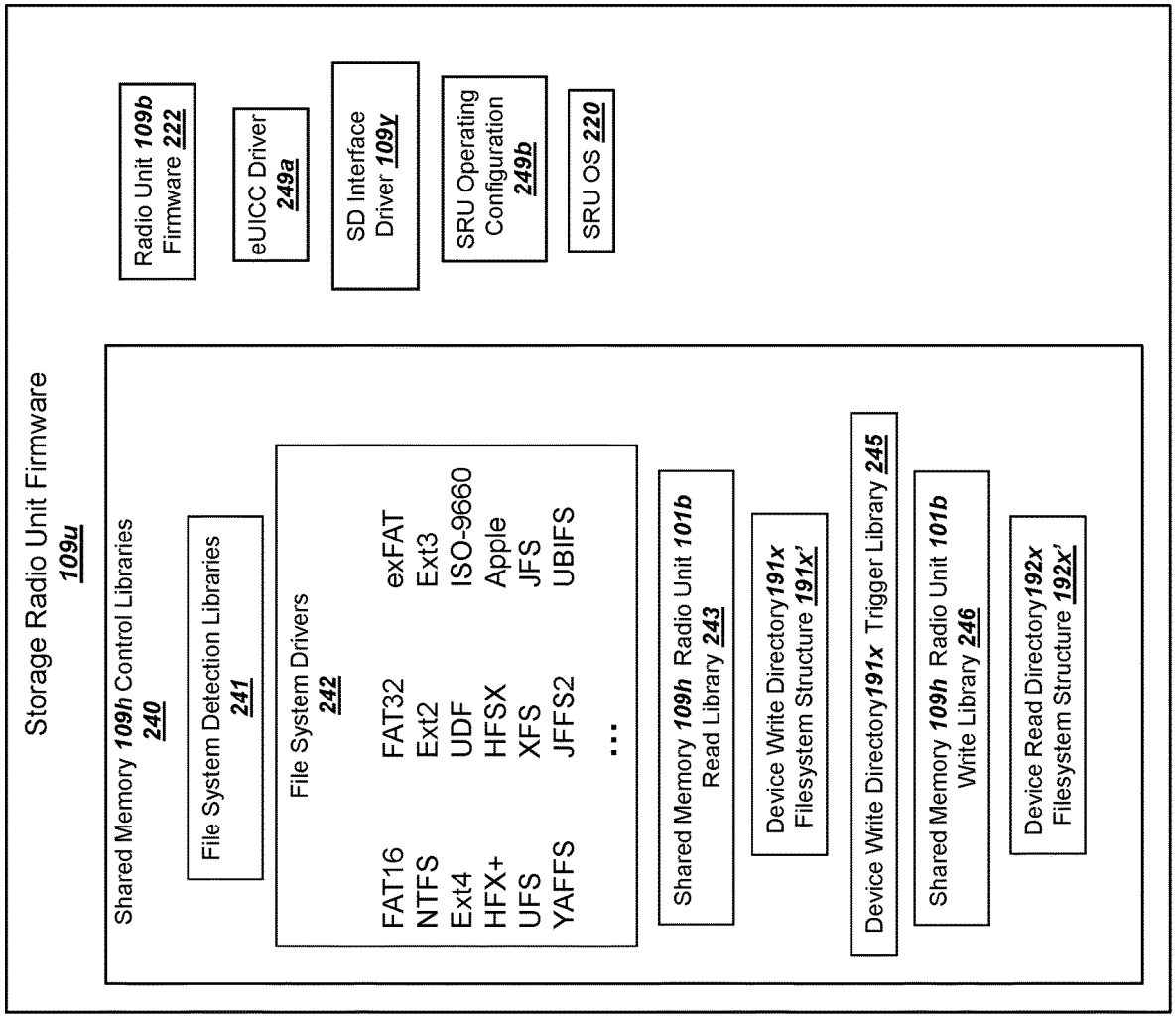
FIG. 2e is a graphical illustration of storage radio unit firmware 109u, in accordance with exemplary embodiments.

FIG. 2e is a graphical illustration of storage radio unit firmware 109u, in accordance with exemplary embodiments. SRU firmware 109u can be recorded in nonvolatile memory 109r when SRU 109 is powered off, and an initial set of SRU firmware 109u could be loaded into SRU 109 by a manufacturer of SRU 109, distributor of SRU 109, SRU-SP 106, or possibly device service provider 110. As described above in connection with FIG. 1c and FIG. 2a, SRU firmware 109u can be loaded by SRU 109 using boot firmware 217 and a boot configuration 218 recorded in EEPROM 216. SRU firmware 109u can include shared memory control libraries 240 for shared memory 109h, radio unit firmware 222 for radio unit 109b, an eUICC driver 249 for eUICC 113, an SD interface driver 109y for bus 202 and electrical pins 109x, SRU operating configuration 249b for SRU 109, and an operating system for SRU 109 comprising SRU OS 220. Although an SD interface driver 109y is depicted in FIG. 2e, the interface driver could support other bus types communicating through electrical pins 109x.

Radio unit firmware 222 for radio unit 109b can include instructions and executable machine code and/or software libraries for processor 109c with radio unit 109b. Radio unit firmware 222 can include libraries for the operation of radio unit 109b, including an operating system for radio unit 109b. Radio unit firmware 222 can include firmware components to control and/or operate baseband unit 206, RF transceiver unit 204, RF front end 203, and interface with power control unit 109e and internal bus 212. Radio unit firmware can also include the logic and software/firmware for radio unit 109b to attach to wireless network 102 and transmit/receive data with wireless network 102 and also SRU-SP 106.

eUICC driver 249a can comprise instructions for radio unit 109b and processor 109c to communicate with eUICC 113. eUICC driver 249a can support an ES8 interface and data between eUICC 113 and an SM-DP (through radio unit 109b and wireless network 102), an ES5 interface and data between eUICC 113 and an SM-SR 107 (through radio unit 109b and wireless network 102), an ES10 interface and data between eUICC 113 and a local profile assistant operating in device 101 or SRU 109. In some exemplary embodiments, the communication of an ES10 interface for eUICC 113 can be with a server external to device 101, such as within SRU-SP 106. ES8 and ES5 interfaces and data are defined in GSM technical specification SGP.02. ES10 interface and data are specified in GSM technical specification SGP.22. eUICC driver 249a can also support communication between processor 109c in radio unit 109b and eUICC 113 such that eUICC 113 can operate with profiles 113c and 113d with network credentials and network parameters similar to a traditional SIM card in order for radio unit 109b to authenticate and connect with wireless network 102.

Interface driver 109y can comprise a driver for SRU 109 to communicate with device 101 via electrical pins 109x, and could comprise an SD bus driver for SRU 109 for SD card driver 101k in device 101. Other bus types and interfaces are possible as well for an interface driver 109*y* and driver 101*k* without departing from the scope of the present disclosure, and in exemplary embodiments driver 109*y* and driver 101*k* are of the same type and are compatible, as well as the electrical signals through electrical pins 109*x*. Drivers 109*y* and 101*k* are also described above, such as with FIG. 1*b* for device 101 with driver 101*k* and FIG. 1*c* and FIG. 2*a* for driver 109*y*.

SRU operating configuration 249*b* can comprise data, a file, or instructions for the operation of SRU 109. SRU operating configuration 249*b* can specify (i) the bus types for bus 202 and bus 212, (ii) values and settings for SRU 109 and radio unit 109*b* including timers, frequencies to utilize, memory allocations and settings for nonvolatile memory 109*a*, (iii) initial or power on settings for SRU 109, (iv) a list of supported capabilities for SRU 109, and (v) filesystem types, parameters, and partition information for data recorded in memory 109*a*, (vi) PLL 211 settings and clock settings, (vii) the settings or selection of a switch 203*a* to select an antenna for use by SRU 109. SRU operating configuration 249*b* can comprise a file such as an XML file, text file, and other possibilities exist as well without departing from the scope of the present disclosure.

In exemplary embodiments where SRU 109 includes a NVRAM for RAM 213 (e.g. in FIG. 5*a*), after boot or an initial power up, SRU 109 records SRU operating configuration 249*b* in RAM 213 (shown in FIG. 2*a*). RAM 213 can comprise an NVRAM, such that upon a subsequent power on, SRU 109 can read operating configuration 249*b* quickly from RAM 213 as NVRAM without first having to read and extract SRU operating configuration 249*b* from firmware 109*u* or flash nonvolatile memory 109*r*. SRU OS 220 can comprise an operating system suitable for SRU 109. Example operating systems 220 for SRU 109 include eCos, uC/OS, LiteOs, Contiki, OpenWRT, Raspbian, and other possibilities exist as well without departing from the scope of the present disclosure.

Shared memory control libraries 240 for shared memory 109*h* in SRU firmware 109*u* can include filesystem detection libraries 241, filesystem drivers 242, shared memory radio unit read library 243, device write directory filesystem structure 191*x'*, device write directory trigger library 245, shared memory radio unit write library 246, and device write directory filesystem structure 192*x'*. Filesystem detection libraries 241 can read, detect, and determine supported filesystems in device general memory 109*g* such as filesystem 229 (shown in FIG. 2*a*), where device general memory 109*g* can be configured, formatted, and/or partitioned by device 101, device service provider 110, or a user of device 101. Device general memory 109*g* can be configured by a configuration unit 110*d* or by device 101 directly. In exemplary embodiments, memory 109*g* can be configured in SRU 109 with a default file system such as a FAT 32 or an exFAT filesystem, although device 101 or a configuration unit 110*d* could select and write a different filesystem for memory 109*g* after distribution of SRU 109. Filesystem detection libraries 241 can detect and determine a filesystem for memory 109*g* comprising filesystem 229 according to all available and supported filesystems in filesystem drivers 242. The use of a filesystem detection library 241 is also depicted and described in connection with step 255 in FIG. 2*f* below.

Filesystem drivers 242 can comprise kernel modules for OS 220 in order for SRU 109 to access, read, and write files and data to memory 109*f* and memory 109*r*. Since device 101 can specify, format, and control a filesystem 229 in memory 109*g* within memory 109*f*, SRU 109 can preferably support a wide variety of filesystem drivers 242 in order for SRU 109 to read and write data and files for memory 109*f*, where the files and data can be subsequently be compatibly accessed by device 101.

In other words, with conventional technology, a storage unit such an SD card with flash memory storage and a processor 109*d* and memory core interface 109*m* may operate with physical level or layer data and not operate with internal filesystem detection libraries 241 and filesystem drivers 242 in order for the SRU to write data (a) internally generated by the SRU 109 (or received by an NB-IoT network 104 or wireless network 102) and (b) for the device 101 to subsequently read. The source of data input for recording data in memory 109*a* is device 101 with conventional technology, while for exemplary embodiments the source of data input for recording data in memory 109*a* is internally generated by SRU 109.

Filesystem drivers 242 can support any standard filesystem used by a device 101 with memory 109*g* and memory 109*f*, such as, but not limited to the filesystem types of FAT16, FAT32, exFAT, NTFS, Ext2, Ext3, Ext4, UDF, ISO-9660, HFX+, HFSX, Apple, UFS, XFS, JFS, YAFFS, JFFS2, UBIFS, and other possibilities exist as well, including subsequent, future, or related filesystems for these exemplary filesystems of a filesystem 229. In exemplary embodiments, SRU 109 can support a plurality of filesystem drivers 242 such as those depicted in FIG. 2*f* and select an individual filesystem driver 242 for OS 220 in SRU 109 to read and write files to memory 109*h* based on a detected filesystem for device 101 in memory 109*g*. In exemplary embodiments, not all depicted filesystem drivers 242 within SRU 109 are required, and a subset of the filesystems could be selected for SRU 109.

Read libraries 243 can provide machine executable code for processor 109*d* to read data from device 101 using shared memory 109*h*. Read libraries 243 can be selected from filesystem drivers 242 to be compatible with filesystem 229 used by device 101 for memory 109*g*. The data read from shared memory 109*h* by read libraries 243 could be used with RU 109*b* or input into RU 109*b*. In this manner by using read libraries 243, memory 109*h* can provide the physical and logical interface for RU 109*b* to receive data from device 101. Read libraries 243 could specify memory addresses or file locations in a shared file system 230 for non-volatile memory 109*h* where device 101 can write data in order to be read by SRU 109 and RU 109*b*. In an exemplary embodiment, (i) device 101 could write a file with a name "http request" 191*a* (such a URL with parameters for server B 110*a*) to a specified location or file name in shared memory 109*h*, such as the depicted memory for device write and radio unit read memory 191 in FIG. 2*b* above, and then (ii) read libraries 243 could instruct processor 109*c* or processor 109*d* to read the data in 191 and subsequently use data 191 (which could comprise the exemplary http request 191*a*) for transmission through radio unit 109*b* to SRU-SP 106 and/or server B 110*a*.

In exemplary embodiments, either (a) processor 109*d* could operate read libraries 242 and pass the data from memory 191 to processor 109*c* in radio unit 109*b*, or (b) processor 109*c* could operate read libraries 242 and read from memory 191 directly in order to pass the data 112*a* to wireless network 102. Other possibilities exist as well for an SRU 109 to read data input from device 101 into a shared filesystem 230' in storage radio unit 109 without departing from the scope of the present disclosure. Device write directory filesystem structure 191*x'* in device 101 (shown in FIG. 1*b*) can specify the names of files and/or settings within a directory of shared filesystem interface 230' for device 101 to utilize in order for device 101 to send data to radio unit 109b. Device write directory filesystem structure 191x' can comprise the structure of a device write directory 191x with pre-agreed file names for data input from device 101 into SRU 109 for RU 109b. For example, the recoding the filesystem structure 191x' by device 101 is depicted and described for device 101 in FIG. 1b. An exemplary device write directory 191x using a pre-agreed filesystem structure 191x' is depicted and described in connection with FIG. 3a below.

Write libraries 246 can provide machine executable code for processor 109d to write data output from radio unit 109b to memory 109h and shared filesystem interface 230' in order for device 101 subsequently read for data input into device 101. Write libraries 246 can be selected from filesystem drivers 242 to be compatible with filesystem 229 used by device 101 for memory 109g. Note that filesystem 229 by device 101 can also be used as the filesystem for memory 101h. In this manner, write libraries 246 could provide the logical software or firmware interface for RU 109b to send data received from wireless network 102 to device 101, and other possibilities exist as well for the transfer of data from RU 109b to device 101 through a shared filesystem interface 230' in shared memory 109h without departing from the scope of the present disclosure.

Write libraries 246 could specify memory addresses or file locations in a file system 230 for non-volatile memory 109h where RU 109b using processor 109c can write data in order to be subsequently read by device 101. In an exemplary embodiment, (i) RU 109b could write a file with a name "http response.htm" 192a (such as data received from server B 110a and/or SRU-SP 106 via wireless network 102) to a specified file location in memory 109h, such as the depicted memory 192 for device read and radio unit write operations, and then (ii) device 101 could subsequently read the data in 192 via bus 202 in order to obtain the server B response 112b data depicted in FIG. 1a.

In exemplary embodiments, either (a) processor 109d could operate write libraries 246 and pass the data from processor 109c in radio unit 109b to memory 192, or (b) processor 109c could operate write libraries 246 and write to memory 192 in shared memory 109h directly in order to pass the data 112b from wireless network 102 to device 101. Other possibilities exist as well for an SRU 109 to write data 112b output for device 101 into a shared filesystem 230' in storage radio unit 109 without departing from the scope of the present disclosure. Device read directory filesystem structure 192x' can specify the names of files within a directory of shared filesystem interface 230' for device 101 to utilize in order for device 101 to read data from radio unit 109b. Device read directory filesystem structure 192x' can comprise settings for a directory with pre-agreed file names for data input from RU 109b (and/or SRU 109) into shared memory 109h or shared filesystem 230' for device 101 to subsequent read as data 112b input into device 101.

Note that device 101 can also store and operate with a device read filesystem structure 192x' in device program 101i including data reporting libraries 101x. An exemplary device write directory filesystem structure 192x is depicted and described in connection with FIG. 3b below. In exemplary embodiments the separate read and write functions in SRU firmware 109u in FIG. 2e and separate read and write memory in shared memory 109h could be combined into a single read/write function in SRU firmware 109u and a single read/write memory or set of files in shared memory 109h.

In an exemplary embodiment described above for FIG. 2e, SRU 109, using read libraries 243 and write libraries 246, can (i) read data from device 101 using shared memory 109h and (ii) write data to memory 109h, where device 101 can subsequently read data from memory 109h. In another embodiment, write libraries 246 could provide instructions for SRU to write data 112b directly to RAM 101e or processor 101b, but in this case a closely coupled software and firmware interface between SRU 109 and device 101 through electrical pins 109a and/or bus 202 would be required. For example an SPI bus mode, a one-bit SD bus mode, or a four-bit SD bus mode for the interface through electrical pins 109a would not normally be able to support SRU 109 writing data directly to RAM 101e or processor 101b without instruction from device 101 (e.g. SRU 109 with conventional technology is a "slave" or "client" and device 101 is a "master" or "host"), so alternative bus technology connecting storage radio unit 109 and device 101 could be utilized for SRU 109 to write data directly to RAM 101e or processor 101b (without instruction from device 101).

Trigger library 245 can comprise executable machine code for SRU 109 and processor 109d to automatically detect when device 101 writes data to shared memory 109h and/or shared filesystem 230' with device write memory 191. Processor 109d using a trigger library 245 could provide an alternative to RU 109b polling 232 depicted in FIG. 2b above, and in this manner RU polling 232 could be bypassed and processor 109d could signal RU 109b when data is available in memory 191 for RU 109b to read, process, and/or transmit to wireless network 102. In exemplary embodiments, trigger library 245 is coupled with power control unit 109e (from FIG. 1c and FIG. 2a above), such that power control unit 109e (a) instructs RU 109b to enter a sleep mode (without requiring polling 232) when no new or "untransmitted" data 112a is available from device 101 in memory 109h and shared filesystem 230', and (b) instructs RU 109b to wake or enter an active mode when new data 112a has been written by device 101 to memory 109h as detected and processed by a trigger library 245. After a confirmation or response data 112b is received by SRU 109 and written to shared memory 192, power control unit 109e could instruct radio unit 109b to enter a sleep or deep sleep mode or state, such as consuming less than an exemplary 5 microamps.

Note that the use of a trigger library 245 and a power control unit 109e in conjunction can help minimize the time radio unit 109b remains in an active state, where data 112b can be recorded in nonvolatile memory 192 after receipt by RU 109b from wireless network 102, and RU 109b can consequently enter a sleep mode without having to wait for device 101 or device CPU 101b to read the data 112b. Device 101 can read the server/network response data 112b from memory 192 in memory 109h at a time that is convenient and/or optimized energy utilization for device 101 and CPU 101b. In an exemplary embodiment, device 101 could enter a sleep state while RU 109b is sending data 112a and receiving data 112b (as depicted and described in connection with FIG. 4a below), and SRU 109 would prefer to not wait until device 101 wakes in order to pass server B response data 112b to device 101.

In other words, through the use of a nonvolatile memory 192 to store or record (a) server/network response data 112b in response to (a) device 101 transmitted data 112a, the amount of time that CPU 101b is active and RU 109b is active can be reduced compared to conventional technology, since the communication between CPU 101b and RU 109b can take place through a nonvolatile shared memory interface. Likewise, for device transmit data 112*a* (e.g. application data 112*a*), CPU 109*b* in device 101 could write the data in memory 191 for memory 109*h* while RU 109*b* sleeps. Then, CPU 109*b* can essentially immediately enter a sleep state and remain in a sleep state until (i) RU 109*b* writes server B response data 112*b* in memory 192 and SRU 109 can (ii.a) send a signal via pins 109*x* for CPU 109*b* to wake and read data 112*b* from memory 192 and (ii.b) sleep RU 109*b* essentially immediately after data 112*b* is written to memory 192 in shared memory 109*hs*.

FIG. 2*f*

Figure 2F:
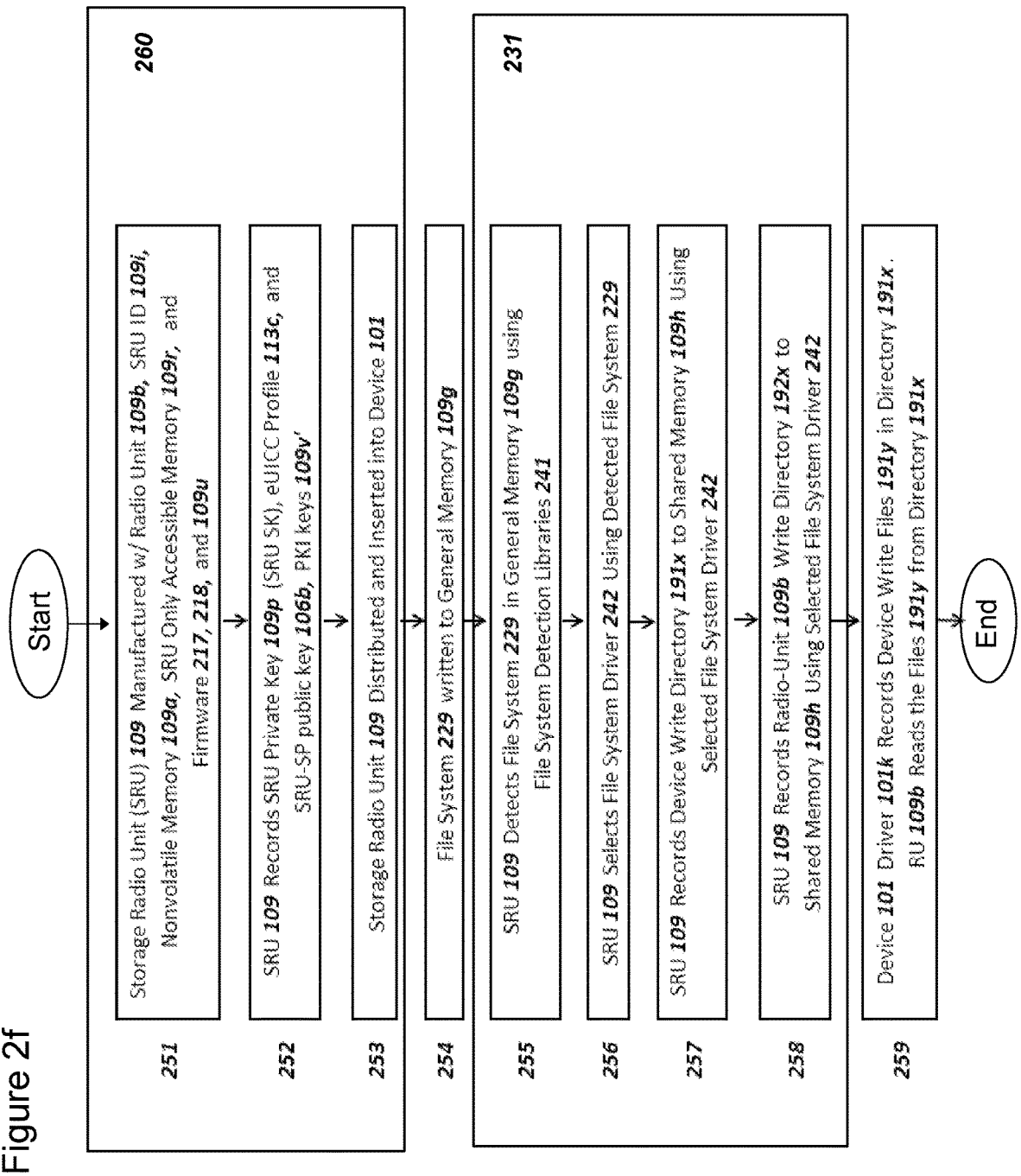
FIG. 2f is a flow chart illustrating exemplary steps for configuring a storage radio unit to communicate with a device using a shared nonvolatile memory interface, in accordance with exemplary embodiments.

FIG. 2*f* is a flow chart illustrating exemplary steps for configuring a storage radio unit to communicate with a device using a shared nonvolatile memory interface, in accordance with exemplary embodiments. In order for storage radio unit (SRU) 109 to communicate with device 101 through a shared memory 109*h* and a shared nonvolatile memory interface 230 (which can comprise a shared filesystem interface) depicted described above, including in FIG. 1*c* and FIG. 2*a*, an SRU 109 can conduct a configuration process with steps depicted in FIG. 2*f*.

The processes and operations, described below with respect to all of the logic flow diagrams may include the manipulation of signals by a processor and the maintenance of these signals within data structures resident in one or more memory storage devices. For the purposes of this discussion, a process can be generally conceived to be a sequence of computer-executed steps leading to a desired result.

These steps usually require physical manipulations of physical quantities. Usually, though not necessarily, these quantities take the form of electrical, magnetic, or optical signals capable of being stored, transferred, combined, compared, or otherwise manipulated. It is convention for those skilled in the art to refer to representations of these signals as bits, bytes, words, information, elements, symbols, characters, numbers, points, data, entries, objects, images, files, or the like. It should be kept in mind, however, that these and similar terms are associated with appropriate physical quantities for computer operations, and that these terms are merely conventional labels applied to physical quantities that exist within and during operation of the computer.

It should also be understood that manipulations within the computer are often referred to in terms such as listing, creating, adding, calculating, comparing, moving, receiving, determining, configuring, identifying, populating, loading, performing, executing, storing etc. that are often associated with manual operations performed by a human operator. The operations described herein can be machine operations performed in conjunction with various input provided by a human operator or user that interacts with the computer.

In addition, it should be understood that the programs, processes, methods, etc. described herein are not related or limited to any particular computer or apparatus. Rather, various types of general purpose machines may be used with the following process in accordance with the teachings described herein.

The present disclosure may comprise a computer program or hardware or a combination thereof which embodies the functions described herein and illustrated in the appended flow charts. However, it should be apparent that there could be many different ways of implementing the disclosure in computer programming or hardware design, and the disclosure should not be construed as limited to any one set of computer program instructions.

Further, a skilled programmer would be able to write such a computer program or identify the appropriate hardware circuits to implement the disclosed disclosure without difficulty based on the flow charts and associated description in the application text, for example. Therefore, disclosure of a particular set of program code instructions or detailed hardware devices is not considered necessary for an adequate understanding of how to make and use the disclosure. The inventive functionality of the claimed computer implemented processes will be explained in more detail in the following description in conjunction with the remaining Figures illustrating other process flows.

Further, certain steps in the processes or process flow described in all of the logic flow diagrams below must naturally precede others for the present disclosure to function as described. However, the present disclosure is not limited to the order of the steps described if such order or sequence does not alter the functionality of the present disclosure. That is, it is recognized that some steps may be performed before, after, or in parallel other steps without departing from the scope and spirit of the present disclosure.

The processes, operations, and steps performed by the hardware and software described in this document usually include the manipulation of signals by a CPU or remote server and the maintenance of these signals within data structures resident in one or more of the local or remote memory storage devices. Such data structures impose a physical organization upon the collection of data stored within a memory storage device and represent specific electrical or magnetic elements. These symbolic representations are the means used by those skilled in the art of computer programming and computer construction to most effectively convey teachings and discoveries to others skilled in the art.

At step 251, SRU 109 can be manufactured w/radio unit 109*b*, SRU ID 109*i*, nonvolatile memory 109*a*, SRU only accessible memory 109*r*, and firmware 217, 218, and 109*u*. Other electrical components for an SRU 109 depicted in FIG. 2*a* could be included in a manufacturing step 251 as well. SRU firmware 109*u* as depicted in FIG. 2*e* above can include an operating system 220 and filesystem drivers 242 for SRU 109, as well as the other data depicted for SRU firmware 109*u*. An SRU-SP 106 could then receive the manufactured SRU 109 units from a step 251 and conduct a step 252 to write configuration data to SRU 109. Other entities such as a device service provider 110 or distributor of SRU 109 could conduct a step 252 as well. At step 252, SRU 109 records SRU private key SRU SK 109*p*, eUICC bootstrap profile 113*c*, and SRU-SP certificate with an SRU-SP public key 106*b*. For a step 252, SRU 109 could derive SRU SK 109*p* and SRU PK 109*w*, using the same steps and data to derive ephemeral PKI keys in a step 409 below in FIG. 4 (but with different PKI keys output). SRU PK 109*w* could be written to memory 192 after a set of configuration step 231 format or structure the shared memory 192. SRU firmware 109*u* could be recorded in a step 252 instead of a step 251, and other possibilities for the sequence of steps depicted in FIG. 2*f* are possible as well without departing from the scope of the present disclosure. A configuration unit similar to configuration unit 110*d* in FIG. 1*a* could conduct step 252 with SRU 109.

At step 253, SRU 109 can be distributed and inserted into a device 101. SRU 109 could be inserted into device 101 during manufacturing of device 101, or after device 101 is distributed to users or organizations owning device 101, where the user or entity owning device 101 inserts SRU 109. For example, with embodiments where SRU 109 comprises a micro SD card form factor such as within a housing 227, SRU 109 could be inserted into device 101 in a step 253. SRU 109 could comprise an integrated circuit or wafer level chip scale package for inclusion in device 101, and SRU 109 could be soldered onto a circuit board or inserted into a larger wafer level package in step 253. SRU 109 could comprise a module or components with a larger, integrated circuit comprising a system on a chip 801 from FIG. 8, where a step 253 can be including the components for an SRU 109 on the system on a chip 801. As depicted in FIG. 2*f*, the collection of steps 251 through 253 can comprise a step 260.

At step 254 a filesystem 229 can be written to memory 109*g* in nonvolatile memory 109*a* of storage unit 109. The exemplary filesystem 229 could comprise any of the exemplary file systems depicted and described in connection with FIG. 2*e* above. A configuration unit 110*a* for device service provider 110 could write the filesystem 229 to memory 109*g*. Or, device 101 could perform the steps of a filesystem 229 configuration on SRU 109, equivalent to a personal computer formatting a USB memory stick or SD card with a file system. Other possibilities for conducting a step 254 include a manufacturer of SRU 109 or SRU-SP 106 (i) creating a default filesystem for SRU 109, which could be an exFAT or FAT32 file system, and (ii) writing the default filesystem to memory 109*g*. For example, SRU-SP 106 could create filesystem 229 when data is written to SRU 109 in a step 252 above. General files for device 101 could also be written in a step 254, such as writing a device OS 101*h* within the filesystem 229. Other data, including device reporting libraries 101*x* and device drivers 101*g* can be recorded in the filesystem 229 in a step 254. Note that a step 254 can be conducted before a step 253, such that memory 101*g* with filesystem 229 includes data for device 101 to operate before SRU 109 is inserted into device 101.

At step 255, SRU 109 can receive power from device 101 and boot with boot firmware 217 and boot configuration 218. SRU 109 can load firmware 109*u* in order to begin operating. SRU 109 can conduct a step 255 with filesystem detection libraries 241 and filesystem drivers 242 in order to determine and read from the filesystem 229 previously written to device general memory 109*g* in step 254. In other words, processor 109*d* can (i) read the locally stored files in memory 109*a* and memory 109*g* using filesystem detection libraries 241 in order to (ii) determine the type of filesystem 229. The determined or detected type of filesystem 229 from a step 255 could comprise any of the listed exemplary file systems from FIG. 2*d* above. Note that SRU 109 can conduct a step 255 without requiring any input from device 101 during a step 255, other than device 101 providing an electrical power source.

At step 256, SRU 109 can select a file system driver 242 based on the detected and determined file system 229 from a step 255. At step 257, SRU 109 can write SRU 109 device write directory 191*x* to shared memory 109*h* using the selected file system driver 242. A step 257 can also include SRU 109 conducting a filesystem formatting process, in order to write the filesystem 229 to memory 191 in shared memory 109*h*. Or, in a step 257, SRU 109 can write files for memory 191 in an existing filesystem detected for filesystem 229. In other words, SRU 109 can add a directory 191*x* to an existing filesystem 229, and the directory 191*x* can comprise device write memory 191. Thus, a directory 191*x* could comprise a directory added to an existing filesystem 229, where the directory 191*x* could comprise a portion of the shared nonvolatile memory 109*h*.

SRU 109 can use (i) memory write libraries 217*c* from boot firmware and (ii) memory core interface 109*m* in order to change NAND and/or NOR flash memory gates, or memory blocks in order to write binary data to memory 109*h*, where the resulting binary data written can comprise a device write directory 191*x* for the file system 229. Device write directory 191*x* at step 257 can also include base data such as the exemplary files and data depicted in FIG. 3*a* below. The file permissions 301*a* for a device write directory (in FIG. 3*a* below) can be set at the same time as a step 257. In addition, user a 302*a* and user b 302*b* can be specified (shown in FIG. 3*a* below). Further, a step 257 can comprise SRU 109 specifying that user a 302*a* for file permissions 301*a* in device write directory 191*x* can be the same as user a 302*a* for filesystem 229 in general memory 109*g* for device 101. In this manner, device 101 can determine that OS 101*h* also has write access to directory 191*x* (since OS 101*h* or the equivalent user can be the user a 302*a* in a filesystem 229 for memory 109*g*).

At step 258, SRU 109 can write SRU write directory 192*x* to shared memory 109*h* using the selected file system driver 242. Or, in a step 258, SRU 109 can write files for memory 192 in an existing filesystem detected for filesystem 229. In other words, SRU 109 can add a directory 192*x* to an existing filesystem 229, and the directory 192*x* can comprise device write memory 192. SRU 109 can use (i) memory write libraries 217*c* from boot firmware and (ii) memory core interface 109*m* in order to change NAND and/or NOR flash memory gates, or memory blocks in order to write binary data to memory 109*h*, where the resulting binary data written can comprise a RU write directory 192*x* for the file system 229. RU write directory 192*x* (or equivalently device read directory 192*x*) at step 258 can also include base data such as the exemplary files and data depicted in FIG. 3*b* below. The file permissions 301*a* and 301*b* for a RU write directory (in FIG. 3*a* below) can be set at the same time as a step 258. In addition, user a 302*a* and user b 302*b* can be specified.

Further, a step 258 can comprise SRU 109 specifying that user a 302*a* for file permissions 301*a* in RU write directory 192*x* can be the same as user a 302*a* for filesystem 229 in general memory 109*g* for device 101. In this manner, device 101 can determine that OS 101*h* also has read access to directory 192*x* (since OS 101*h* can be the user a 302*a* in a filesystem 229 for memory 109*g*). As depicted in FIG. 2*f*, the collection of steps 255 through 258 can comprise a configuration step 231, and a configuration step 231 is also depicted and described in connection with FIG. 2*b* above. Configuration step 231 can also be referred to as a configuration process 231.

At step 259, device 101 driver 101*k* can record or store device write files in directory 191*x*, such as data from reporting libraries 101*x* which could also comprise application data 112*a* from FIG. 1*a* above. As noted above in FIG. 2*e*, CPU 101*b* can sleep after writing data to directory 191*x*, since the data is stored in a nonvolatile flash memory and RU 109*b* can read the data at a later time after CPU 101*b* enters a sleep state. Note that power to SRU 109 via electrical pins 109*x* can continue after CPU 101*b* enters a sleep state. A power control unit 109*e* can detect new data in directory 191*x*, such as from a trigger in a trigger library 245, and power up and change RU 109*b* from a sleep state to an active statue. After either (i) a RU polling 232 detection of new data in directory 191*x* or (ii) a trigger library 245 detection or recording of new data in directory 191*x*, RU 109*b* can subsequently read the data from directory 191*x* and process the data. If the data written to directory 191*x* comprises application data 112*a*, then RU 109*b* can transmit the data to a wireless network 102.

FIG. 3*a*

FIG. 3*a* is a graphical illustration of a shared filesystem interface for a radio storage unit and a device, using a device write directory, in accordance with exemplary embodiments. SRU 109 can operate and record a device write and RU read memory 191, where memory 191 can reside within shared nonvolatile memory 109*h* (as depicted in FIG. 2*a*). Shared nonvolatile memory 109*h* could be formatted with a shared filesystem 230' using the configuration steps 231, such that device 101 could write to shared filesystem 230' and RU 109*b* and SRU 109 could read from shared filesystem 230'. In addition, memory 191 can be referred to as "radio unit read and device write memory" 191 or simply memory 191. Shared filesystem memory 230 device write directory 191*x* is depicted as viewable and readable from device operating system 101*h* with a file path " . . . /device_write/ . . . " although other file paths are possible as well.

Note that shared filesystem 230' could also be presented to device operating system 101*h* after configuration process 231 as a separate drive or mounted filesystem for device 101. Device write directory 191*x* could also be referred to as RU read directory 191*x*. Or, directory 191*x* could appear in operating system 101*h* as a new directory 191*x* in existing filesystem 229 for device 101 after a configuration step 231. In addition, any files recorded in shared filesystem 230' may preferably be recorded in a nonvolatile state, such that the files remain available to device 101 and SRU 109 and RU 109*b* when (i) power is removed from device 101 and/or SRU 109 and RU 109*b*, and (ii) power is subsequently provided to device 101 and/or SRU 109 and RU 109*b*.

Device write directory 191*x* could include a plurality of different files 191*y* over the lifetime of operation of SRU 109 and device 101. Although a plurality of different files 191*y* are depicted in FIG. 3*a*, not all files may be present in directory 191*x* within shared filesystem 230' at the same time and the different files depicted within device write directory 191*x* in FIG. 3*a* could be written by device 101 and read by RU 109*b* at different points in time. In some exemplary embodiments, such as those depicted in FIG. 3*a*, directory 191*x* could be initialized after a configuration process 231 with an empty set of files, where SRU 109 and RU 109*b* can wait for device 101 to send files, data, or commands or data for RU 109*b* within SRU 109 in the form of at least one file 191*y*.

Exemplary files for a device write directory 191*x* within device write and RU read memory 191 can comprise files 191*y*. Exemplary files 191*y* can comprise files for radio_parameters_input 191*a*, http(s)_request 191*b*, MO_sms 191*c*, FTP_file_upload 191*d*, command_script 191*g*, power_control_settings 191*f*, device_identity 101*a*, cryptographic_settings 191*e*, and date-time-set 191*h*. Other files or data for a device write directory 191*x* are possible as well without departing from the scope of the present disclosure. The files 191*y* can comprise text, numeric, or binary data according to encoding rules such as using URL encoding with http(s)_request, and UTF-8 for MO_sms 191*c*, and other possibilities exist as well. Device reporting libraries 101*x* in device 101 and radio unit read library 243 could agree or be configured to use a mutually compatible encoding rules for each of the files 191*y* and/or file types in directory 191*x*.

Radio_parameters_input 191*a* in files 191*y* can comprise data in a file format for radio settings 191*a* depicted in FIG. 2*b*. Values could specify frequencies for RU 109*b* to utilize, RF networking technology to utilize, such as NB-IoT 104 or LTE Cat M1 or other settings as well. Radio_parameters_input 191*a* could specify a server B 110*a* name or address to utilize for the transmission of application data 112*a* through radio unit 109*b*, wireless network 102, and SRU-SP 106. Radio_parameters_input 191*a* could also include values for timers and counters for radio unit 109*b* to utilize, such as a retry timers and counters for the transmission of application data 112*a*. For embodiments where SRU 109 includes more than one eUICC 113, radio_parameters_input 191*a* can specify a preferred or primary eUICC 113 for RU 109*b* to utilize, where each different eUICC 113 could record and operate with a different operational profile 113*d*. In this manner, device 101 could select a set of network access credentials and network parameters for RU 109*b*.

Http(s)_request 191*b*, MO_sms 191*c*, and FTP_file_upload 191*d* could comprise the file format for stored data in a shared filesystem interface 230' equivalent to the values and data depicted and described for device write and radio unit read memory 191 in FIG. 2*b*. Device 101 could write other application data 112*a* to device write directory and device write files 191*y* as well, including an outbound email message, a Message Queuing Telemetry Transport (MQTT) message, a Session Initiation Protocol (SIP) message, and other possibilities exist as well without departing from the scope of the present disclosure. Http(s)_request 191*b*, MO_sms 191*c*, and FTP_file_upload 191*d* and the other listed exemplary messages from the previous sentence individually or together could comprise exemplary application data 112*a* from FIG. 1*a*, as depicted in FIG. 3*a*.

Other possibilities exist as well for application data 112*a* in a file 191*y* in directory 191*x* for shared filesystem interface 230' without departing from the scope of the present disclosure. Application data 112*a* could also be written by device 101 in an encrypted form and/or comprise data for RU 109*b* to send to server B 110*a* as TCP or UDP datagrams. Files in application data 112*a* could include destination TCP or UDP port numbers to utilize for RU 109*b* to transmit the data to wireless network 102. Although single values of the files 191*y* for application data 112*a* are depicted in FIG. 3*a*, a directory 191*x* could record multiple different values of the depicted files (such as multiple http(s)_request 191*b* files 191*y* for RU 109*b* to transmit or multiple different MO_sms 191*c* for RU 109*b* to transmit, etc.)

Command_script 191*g* can comprise a file with a set of sequential or programmatic commands for RU 109*b* to conduct, and could be equivalent or similar to an AT command_script. Command script 191*g* could instruct RU 109*b* to periodically attach to wireless network 102 and query server B 110*a* (possibly through SRU-SP 106) in order to check for or obtain new server B data 112*b* for device 101. Command_script 191*g* could instruct RU 109*b* for actions for RU 109*b* to take when no connectivity to a primary or preferred wireless network 102 is available, including the steps to search for backup wireless networks 102. Command script 191*g* could also instruct RU 109 to periodically attach to wireless network 102 and query a different server such as server A 108.

In some exemplary embodiments, command_script 191*g* can comprise a traditional AT command_script for RU 109*b* to execute. AT command_script could use instructions from standards such as 3GPP TS 27.007 or TS 27.005, as well as related or subsequent versions of these standards. In some exemplary embodiments, the command_script 191*g* could include application data 112*a* within the script 191*g*, such that a single file or sequence of data can be passed to RU 109*b*, where the single file or sequence of data includes commands to attach to wireless network 102 and transmit the application data 112*a* for the command_script. Or, the command_script 191g could refer to application data 112a in the form of a file 191y for RU 109b to transmit.

In another exemplary embodiment, processor 109d could read command_script 191g recorded by device 101 and write the command_script 191g to RU 109b using an internal bus 212, where bus 212 could operate with a traditional UART, serial, or SPI interface for RU 109b. In this manner, (i) commercially available radio units or modules with AT command interfaces could be utilized with an RU 109b while (ii) obtaining the benefits of a shared memory interface 230 to transfer the data from CPU 101b in device 101 and RU 109b. Processor 109d could also read application data 112a from a file 191y and pass or write the data to RU 109b. Or, RU 109b could "fetch" or read the application data 112a in the form of a file 191y based on a file path passed along in the command_script 191g. A benefit of using command_script 191g from nonvolatile memory 109h is that CPU 101b can be in a sleep state when RU 109b reads the data and performs the operations specified by the command_script 191g. Other possibilities and benefits exist as well for a directory 191x in a shared filesystem interface 230' to record a command_script 191g for RU 109b without departing from the scope of the present disclosure.

In some exemplary embodiments, command_script 191g could be recorded in a format other than a file 191y within memory 191, such as a sequence of binary data with a start and end memory address within memory 109g, and processor 109d could use libraries 243 and 246 to track the start and end memory addresses. As depicted and described in connection with FIG. 2b, data in memory 109h such as device write memory 191 and RU write memory 192 can be recorded without using a file system. Other data depicted in FIG. 3a could be recorded in memory 191 without using or requiring a traditional file system 229 for memory 191 and memory 192.

Power_control_settings 191f as a file 191y can include settings or values for use with a power control unit 109e by SRU 109 or RU 109b. Power_control_settings 191f could specify the time for RU 109b to remain in an active state or a connected state with wireless network 102 after transmitting application data 112a in order to receive a server B response 112b, such as an exemplary 5 seconds or an exemplary 10 seconds. Power_control_settings 191f could specify the use and values for a power saving mode (PSM) used by radio unit 109b, as well as a frequency or time for radio unit 109b to utilize a discontinuous receive (DRX) mode associated with wireless network 102. Power_control_settings 191g could specify a maximum power utilization by both SRU 109 in total and RU 109b. Power_control_settings 191f could specify the maximum RF power output for RU 109b to utilize in dBm or watts. In another exemplary embodiment, power_control_settings 191f can provide settings or commands for the operation of power control unit 109e.

Device_identity 101a written by a device 101 as a file 191y can comprise the identity of the device 101, which could be sent or transmitted by SRU 109 and RU 109b to SRU-SP 106 and/or server B 110a. Although not depicted in FIG. 3a, a file 191y with a digital signature for device 101 could be written to device write directory 191x as well as a file 191y. The digital signature could be over a file or data in application data 112a for transmission to SRU-SP 106 and/or server B 110a through wireless network 102, and SRU-SP 106 or server B 110a could verify the digital signature for the device using a certificate for device 101 recorded in SRU-SP 106 or server B 110a, where the digital signature could be used by the receiving party of application data 112a along with receipt of device_identity 101a to select the certificate for device 101 and verify the digital signature created by device 101. In this manner, SRU-SP 106 or server B 110a could verify that the application data 112a received by SRU-SP 106 or server B 110a was authentically originated by device 101.

Cryptographic_settings 191e can comprise values, parameters, public keys, and symmetric ciphering keys for RU 109b to utilize. Cryptographic_settings 191e can also be referred to as cryptographic parameters 191e. In an exemplary embodiment, cryptographic_settings 191e could include a public key or certificate for device 101, where device 101 continues to record and operate with the corresponding private key. Cryptographic_settings 191e could specify parameters or values for SRU 109 and/or RU 109b to use with cryptographic algorithms 109q as depicted and described in connection with FIG. 1c above. Cryptographic_settings 191e could select algorithms and/or key lengths to use with an ECDH key exchange, an ECC named curve such as, but not limited to, P-256, secp256k1, P-384, curve25519, and other possibilities exist as well, including algorithms supporting post-quantum cryptography.

Cryptographic_settings 191e could specify which of a plurality of different possible public keys for device 101 recorded in memory 109h that SRU 109 or RU 109b should utilize with cryptographic_algorithms 109q. Cryptographic_settings 191e could also specify which of a plurality of possible secure hash algorithms SRU 109 or RU 109b should utilize in communications over wireless network 102, such as, but not limited to SHA-256, SHA-384, RIPE-160, SHA-3, etc. Cryptographic_settings 191e as a file 191y could also select the use of a symmetric ciphering algorithm for SRU 109 or RU 109b to utilize with communications over wireless network 102, such as, but not limited to, AES-128, 3DES, AES-192, AES-256, blowfish, as well as specifying a cipher mode such as AES-CBC, AES-CTR, AES-SIV, etc.

A date-time-set file 191h could specify the current date and time for SRU 109. In exemplary embodiments, device 101 can record a clock 101m which continues to keep time when device 101 is powered down or off, such as a system time for a personal computer that continues to increment even when the personal computer is powered off (although a battery such as battery 101n could continue to provide a lower level of power in order for device 101 to continue to keep track of time). Since SRU 109 may also be powered down when device 101 is powered down or off, SRU 109 may need an updated value for data and time when SRU 109 is powered up. The value for date and time for SRU 109 and/or RU 109b to utilize can be set by a file 191y with the current date and time. SRU 109 and RU 109a can utilize the date and time from a date-time-set 191h (along with an internal clock for SRU 109 from clock 207 or clock 205) to create timestamp 304a with files 191y recorded in directory 191x. In another exemplary embodiment, RU 109b can obtain the current date and time from wireless network 102, and utilize that date and time with RF clock 205 in order to continuously monitor and track time when SRU 109 is powered. In exemplary embodiments, (i) device 101 writes a value for date and time 191h with application data 112a before CPU 101b sleeps, then (ii) SRU 109 reads the date and time 191h and keeps time using an internal clock such as 205, and then (iii) SRU 109 uses the subsequent date and time calculated from the internal clock to write the date and time values associated with files written by SRU 109 in directory 192x (shown below in FIG. 3b).

File system interface 230 in shared memory 109*h* can also include file parameters or attributes. File parameters may be specific to a selected file system driver 242 and selected file system 229 for directory 191*x* in FIGS. 3*a* and 192*x* below in FIG. 3*b*, and the depicted file parameters in FIG. 3*a* are exemplary. File parameters could include permissions 301*a*, which include values to specify permissions for users 302*a* and 302*b* with the file, such as read, write, execute, etc. Different permissions in permissions 301*a* could be associated with different users 302*a* and 302*b*. Users 302*a* and 302*b* could comprise users for directory 191*x*, such as a device OS and radio unit OS. Depicted users for users 302*a* and 302*b* are exemplary for FIG. 3*a*. Note that the exemplary files 191*y* in directory 191*x* depict two users 302*a* and 302*b* comprising a first user of device 101 (identified as the OS 101*h*) and a second user of SRU 109 (identified as the OS for RU 109*b*). Other possibilities exist as well without departing from the scope of the present disclosure. The user 302*a* could be identified and selected from a user for files in memory 109*g* and filesystem 229.

File parameters for file system interface 230 can include a file size 303*a*, which can comprise the number of bytes for the recorded file 191*y*. Timestamp 304*a* can comprise the date and time when the file 191*y* was written in directory 191*x*. Timestamp 304*a* can be written by OS 101*h*. Although only a year is depicted in FIG. 3*a* for some files, a time value in hours, minutes, and seconds could also be recorded. File parameters or attributes can also include the file name 305*a*. The file names 305*a* and file structure (e.g. encoding, XML fields, JSON fields, etc.) within files 191*y* and directory 191*x* could be pre-agreed via a specification mutually shared between device 101 and SRU 109 before device 101 begins operating with SRU 109. In addition, although device write directory 191*x* and RU write directory 192*x* are depicted in this FIG. 3*a* and FIG. 3*b* below as separate directories within shared filesystem 230', the two directories could be combined, and device write files 191*y* and RU write files 192*y* (below in FIG. 3*b*) could be combined into the same, single directory within shared filesystem 230'.

Although the use of a file system interface 230 is depicted in FIG. 3*a* as the structure of data written by device 101 and read by RU 109*b*, in some exemplary embodiments the use of a shared filesystem interface 230' and files 191*y* and directory 191*x* could be omitted and replaced by the use of a range of memory addresses in shared nonvolatile memory 109*h* for the data. In other words, a range or set of values for memory addresses in memory 109*h* could be used for data in each of the depicted files (instead of recording a file in a filesystem 230) such as a first memory address for the start of 191*a* data, a second memory address for the start of 191*b* data, etc. For these embodiments, the memory addresses for data elements (e.g. 191*a*, 191*b*, etc.) in shared memory 109*h* could be recorded in each of SRU firmware 109*u*, RU firmware 222, and device reporting libraries 101*x*. These embodiments without (A) the use of a shared filesystem interface 230' but with (B) shared nonvolatile memory 109*h* can obtain the benefits described herein, such as benefits from device 101 and RU 109*b* transferring data between the nodes using shared nonvolatile memory 109*h*. In other words, the use of a shared filesystem interface 230' can comprise an exemplary shared memory interface 230 of shared nonvolatile memory 109*h*, and other embodiments could use different structures of a shared nonvolatile memory 109*h* without departing from the scope of the present disclosure. A shared memory interface 230 recording information in shared memory 109*h* could include a shared filesystem interface.

As described herein and as a need in the art, the use of shared nonvolatile memory 109*h* allows device 101 and RU 109*b* to transfer data between the components using independent sleep states. Thus, both CPU 101*b* and RU 109*b* do not both need to be in active states in order to transfer data (thereby allowing overall power consumption for a device 101 to be conserved). In contrast, with conventional technology such as with traditional AT commands for radio units such as traditional cellular modems in devices, both the radio unit and the primary CPU for a device both have to be active (e.g. not in sleep states) in order for AT commands and responses to be transferred between the CPU and the radio unit. Another benefit is that using a shared memory interface in nonvolatile memory (which could be a shared filesystem interface 230) allows both device 101 and SRU 109 to read the last state. Processors with conventional technology could (a) enter deep sleep or off states where RAM memory is flushed, and (b) not track the status of the last commands written or data transferred between device 101 and RU 109*b*, and thus (c) require a longer restart process after exiting an off or deep sleep state, thereby consuming more power or energy. Conventional technology may require start of an AT command_script upon each resumption from an off state for device 101 or SRU 109. Using a shared nonvolatile memory interface 230, intermediate states at the last power down can be both read and quickly resumed.

FIG. 3*b*

FIG. 3*b* is a graphical illustration of a shared filesystem interface for a radio storage unit and a device, using a radio unit write directory, in accordance with exemplary embodiments. SRU 109 can operate and record a RU write and device read memory 192, where memory 192 can reside within shared nonvolatile memory 109*h*. Shared nonvolatile memory 109*h* could be formatted with a shared filesystem 230' using the configuration steps 231, such that (i) device 101 could read from shared filesystem 230' and (ii) RU 109*u* and SRU 109 could write data to shared filesystem 230'. In addition, memory 192 can be referred to as "radio unit write and device read memory" 192 or simply memory 192 or RU write memory 192 or device read memory 192.

Shared filesystem interface 230 RU write directory 192*x* is depicted as viewable and readable from device operating system 101*h* with a file path " . . . /radio-unit write/ . . . " although other file paths are possible as well. Note that shared filesystem 230' could also be presented to device operating system 101*h* after configuration process 231 as a separate drive or mounted filesystem for device 101. Further, a configuration process 231 could insert directory 192*x* into filesystem 229, such that directory 192*x* appears as a separate directory within device memory 109*g*. Device read directory 192*x* could also be referred to as RU write directory 192*x*. In addition, any files recorded in shared filesystem 230' may preferably be recorded in a nonvolatile state, such that the files remain available to device 101 and SRU 109 and RU 109*b* when power is removed from device 101 and/or SRU 109 and RU 109*b*. In addition, memory 109*h* with files 192*y* and 191*y* could continue to record files 192*y* and files 191*y* when either device 101 or SRU 109 or RU 109*b* enter a deep sleep mode or state. The deep sleep mode or state could comprise device RAM 101*e* and SRU RAM 213 (shown in FIG. 2*a*) being flushed or cleared, such that the RAM no longer records usable data. If SRU RAM 213 comprises NVRAM, then SRU RAM 213 would not normally be cleared when power is removed from SRU 109.

RU write directory 192*x* could include a plurality of different files 192*y* over the lifetime of operation of SRU 109 and device 101. Although a plurality of different files 192*y* are depicted in FIG. 3*b*, (a) not all files may be present in directory 192*x* within shared filesystem 230' at the same time and (b) the different files depicted within device write directory 192*x* could be written by RU 109*b* and read by device 101 at different points in time. In some exemplary embodiments, such as those depicted in FIG. 3*b*, directory 192*x* could be initialized after a configuration process 231 with a preliminary set of files, where device 101 could read files such as, but not limited to, radio_parameters_loaded 192*a*, log_file 306, and error_log 309 both (i) after boot or exit from a sleep state of device 101 or CPU 101*b*, and (ii) before RU 109*b* is powered by power control unit 109*e* after SRU 109 receives power from pins 109*x*.

Exemplary files for a RU write directory 192*x* within RU write and device read memory 192 can comprise files 192*y*. Exemplary files 192*y* can comprise files for radio_parameters_loaded 192*a*, http(s)_response 192*b*, MT_sms 192*c* (e.g. mobile terminated SMS), FTP_file_downloaded 192*d*, log_file 306, server B digital signature 307, SRU_identity 109*i*, cryptographic_parameters 192*e*, and radio_network_status 308, error_log 309, and network-date-time 309*b*. Other files or data for a device write directory 192*x* are possible as well without departing from the scope of the present disclosure. The files 192*y* can comprise text, numeric, or binary data according to encoding rules such as using UTF-8, or ISO-8859-X encoding with http(s)_response 192*b*, and UTF-8 for MT_sms 192*c*, and other possibilities exist as well. Device reporting libraries 101*x* in device 101 and radio unit write library 246 could agree or be configured to use a mutually compatible encoding rules for each of the files 192*y* and/or file types in directory 192*x*.

Radio_parameters_loaded 192*a* in files 192*y* can comprise data in a file format for radio settings 192*a* (or "radio configuration") depicted in FIG. 2*b*. Radio_parameters_loaded 192*a* could comprise the default values or last utilized parameters or loaded parameters for radio 109*b* before device 101 writes data to radio_parameters_settings 191*a*. Values could specify frequencies, bands, or channels that RU 109*b* is configured for or available to RU 109*b*, RF networking technology to utilize, such as NB-IoT 104, a WiFi version such as n, ac, ah, or ax, or LTE Cat M1 or other settings as well. Radio_parameters_loaded 192*a* could identity a server B 110*a* name or address that SRU 109 or RU 109*b* utilizes for the transmission of application data 112*a* through radio unit 109*b*, wireless network 102, and SRU-SP 106. Radio_parameters_loaded 192*a* could also include values for timers and counters that radio unit 109*b* implements or utilizes, such as a retry timers and counters for the transmission of application data 112*a* and receipt of server B response 112*b* data. For embodiments where SRU 109 includes more than one eUICC 113, radio_parameters_loaded 192*a* can identify the preferred or primary eUICC 113 which RU 109*b* utilizes (such as with eUICC ID 113*a*), where each different eUICC 113 could record and operated with a different operational profile 113*d*. In this manner, device 101 could identify which set of network access credentials and network parameters are used by RU 109*b* with a wireless network 102.

Http(s)_response 192*b*, MT_sms 192*c*, and FTP_file_downloaded 192*d* could comprise the file format for stored data in a shared filesystem interface 230' equivalent to the values and data depicted and described for RU write and device read memory 192 in FIG. 2*b*. RU 109*b* could write other data or server B response 112*b* data to RU write directory 192*x* and RU write files 192*y* as well, including an in inbound email message, a Message Queuing Telemetry Transport (MQTT) response, a Session Initiation Protocol (SIP) message received through wireless network 102, and other possibilities exist as well without departing from the scope of the present disclosure. Http(s)_response 192*b*, MT_sms 192*c*, and FTP_file_downloaded 192*d* individually (and/or exemplary messages from the previous sentence) or together could comprise exemplary server B response 112*b* data from FIG. 1*a*, as depicted in FIG. 3*b*.

Other possibilities exist as well for server B response 112*b* data in a file 192*y* in directory 192*x* for shared filesystem interface 230' without departing from the scope of the present disclosure. Server B response data 112*b* could also be written by RU 109*b* in an encrypted form and/or comprise data for RU 109*b* to send to device 101, where device 101 decrypts the server B response 112*b* data. Although single values of the files 192*y* for server B response data 112*b* are depicted in FIG. 3*b*, a directory 192*x* could record multiple different values of the depicted files (such as multiple http(s)_request 191*b* files 191*x* for RU 109*b* to transmit or multiple different MO_sms 191*c* for RU 109*b* to transmit).

Log_file 306 in files 192*x* can comprise a log file of actions or steps performed by RU 109*b* or SRU 109. A log_file 306 logging level such as a debug level, an "info" level, or a warning or notice level could be specified in radio_parameters_input 191*a*. Log_file 306 could also comprise a sub-directory instead of a file 192*x*. Further, any of the exemplary file data depicted in FIG. 3*b* or FIG. 3*a* could comprise directory names for sub-directories in directory 192*x* or 191*x*. Other possibilities exist as well for a directory 192*x* in a shared filesystem interface 230' to record at least one log_file 306 written by SRU 109 or RU 109*b* and read by device 101 without departing from the scope of the present disclosure.

Server B digital signature 307 from server B 110*a* could be written to RU write directory 192*x* as well. The digital signature could be over a file or data in server B response data 112*b* received by RU 109*b* via wireless network 102 from SRU-SP 106 and originated by server B 110*a*. Device 101 could verify the digital signature for the server B using a certificate recorded in device 101 for server B 110*a*, such as device 101 recording a certificate 110*c*, which is depicted and described in connection with FIG. 1*a*. In this manner, device 101 could verify that the server B response data 112*b* received by RU 109*b* and passed to device 101 was authentically originated by server B 110*a*.

In some exemplary embodiments, the use of a server B digital signature 307 could be omitted, and device 101 could rely upon secure communications between RU 109*b* and server A 108 (such as via a mutually derived symmetric ciphering key 223*a* depicted in FIG. 4*b* below). For these exemplary embodiments, if device 101 trusts server A 108, then device 101 may trust data that server A 108 receives from server B 110*a* (e.g. device 101 can rely on (x) a mutually authenticated TLS 114 session and (y) RU 109*b* security such as key 223*a*, where the use of (x) and (y) could also be specified in radio_parameters_input 191*a*). In other exemplary embodiments, a server B digital signature 307 could be included with server B response 112*b* data, and thus a separate file 192*y* for server digital signature 307 may not be recorded in a directory 192*x*.

Power_control_settings 192*g* as a file 192*y* can include settings or values used by a power control unit 109*e* for SRU 109 or RU 109*b*. Power_control_setting 192*g* as a file 192*y* can represent the current state or mode for power control unit 109*e* operating in SRU 109. In this manner, device 101 could read file power_control_settings 192*g* in order to determine the current settings, configuration, or values used by a power control unit 109e. Power_control_settings 192g can comprise the running configuration of power control unit 109e and comprise data equivalent to that depicted and described for power_control_settings 191g in FIG. 3a above. In other words, power_control_settings 191g can comprise values input by device 101, and power_control_settings 191g can comprise the loaded and operating configuration of power control unit 109e, which could be read by device 101 as a file 192y. In exemplary embodiments, RU 109b and/or SRU 109 writes both power_control_settings 192g and radio_parameters_loaded 192a to directory 192x upon boot of SRU 109 and RU 109b.

Cryptographic_parameters 192e can comprise values, parameters, public keys, and symmetric ciphering keys that RU 109b utilizes. In an exemplary embodiment, cryptographic_parameters 192e could include a public key or certificate for SRU 109 such as a public key SRU PK 101w for SRU private key 109p, where SRU 109 continues to record and operate with the corresponding private key 109p. Cryptographic_parameters 192e could specify parameters or values utilized by SRU 109 and/or RU 109b with cryptographic algorithms 109q as depicted and described in connection with FIG. 1c above and also parameters 191e in FIG. 3a above. Cryptographic_parameters 192e could comprise settings, parameters, values, and configuration data equivalent to those described for cryptographic_settings 191e, where (a) cryptographic_parameters 192e could include a list of available options for SRU 109 and RU 109b and a selected list of implemented or running options configured for SRU 109 and RU 109b, and (b) cryptographic_settings 191e could comprise the selection or input by device 101 of particular values, settings, or algorithms as described above in FIG. 3a. In other words, parameters 191e could comprise a selected subset of parameters 192e, where 192e is a list of all options, and 191e is a selected list chosen by device 101 or SRU 109.

Radio_network_status 308 can comprise the current status of radio unit 109b with wireless network 102. For example, radio_network_status 308 could include the radio state such as "radio unit off", "attached", "transmitting", or "idle", "access denied", "credentials invalid", and other possibilities exist as well. Radio_network_status 308 could also comprise a state or operating mode used by RU 109b. In exemplary embodiments, radio_network_status 308 can also include a list of all available wireless networks observed by radio unit 109b using the current settings specified in radio_parameters_input 191a. Radio_network_status 308 could also record power utilization or settings for RF front end 203, such as current or last transmit power in dBm, such as 0 dBm, 23 dBm, and other possibilities exist as well. Error_log 309 can comprise a running list of operating errors incurred by SRU 109 and/or RU 109b, such as recording that wireless network 102 is not available, SRU-SP 106 does not receive a response from server B 110a, that authentication or encryption using cryptographic_parameters 192x fails, an out of memory state for memory 109h, improperly formatted or corrupted files for files 191x or 192x, and other possibilities exist as well for data recorded in an error_log 309.

Although not depicted in FIG. 3b, files 192x in RU write directory 192x could include a file for current or last obtained geographical position or coordinates as measured or determined by RU 109b. In exemplary embodiments, RU 109b can include a Global Positioning System (GPS) receiver or Global Navigation Satellite System (GNSS) receiver, and obtain geographical coordinates or position. The geographical coordinates could be written to a file 192y in RU write directory 192x, which could subsequently be read by device 101.

File system interface 230 in shared memory 109h for RU write directory 192x can also include file parameters or attributes. File parameters may be specific to a selected file system driver 242 and selected file system for directory 191x and 192x below, and the depicted file parameters in FIG. 3a are exemplary. File parameters depicted in FIG. 3b could be equivalent to file parameters depicted and described above with FIG. 3a. File permissions 301b can be for file permissions in RU write directory 192x. Users 302b can be the users identified for files 192y in directory 192x, and users 302b can be the same or equivalent to users 302a in directory 191x. Files 192y can have file names 305b similar to file names 305a in directory 191x. The file names 305b and file structure (e.g. encoding, XML, fields, JSON fields, etc.) within files 192y could be pre-agreed via a specification mutually shared between device 101 and SRU 109 before device 101 begins operating with SRU 109. As one example, data reporting libraries 101x in device 101 could record a structure 192x' for directory 192x (depicted in FIG. 1b), such that data reporting libraries 101x could read data from directory 192x.

Although the use of a file system interface 230 is depicted in FIG. 3b as the structure of data written by RU 109b and read by device 101, in some exemplary embodiments the use of a shared filesystem interface 230' and files 192y and directory 192x could be omitted and replaced by the use of a range of memory addresses in shared nonvolatile memory 109h for the data. In other words, a range or set of values for memory addresses in memory 109h could be used for data in each of the depicted files (instead of recording a file in a filesystem 230) such as a first memory address for the start of 192a data, a second memory address for the start of 192b data, etc. For these embodiments, the memory addresses for data elements (e.g. 192a, 192b, etc.) could be recorded in both SRU firmware 109u and device reporting libraries 101x. These embodiments without (A) the use of a shared filesystem interface 230' but with (B) shared nonvolatile memory 109h can obtain the benefits described herein, such as from device 101 and RU 109b transferring data between the nodes using shared nonvolatile memory 109h. Embodiments without shared filesystem interface 230' are also described above in FIG. 3a as well as benefits generally from using a shared nonvolatile memory 109h without requiring the use of filesystem 230.

FIG. 3c

Figure 3C:
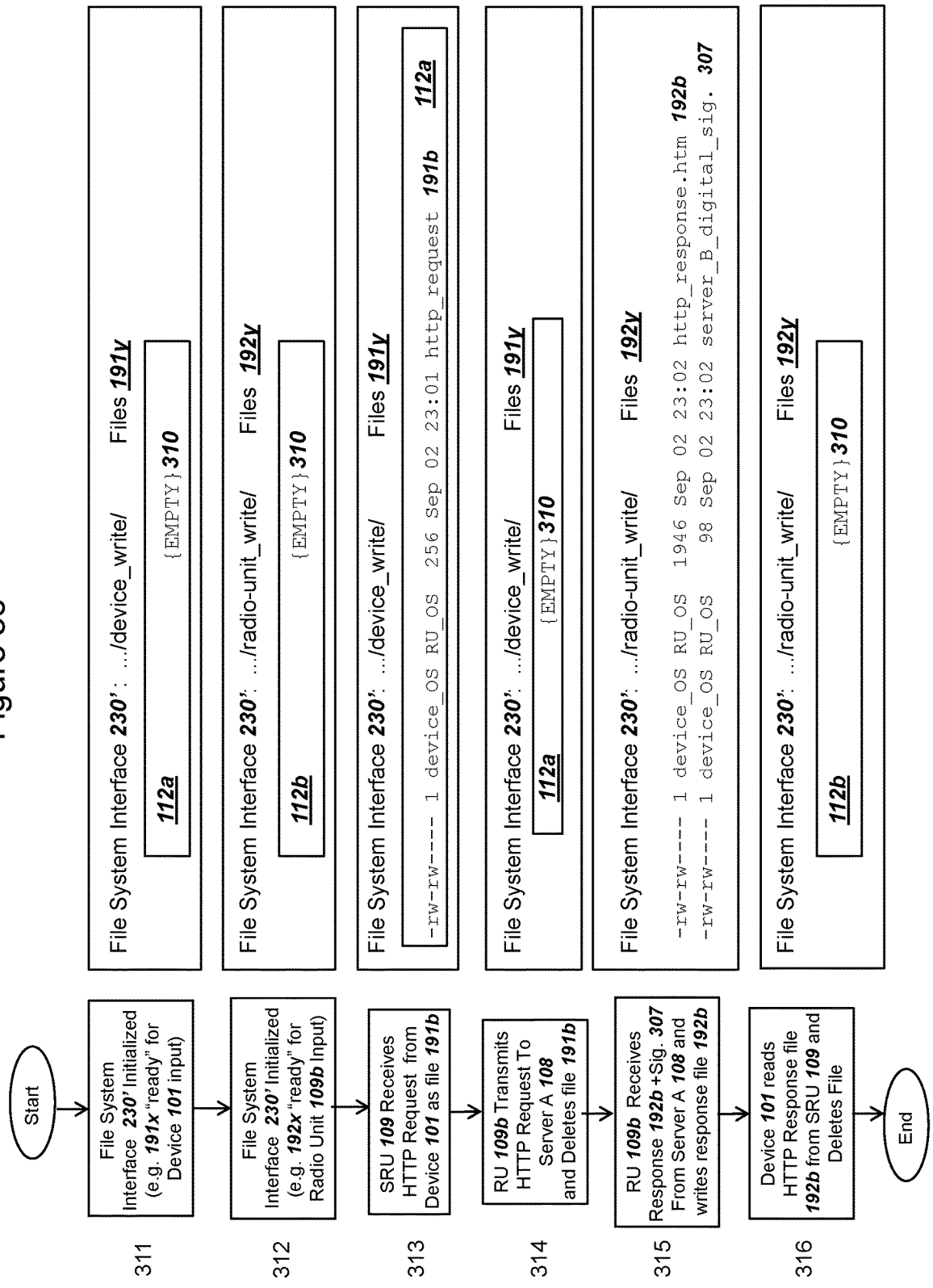
FIG. 3c is a flow chart illustrating exemplary steps for a device and a storage radio unit to utilize a shared filesystem interface, in accordance with exemplary embodiments.

FIG. 3c is a flow chart illustrating exemplary steps for a device and a storage radio unit to utilize a shared filesystem interface, in accordance with exemplary embodiments. Before SRU 109, RU 109b, and device 101 begin utilizing the shared filesystem interface 230', SRU 109 could conduct the configuration process 231 depicted and described above in connection with FIG. 2b and also FIG. 2f. Upon the conclusion of a configuration process 231, device write directory 191x could contain an empty 310 set of files for both (a) application data 112a in a device write directory 191x and (b) server B response 112b data in a RU write directory 192x. Although not depicted in FIG. 3c, in exemplary embodiments, upon conclusion of a configuration process 231, other data not depicted in FIG. 3c could be present in directory 191x and 192x, such as (X) device 101 writing to 191x files 191y of date-time-set 191g, device_identity 101i, radio_parameters_input 191a, and power_control_settings 191g, and (Y) RU 109b writing to 192x files for 192y of radio_parameters_loaded 192a, log_file 306, power_control_settings 192g, cryptographic_parameters 192e, and radio_network_status 308.

At step 311, shared filesystem interface 230' could be recorded in shared nonvolatile memory 109h and initialized with directory 191x ready for input of application data 112a from device 101. At step 311, directory 191x can begin without files or data recorded in directory 191x for application data 112a (although other data could be recorded in files 191y in directory 191x by device 101, such as the exemplary files described in the paragraph above related to the operation and configuration of a SRU 109 with RU 109b.) At step 312, shared filesystem interface 230' can be initialized with directory 192x ready for input of server B response data 112b from RU 109b. At step 312, directory 192x can begin without files or data recorded in directory 192x for server B response 112b data (although other data could be recorded in files 192y in directory 192x by SRU 109 and RU 109b, such as the exemplary files described in the paragraph above related to the operation and configuration of a SRU 109 with RU 109b.)

At step 313, device 101 could obtain and record data for server B 110a. The data could be obtained from a transducer for device 101 such as a sensor. Or, device 101 could prefer to conduct periodic reporting or registration with server B 110a without sensor data. In either case, device 101 could structure a message for server B 110a in the format of an HTTP or HTTPS request or URL. The data for server B 110a could also comprise an XML file or other text or binary data. The URL could include parameters such as a query string or values associated with the sensor or device 101. Device 101 could write the URL in the form of an http_request 191b file 191y to the shared filesystem interface in directory 191x. The http_request 191b could comprise application data 112a for server B 110a. An exemplary file 191y for http_request 191b is also depicted in FIG. 3c. The shared filesystem 230' can also record file parameters, such as permissions and a timestamp, as well as a file name 305a. Although not depicted in FIG. 3c, device 101 could also include a digital signature for http_request 191b, where the signature was created with private key for the device 101. Server B 110a could record the corresponding device public key. Or, in exemplary embodiments a digital signature for device 101 could be included within the application data 112a. In exemplary embodiments, application data 112a could be text or binary data and does not need to be in the format of an HTTP, HTTPS, or XML request or use a URL.

At step 314, power control unit 109e could power up RU 109b from a sleep state to an active state. SRU 109 could operate either RU polling 232 or use a trigger library 245 to detect that application data 112a in the form of http_request 191b has been written as a file 191y to directory 191x. RU 109b could subsequently use read library 243 from SRU firmware 191u to read http_request 191b from directory 191x. RU 109b can attach to wireless network 102, such as using an NB-IoT 104 attach procedure, and other wireless networking technologies could be utilized as well, such as LTE CAT M, LTE Advanced, 5G, WiFi network attachment and authentication, etc.

Figure 4A:
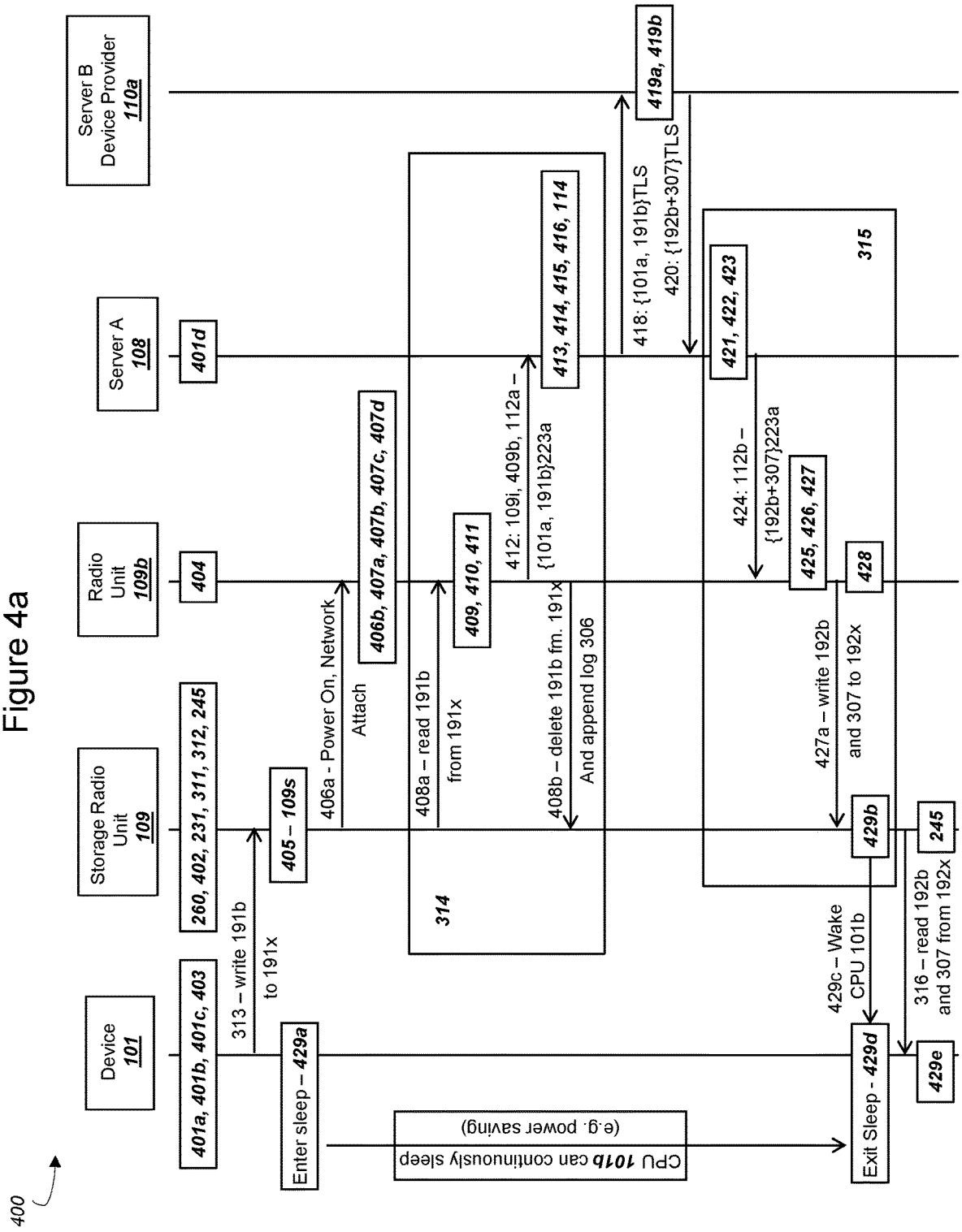
FIG. 4a is a simplified message flow diagram illustrating an exemplary system with exemplary data sent and received by a device, a storage radio unit, a radio unit, a server A, and a server B, in accordance with exemplary embodiments.

RU 109b can subsequently transmit http_request 191b to SRU-SP 106 or directly to server B 110a through wireless network 102. The selection of a destination for transmission of http_request 191b could be specified in 191b or possibly parameters 191a. In exemplary embodiments, RU 109b transmits http_request 191b and other application data 112a to server A 108, which is depicted in FIG. 3c and FIG. 4a. Upon successful transmission of http_request 191b to server A 108 (or server B 110a if RU 109b communicates with server B 110a) through wireless network 102, then upon conclusion of a step 314 then RU 109b can (i) delete the file 191y for http_request 191b, or (ii) move file 191y with http_request 191b to a log_file 306 or associated subdirectory for logged or historical data.

Continuing at step 314, the deletion of the file from directory 191x by RU 109b can signal or indicate to device 101 that the http_request 191b data has been successfully transmitted to wireless network 102. Device 101 can also read device write directory 191x (as shown by the exemplary file permissions 301a from FIG. 3a above). Note that a shared filesystem interface 230' provides benefits for both device 101 and RU 109b, since device 101 could enter a sleep state and not remain actively connected to SRU 109 (other than providing power through pins 109x). Device 101 could subsequently wake at a later time (such as returning from a sleep state to an active state) and observe that the file 191y for http_request 191b has been deleted, thereby indicating successful transmission of the data through wireless network 102. Device 101 could also record the outgoing http_request 191b in other memory within device 101, if device 101 needs access to the transmitted data, so deletion of the file 191y for http_request 191b does not prevent device 101 from continuing to record the data until a full reporting cycle such as http_response 192b is read by device 101. For example, if device 101 does not receive http_response 192b in an expected period of time, such as an exemplary 5 seconds, then device 101 could subsequently write http_request 191b to directory 191x a second time after RU 109b deletes the file.

Further, although the deletion of files in shared filesystem 230' is depicted in FIG. 3c, such as with a step 314 and also 316 below, in some embodiments the corresponding files 191y and 192y can optionally not be deleted and remain recorded in shared filesystem 230'. For these embodiments, device 101 and RU 109b can each detect the presence of new files for processing based on updated timestamps 304 for the files 191y and 192y, and other possibilities exist as well for continuing to record data in shared filesystem 230' after the data or files have been transmitted and received.

At step 315, RU 109b can receive an http_response 192b via wireless network 102. Http_response 192b could be generated by server B 110a based on http_request 191b and passed to server A 108. Http_response 192b can comprise a file with an *.html or *.htm extension, and other possibilities exist as well. Although depicted as an http_response 192b, the response 112b could be text or binary data without formatting or structure according to the http protocol. Note that http_response 192b can comprise server B response 112b data, as depicted in FIG. 3c. RU 109b can subsequently use SRU write libraries 246 in order to write the received http_response 192b to a file 192y in directory 192x. Http_response 192b as a file 192y can include file attributes, such as (i) a timestamp for when the file is written by RU 109b and (ii) a file size in bytes. SRU 109 could use an internal clock 205 to keep time for writing the timestamp, where the internal clock 205 for SRU 109 could be initially synchronized with device 101 using a date and time input/set 191g from device 101 through files 191y.

As depicted in FIG. 3c and continuing with step 315, RU 109b could also receive a server B digital signature 307 for the http_response 192b, where digital signature 307 is over http_response 192b data and created using server B private key corresponding to the server B public key in a certificate 110c. Device 101 can record certificate 110c and use the public key from the certificate in order to verify digital signature 308. In some exemplary embodiments, both http_request 191*b* and http_response 192*b* can be communicated by RU 109*b* and also recorded by shared filesystem 230' in an encrypted form, where device 101 and server B 110*a* record and operate with a shared secret ciphering key. In that and related embodiments, then a server digital signature 307 could be optionally omitted (since only both device 101 and server B 110*a* could mutually encrypt and decrypt data 112*a* and 112*b* by commonly sharing the same shared secret ciphering key). In some embodiments, the use of a digital signature 307 for server B response 112*b* could be omitted.

At step 315, device 101 could read http_response 192*b* and server B digital signature 307 from files 192*y* in directory 192*x* in shared filesystem 230'. Device 101 can subsequently process the data in http_response 192*b*, which could comprise a confirmation that http_request 191*b* was properly received by server B 110*b*. Http_response 192*b* could also include commands or instructions for device 101, such as a value for an actuator 109*y* or a setting for device 101 to implement or utilize. As depicted in FIG. 3*c*, device 101 could also delete the file 192*y* for http_response 192*b* after reading and processing the data in a step 316. In this manner, shared memory 109*h* can be conserved. Further, the deletion of http_response 192*b* from shared filesystem 230' can comprise a confirmation for SRU 109 and RU 109*b* that device 101 has successfully received the file or http_response 192*b* data.

Note that recording http_response 192*b* (or http_request 191*b*) in nonvolatile memory 109*h* provides benefits, such that both device 101 and RU 109*b* can enter and exit sleep states independently. In other words, both RU 109*b* for SRU 109 and CPU 101*b* for device 101 do not need to both be active at the same time in order to successfully transfer data between the two components. In this manner, a device 101 could better conserve energy stored in a battery 101*n* and extend the life of a charge for the battery 101*n*. With conventional technology that does not utilize shared nonvolatile memory 109*h*, both device 101 and RU 109*b* may need to be in active (or non sleep) states or modes in order to transfer data between device 101 and RU 109*b*.

Although an http_request 191*b* is depicted in FIG. 3*c*, other application data 112*a* could be written by device 101, read by RU 109*b*, and transmitted by RU 109*b* through wireless network 102 as well, such as an SMS, FTP file, MQTT message, SIP message, CoAP message, or simply an XML or JSON file. Text or binary data could be written by device 101 as application data 112*a* as well. Likewise, although an http_response 192*b* is depicted in FIG. 3*c*, other server B response 112*b* data could be written by RU 109*b* when received by RU 109*b* from wireless network 102, using the exemplary protocols or data structures from the previous sentence. Other possibilities exist as well for using a shared filesystem interface 230' in shared nonvolatile memory 109*h* operating in a SRU 109 with RU 109*b* without departing from the scope of the present disclosure.

FIG. 4*a*

FIG. 4*a* is a simplified message flow diagram illustrating an exemplary system with exemplary data sent and received by a device, a storage radio unit, a radio unit, a server A, and a server B, in accordance with exemplary embodiments. System 400 can include device 101, storage radio unit (SRU) 109, radio unit (RU) 109*b*, server A 108, and server B 110*a*. Device 101 can comprise a computing device such as depicted and described in connection with FIG. 1*a*, FIG. 1*b* and other figures above. Storage radio unit 109 can comprise a unit with a radio and nonvolatile memory 101*a* as depicted and described in FIG. 1*a*, FIG. 1*c*, FIG. 2*a*, and other figures above. Although storage radio unit 109 is depicted in FIG. 4*a* as a separate element than radio unit 109*b*, radio unit 109*b* can operate within storage radio unit 109. SRU 109 can communicate with device 101 via external bus 202 and electrical pins 109*x*. SRU 109 can communicate with RU 109*b* via internal bus 212.

For a system 400, server A 108 and server B 110*a* can comprise servers connected to an IP network 111 in order to receive data from RU 109*b* and device 101, where server A 108 and server B 110*a* are depicted and described in connection with FIG. 1*a* and other figures above. Server A 108 can communicate with RU 109*b* through both wireless network 102 and IP network 111. Server A 108 and server B 110*a* can communicate through IP network 111. The exemplary steps and message flows depicted in FIG. 4*a* provide an exemplary illustrative summary for the transfer of application data 112*a* from device 101 to server 110*b* using SRU 109, RU 109*b*, and a server A 108 operating with SRU-SP 106.

At step 401*a*, device 101 can be manufactured, where the exemplary components for a device 101 from FIG. 1*b* can be assembled and connected. At step 401*b*, device 101 can be configured, such as loading boot firmware and configuration data for device 101 in ROM 101*c*. Step 401*b* can include recording driver 101*k* such that device 101 can read data from a storage memory such as a SRU 109. Step 401*b* can also include device 101 recording drivers for a shared filesystem interface 230' as well as data reporting libraries 101*x*.

Storage radio unit 109 can undergo a step 260 as depicted and described in connection with FIG. 2*f*, which can include manufacturing of SRU 109, recording boot and SRU firmware 109*u* within SRU 109, recording SRU ID 109*i*, SRU private key SRU SK 101*p*, cryptographic algorithms 109*q* and associated parameters 192*e*, a bootstrap profile 113*c* for an eUICC within SRU 109, and certificates for server A 108 and server B 110*a*. Other data can be recorded in a step 260 for an SRU 109 as well. Although step 260 is depicted for an SRU 109 in FIG. 4*a*, an SRU-SP 106 could perform many of the steps such as recording the data in SRU 109 using a configuration unit equivalent to configuration unit 110*d*. Step 260 includes a step 253 where SRU 109 is inserted into device 101. In exemplary embodiments, step 260 can take place before step 401*c* and step 402 for device 101.

At step 401*c*, device 101 can power up or boot, load drivers for shared filesystem interface 230', and provide power to SRU 109 via electrical pins 109*x*. Device 101 can then be configured to read and write data with SRU 109. In exemplary embodiments, operating firmware for device 101 can be recorded in memory 109*g* in a filesystem 229 in SRU 109, and device 101 can load operating firmware for device 101 after SRU 109 boots in a step 402.

At step 402, SRU 109 can boot and use boot firmware 217 and boot configuration 218 to load SRU firmware 109*u*, where the components or executable code within SRU firmware 109*u* are depicted and described above in connection with FIG. 2*e*. For embodiments where SRU 109 begins operating for the first time with device 101, SRU 109 can conduct a configuration process 231 for shared memory 109*h*, which is depicted and described above in connection with FIG. 2*b* and FIG. 2*f*. After a configuration process 231, a shared filesystem interface 230' in shared memory 109*h* can be available to RU 109*b* and device 101 for communication between the two nodes.

At step 403, device 101 can being operating in a regular manner, such as collecting data from sensors 101*f* and controlling actuators 101*y* according to data or instructions in a device program 101*i*. Step 403 can include device 101 conducting a mount process to attach SRU 109, in order to read shared memory 191 and 192 (which could be structured with a shared filesystem interface 230). Device 101 can obtain or calculate data for server B 110*b* in the form of application data 112*a*, which could comprise an http_request 191*b*. Although an http_request 191*b* is depicted in FIG. 4*a* as application data 112*a*, other exemplary data could be transferred as well such as XML files, JSON files, a MQTT message, an SMS message, etc, which are also described in FIG. 3*a*.

SRU 109 can then conduct steps 311 and 312 as depicted and described in connection with FIG. 3*c* above, where shared filesystem interface 230' is ready for read and write operations by both device 101 and RU 109*b*. Processor 109*d* in SRU 109 can then begin running a trigger library 245 in order to wake RU 109*b* and signal RU 109*b* when data in directory 191*x* is available for RU 109*b* to read. In step 404, RU 109*b* can boot and then RU 109*b* can enter a radio off or deep sleep state. In exemplary embodiments, a power control unit 109*e* for SRU 109 keeps RU 109*b* in a sleep state or deep sleep state unless (i) there is application data 112*a* written to directory 191*x* or (ii) RU 109*b* is waiting for data or a server B response 112*b* after the transmission of application data 112*a*. A step 401*d* for server A 108 can comprise server A 108 recording data for SRU 109 and RU 109*b*, such as SRU identity 109*i*, and a public key or SRP PK 109*w* corresponding to SRU private key SRU SK 109*p*.

Device 101 can then conduct a step 313, where the http_request 191*b* from a step 402 is written to shared filesystem interface 230' in device write directory 191*x*. In exemplary embodiments, device 101 then conducts a step 429*a* to place CPU 101*b* and associated components from FIG. 1*b* for device 101 in a sleep state. The sleep state in a step 429*a* can be continuous until device 101 receives a signal 429*c* below to wake. Or, device 101 could use a timer to sleep for a specified time in a step 429*b*, for at least an exemplary 5 seconds, where CPU 101*b* sleeps until the timer expires. Note that device 101 can continue to power SRU 109 via pins 109*x* when device 101 or CPU 109*b* enters a sleep state. Upon expiration of the timer for a step 429*a*, CPU 101*b* could begin a polling step 233 to query or check for updated files 192*y*, such as polling for a server B response 112*b* data written to RU write directory 192*x*.

In a step 405, the trigger library 245 that was loaded above in SRU 109 after step 312 can (A) detect new data for RU 109*b* to process and transmit, and consequently (B) power control unit 109*e* can transition RU 109*b* from a sleep or off state to an active state. In message 406*a*, SRU 109 can use AT control stack 109*s* to activate radio unit 109*b* and instruct RU 109*b* to connect with a wireless network 102 and use a profile from eUICC 113 in the connection steps with wireless network 102. Message 406*a* could be transmitted through internal bus 212 in FIG. 2*a*.

In some embodiments, radio unit 109*b* could comprise a traditional module or modem for wireless networks 102, and the radio unit 109*b* can be controlled by SRU 109 and processor 109*d* using AT control stack 109*s* (in FIG. 1*c*) and messages such as message 406*a*. In other embodiments where radio unit 109*b* is integrated with SRU 109, then other commands and control besides an AT control stack 109*s* could be utilized by SRU 109 and processor 109*d* to control radio unit 109*b*. In exemplary embodiments, device 101 and SRU 109 could use a shared nonvolatile memory interface 230 to communicate between the components, and SRU 109 could use an AT control stack 109*s* to communicate internally over internal bus 212 between processor 109*c* and radio unit 109*b*. Or, SRU firmware 109*u* could include commands other than an AT control stack 109*s* to operate a radio unit 109*b*.

At step 406*b*, RU 109*b* can be powered up and receive message 406*a* with the instruction to connect with wireless network 102. At step 407*a*, RU 109*b* can (i) attach to wireless network 102 with an identity such as GUTI, TMSI, IMSI, SUPI, or 5G-GUTI from eUICC or operating profile 113*d* (or bootstrap profile 113*c*), and (ii) receive a challenge from wireless network 102. RU 109*b* can use a SIM card interface or commands with eUICC 113 in order to (i) read an identity such as IMSI or SUPI from the eUICC and (ii) send a challenge (or RAND or equivalent) received from wireless network 102 to the eUICC 113, and (iii) receive a response or SRES or equivalent from the eUICC 113 using an operating profile 113*c* to authenticate with wireless network 102.

At step 407*b*, RU 109*b* can transmit the SRES or equivalent to wireless network 102 and conclude the authentication process. At the conclusion of step 407*b*, RU 109*b* can enter a state with wireless network 102 such as a radio resource control (RRC) connected state (or equivalent for NB-IoT 104 networks or 5G networks) where RU 109*b* can transmit data to server A 108. Steps 407*a* and 407*b* could comprise the steps required for RU 109*b* to attach to a WiFi network as well, for embodiments where wireless network 102 comprises a network supporting the family of 802.11 standards.

At step 407*c*, RU 109*b* can read PKI keys 109*v* from radio unit only memory 109*r*, as well as cryptographic settings 191*e* (also referred to as cryptographic parameters 191*e*) from files 191*y* in directory 191*x*, and cryptographic algorithms 109*q*. At step 407*d*, RU 109*b* can read SRU identity 109*i* and a name or address for server A 108 from memory 109*r*. The name or address for server A 108 can comprise the destination IP address for IP network 111 where RU 109*b* will transmit application data 112*a*.

RU 109*b* can then conduct a step 314, where step 314 was depicted and described in connection with FIG. 3*c* above. RU 109*b* or SRU 109 can use read libraries 243 to read http_request 191*b* from device write directory 191*x* in shared filesystem interface 230' using a step 408*a*. Although RU 109*b* is depicted in FIG. 4*a* as reading http_request 191*b* from directory 191*x*, in an exemplary embodiment processor 109*d* in SRU 109 could (i) read http_request 191*b* (or other data in directory 191*x*) and (ii) pass the data through internal bus 212 to RU 109*b*, and (iii) instruct RU 109*b* to transmit the data, such as through using an AT control stack 109*s* with RU 109*b*. In general, operations describing RU 109*b* as "reading" data such as files 191*y* in directory 191*x* can comprise processor 109*d* as reading the data and then processor 109*d* writing the data to RU 109*b* over an internal bus 212.

At step 409, RU 109*b* can derive (i) an ephemeral ECC private key SKe 409*a* (in FIG. 4*b* below) using a named curve and associated parameters from cryptographic parameters 191*e* and (ii) a corresponding ECC public key PKe 409*b*. In exemplary embodiments, the named curve and associated parameters from cryptographic parameters 191*e* are also utilized by an SRU-SP public key SRU-SP PK 106*b* recorded in memory 109*r* that corresponds to SRU-SP private key SRU-SP SK 106*a*. At step 409, RU 109*b* can conduct an ECDH key exchange 441 (in FIG. 4*b* below) using at least the derived ECC private key SKe 409*a* in step 409 above and the SRU-SP public key SRU-SP PK 106*b* in order to calculate a mutually derived shared secret key 223 with server A 108.

Note that the ECDH key exchange 441 in step 409 could also use as input the SRU private key SRU SK 109p in conjunction with the derived ephemeral ECC private key. In other words, the input to an ECDH key exchange 441 for RU 109b can include the sum of the two private keys {SRU SK 109p and derived private key SKe 409a} mod n, where n is a curve parameter. For embodiments without use of SRU SK 109p in ECDH key exchange step 441, then the corresponding ECDH key exchange 442 (in FIG. 4b below) can also omit the SRU PK 109w.

In some exemplary embodiments, the use of an ECDH key exchange 441 in step 409 can be omitted, and RU 109b could use recorded symmetric key 127b depicted and described as a symmetric ciphering key instead of using a derived key 223. For these embodiments that omit use of an ECDH key exchange 441, the server A 108 could also record a symmetric key 127b for SRU 109 with SRU ID 109i and use the symmetric key 127b as a symmetric deciphering key. Details for an exemplary ECDH key exchange 441 in a step 409 are depicted and described in connection with FIG. 4b below. Encryption by RU 109b of application data 112a could be via symmetric key derived from symmetric key 127b. In other words, "symmetric key 127b" would be a master key that is not directly used for encryption, but a symmetric ciphering key for transmitting data with wireless network 102 could be derived using the "symmetric key 127b" as a master key.

At step 410, RU 109b can compress the http_request 191b data using a compression algorithm such as gzip and other possibilities exist as well. At step 411, RU 109b can encrypt (i) the compressed http_request 191b and (ii) device identity 101a (read from directory 191x in FIG. 3a) with a symmetric ciphering algorithms such as AES and the mutually derived shared secret key 223 from a step 409 (or alternatively a recorded symmetric key 127b instead of mutually deriving the key 223). The output from a step 411 can comprise a ciphertext. RU 109b can then transmit a message 412 to server A 108, where message 412 can include SRU identity 109i, the derived ephemeral public key PKe 409a, and a ciphertext comprising encrypted values for 101a and 191b, where the ciphertext is encrypted with key 223a (and key 223a is depicted and described in connection with FIG. 4b below).

For some exemplary embodiments, a recorded, pre-shared symmetric key 127b can be used with a DTLS-PSK session with server A 108 or with server B 110a, where application data 112a such as http_request 191b is encrypted with the symmetric key 127b (from FIG. 1c) and a symmetric ciphering algorithm. For these embodiments, the generation of an ephemeral PKI key pair in a step 409 could be omitted. For embodiments which use a symmetric key 127b and server B 110b also records or stores the pre-shared symmetric key 127b, then (i) RU 109b could send the encrypted application data 112a directly to server B 110a and (ii) optionally bypass sending the application data 112a to server A 108. For these embodiments with the use of a pre-shared secret key 127b, and server B response 112b data received by RU 109b is decrypted using the symmetric key 127b and the symmetric ciphering algorithm. Again, key 127b can comprise a master key such as the PSK contemplated by TLS, DTLS, or WiFi standards, and the encryption key for data transmitted can be derived from the master key.

Although not depicted in FIG. 4a, a message 412 can also include a set of cryptographic parameters 191e associated with PKe 409b sent in message 412. Symmetric ciphering key 223a can be derived from key 223 using a key derivation function 443 (in FIG. 4b below). The ciphertext can be an encrypted form of application data 112a. The use of "{ }" symbols in FIG. 4a is to illustrate that the data transmitted is encrypted with the key 223a and the key 223a is not normally transmitted in a message 412. For embodiments where a recorded symmetric key 127b is used as the ciphering key 223a (and RU 109b does not derive an ephemeral PKI key pair including key 409a), then key PKe 409a can be omitted from a message 412.

Server A 108 can receive message 412 through wireless network 102 and IP network 111. Server A 108 can conduct a series of steps to process the data in message 412. Server A 108 can conduct a step 413 to read SRU identity 109i and select SRU public key SRU PK 109w which corresponds to SRU private key SRU SK 109p recorded and used by RU 109b. In step 413, server A 108 can also use SRU identity 109i to select a set of cryptographic parameters 191e associated with SRU public key SRU PK 109w, and SRU public key SRU PK 109w could also be recorded in a certificate with the cryptographic parameters 191e. At step 414, server A 108 can conduct an ECDH key exchange 442 using (i) the received ephemeral public key PKe 409a from message 412 and (ii) the SRU-SP private key SRU-SP SK 106a in order to mutually derive the same shared secret key 223 with RU 109b. A key exchange step 414 for server A 108 is also depicted below in connection with FIG. 4b.

Note that the ECDH key exchange 442 in step 414 could also use as input the SRU public key SRU PK 109w in conjunction with the received ephemeral ECC public key PKe 409b (in other words, an elliptic curve point addition operation on key 409b and key 109w). In this manner, successfully mutually deriving key 223 can require (A) that server A 108 holds or records all of keys 409b, 109w and 106a, and (B) that RU 109b and SRU 109 hold or records all of the corresponding keys for the private key of 409a, 109p, and the public key of 106b. Thus, and ECDH key exchange 442 for steps 414 and steps 409 can support mutual authentication, since only entities on each side with the respective keys listed in the sentence above can mutually derive shared secret key 223 (e.g. SRU 109 must record private key 109p and server A 108 must record private key 106a). In other words, from the perspective of RU 109b, key 223 can be derived from {[(private keys 409a+109p) mod n]*106b}. As one exemplary embodiment, when using the named elliptic curve secp128r1, the value of n can comprise the decimal number:

340282366762482138443322565580356624661

From the perspective of server A 108, key 223 can be derived from [(409b+109w)*106a], where the "+" sign indicates an elliptic curve point addition operation with the two public keys. Note that in exemplary embodiments, mutually derived key 223 is not used directly with a symmetric ciphering algorithm, but rather nodes input key 223 into a key derivation function 443 in FIG. 4b below (which could use a secure hash algorithm) in order to calculate a symmetric ciphering key 223a. The use of an ephemeral PKI key pair for step 409 and 414 can provide forward secrecy, such that new secret shared keys 223 are periodically derived and the encryption is not limited to depending on PKI keys for SRU 109 and SPU-SP 106. In some exemplary embodiments, the use of an ECDH key exchange 442 in step 409 can be omitted, and RU 109b and server A 108 could use recorded symmetric key 127b depicted and described as a symmetric ciphering key instead of using a derived key 223.

At step 415, server A 108 can use the symmetric ciphering algorithm from a set of cryptographic parameters recorded with SRU ID 109i in order to decrypt the ciphertext in message 412 using the mutually derived key 223 to calculate a symmetric ciphering key 223a from a key derivation function 443. Server A 108 can then conduct a decompression step 416 using the same algorithm as RU 109b (except of decompression, such as using "gzip −d") in order to read the plaintext values of device identity 101a and http_request 191b. After a successful step 416, although not depicted in FIG. 4a, server A 108 could send RU 109b a confirmation of the successful receipt and/or processing of data from RU 109b in message 412. With confirmation of successful transfer of message 412 with http_request 191b (in encrypted and compressed form), RU 109b can then perform step 408b to delete the file 191y for http_request 191b from directory 191x since the file has been transferred to server A 108. RU 109b could also then append a log_file 306 regarding the successful transmission of http-request 191b.

Server A 108 can then establish a TLS session 114 with server B 110a. TLS session 114 can comprise a regular TLS session such as TLS version 1.3 with mutual authentication from certificates 110c and 106c. Note that the use of a TLS session between server B 110a and server A 108 instead of between server B 110a and RU 109b solves the significant problem of bandwidth overhead in order to conduct a TLS session between RU 109b and server 110a. Likewise, a DTLS session would have similar overhead and both DTLS and TLS may not be suited for long sleep periods of device 101, where application data 112a could be received in exemplary timeframes of several times a day to every few days. In other words, the requirements for DTLS and TLS may mean that resumption of previous sessions may not be available from RU 109b using DTLS or TLS with relatively long sleep times and the sessions could regularly expire and require re-establishment for each set of application data 112a such as http_request 191b, with resulting higher overhead and bandwidth utilization.

In other words, the bandwidth between RU 109b and server A 108 could be as low as a few kilobits per second for the uplink (such as if RU 109b and device 101 are in a region or location in wireless network 102 with poor RF connectivity), and thus a TLS or DTLS session for each http_request 191b between RU 109b and server B 110a would not be feasible (or could require excessive power drain on a battery 101n). As depicted in FIG. 4a, the collection of steps and messages beginning with a step 408a through step 114 can comprise a step 314. A step 314 was also depicted and described in connection with FIG. 3c above.

After setup of TLS session 114, server A 108 could send server B 110a a message 418, where message 418 could be (i) encrypted by the TLS session and (ii) include device identity 101i and http_request 191b. Device identity 101i could be included in the http_request 191b. Although TLS is depicted for session 114 in FIG. 4, other secure networking technologies could be used as well, such as a VPN, SSH, or IPsec. Or, a TLS session 114 could be omitted if data 191a is encrypted internally by device 101 with a mutually shared secret key held by server B 110a and device 101 outside of SRU 109.

Server B 110a could receive message 418 and process the message. In step 419a, server B 110a could remove encryption by TLS session 114 and read the plaintext values for device identity 101i and http_request 19 1b. At step 419b, server B 110a could process the plaintext data from step 419a and generate a http_response 192b. Server B 110a could then send server A 108 a message 420, where message 420 can include http_response 192b (as encrypted data in the TLS session 114) and a server B digital signature 307. Although not depicted in FIG. 4a, message 420 could also include device identity 101a so that server A 108 could keep track of which http_response 192b belongs with which SRU 109 (and server A 108 could record a table mapping SRU identities 109i to device identities 101a).

In addition, although the response from server B 110a is depicted as a http_response 192b, the response could comprise text or binary data from server B 110a in response to receiving and processing the data in http_request 191b (which could also be text or binary data). A server B digital signature 307 could also be omitted from a message 420 for embodiments where RU 109b and device 101 trusts server A 108. Or, server B digital signature 307 could be included within http_response 192b. Note that the use of a server B digital signature 307 can be helpful for device 101 to authenticate the data in http_response 192b for exemplary embodiments where the transfer of application data 112a from device 101 to wireless network 102 does not use TLS or does not establish "end to end" encryption and authentication between device 101 and server B 110a.

At step 421, server A 108 could receive message 420 and process the message. At step 421, server A 108 could remove encryption through the TLS session 114 with server B 110a. Server A 108 could read the plaintext data comprising http_response 192b and server B digital signature 307. Note that the inclusion of server B digital signature 307 in a TLS session 114 would not normally be required with TLS sessions 114 with conventional technology, since the server originating the message (e.g. server B 110a) would already be authenticated. Thus, the inclusion of server B digital signature 307 within TLS session 114 can be different than conventional technology. As mentioned in the paragraph above, message 420 can also include device_identity 101a for the http_response 192b. In exemplary embodiments, http_request 191b can include a random number generated by device 101 and server B digital signature 307 can be over both the data within http_response 192b and the random number generated by device 101 and received in http_request 191b.

At step 422, server A 108 can compress the decrypted, plaintext http_response 192b using standard compression libraries such as zip or gzip, and other possibilities exist as well. Server A 108 can also select or identify an RU 109b for http_response 192b using device identity 101a (where server A 108 can include a table mapping device identity 101a to SRU identity 109i). At step 423, server A 108 can encrypt http_response 192b using the mutually derived shared secret key 223 and a resulting symmetric ciphering key 223a. The encryption algorithm used with an encryption step 423 can be specified in a set of cryptographic parameters, such as specifying the use of AES encryption with 128 bit symmetric ciphering keys, although other possibilities exist as well. The output of symmetric ciphering at a step 423 can comprise a ciphertext.

Server A 108 can then send RU 109b a message 424 via wireless network 102, where message 424 can include the ciphertext from a step 423. Message 424 can include encrypted and compressed data for http_response 192b received from server B 110a, where the ciphertext is encrypted using mutually derived shared secret key 223. As mentioned above, the symmetric ciphering key 223a can comprise a number derived from key 223 using a key derivation function from a set of cryptographic algorithms equivalent to cryptographic algorithms 109q recorded by SRU 109. Message 424 can also include server B digital signature 307. The http_response 192b in a message 424 can comprise server B response 112b data. Note that server B digital signature 307 can be included in the ciphertext for a message 424, which again is different from conventional technology where a server digital signature is not normally included in a ciphertext. Or, server B digital signature could be sent in a message 424 outside or external to the ciphertext (e.g. not encrypted with key 223a).

At step 425, RU 109b can receive the message 424 and process data within the message. RU 109b can conduct a step 425, which can comprise server A 108 using the mutually derived shared secret key 223 and symmetric ciphering key 223a to decrypt data within message 424. RU 109b can then decompress the data in a step 426 using standard libraries such as zip or gzip in order to read decompressed, decrypted plaintext data from message 424 from server A 108. At step 427, RU 109b and SRU 109 can then write files 192y to directory 192x in shared filesystem interface 230', where the files 192y comprise both http_response 192b and server B digital signature 307. RU 109b and SRU 109 can use write libraries 246 from SRU firmware 109u in order to write files 192y to directory 192x. In other words, although RU 109b is depicted in FIG. 4a as writing http_response 192b to directory 192x in a message 427a, in exemplary embodiments memory processor 109d in SRU 109 could write the data, where (i) memory processor 109d receives the data such as http_response 192b from RU 109b via internal bus 212 and (ii) memory processor 109d operates write libraries 246. As depicted in FIG. 4a, the collection of steps and messages beginning with step 421 and ending with step/write operation 427 can comprise a step 315, which is also depicted and described in connection with FIG. 3c above.

After writing http_response 192b and server digital signature 307 to files 192x, RU 109b can then conduct a step 428 to detach or disconnect from wireless network 102 and enter a sleep state. A step 428 could also comprise RU 109b using a power saving mode (PSM) with wireless network 102. Note that RU 109b can enter a sleep state without receiving a command from device 101 and CPU 101b both (i) after the receipt of http_response 192b and (ii) before entering the sleep state. SRU 109 can then continue to operate a trigger library 245 to detect when the next set of application data 112a is written by device 101 to files 191y in directory 191y and subsequently return to a step 405 and the following steps and messages depicted in FIG. 4a in order to transmit any subsequently written application data 112a. Note that a step 409 to derive a new ephemeral private key and ephemeral public key and conduct an ECDE key exchange can be omitted for some following application data 112a, and a previous ephemeral public key 409a could be utilized, such as rotating or deriving key 409a only periodically, such as every day or week, and other possibilities exist as well. The period of time for an ephemeral public key 409a to remain active or valid could be specified in cryptographic parameters 192e or cryptographic settings 191e.

At step 429b, SRU 109 with power control unit 109e can send a signal 429c for device 101 and/or CPU 101b to exit from a sleep state. The sleep state for CPU 101b could be entered in a step 429a as depicted above. The signal 429c could also comprise a signal 192f from FIG. 2b. The signal 429c could be transmitted via pins 109x. In an exemplary embodiment, SRU 109 could temporarily disconnect a set of pins 109x in order to send a signal 429c, and other possibilities exist as well. SRU 109 could perform a dismount and remount step for signal 429c, such as simulating that SRU 109 has been disconnected and reconnected (simulating that a storage device such as SRU 109 has been removed and then reconnected). A physical interface 101p could detect the signal 429c as a signal 192f and wake CPU 101b, such as waking a computing device when devices are attached. Other possibilities exist as well for SRU 109 to send a signal 429c to device 101 for waking CPU 101b without departing from the scope of the present disclosure.

In some exemplary embodiments, the trigger library 245 could also function as a detection by SRU 109 and processor 109d that RU 109b has written a response 112a to directory 192x. The trigger library 245 could then signal device 101 through pins 109x according to the specified interface or bus for pins 109x, such as signaling that data is available for a read by device 101. Upon receiving the signal, data reporting libraries 101x could conduct the read of response 112a. Thus, trigger library 245 could operate as a trigger for SRU 109 to both (i) wake RU 109b when application data 112a is written to memory 191 and (ii) wake device 101 and CPU 101b when response data 112b is written to memory 192.

At step 429d, device 101 could receive the signal 429c via pins 109x and wake processor 101b from the sleep state entered in a step 429a above. Device 101 could also conduct a polling 233 of directory 192x for files 192y in shared filesystem 230' in order to detect or determine that http_response 192b with server B digital signature 307 has been written by RU 109b to files 192y (such as if CPU 101b exits a sleep state before signal 429b). Device 101 can then conduct a step 316 to read http_response 192b and server digital signature 307 using data reporting libraries 101x. As depicted and described in connection with a step 316 in FIG. 3c, device 101 may then also optionally delete http_response 192b and server B digital signature 307 from files 192x.

Device 101 can then conduct a step 429e to process and operate on the data contained in http_response 192b, such as adjusting an actuator 101y based on the data in http_response 192b. Or, http_response 192b could comprise simply an acknowledgement that http_request 191b was received and processed by server B 110a. A step 429e by device 101 could also comprise device 101 verifying server B digital signature 307 using a public key from certificate 110d, before processing and operating on the data contained in http_response 192b. Other possibilities exist as well for device 101 to conduct a step 429e to process data in http_response 192b and server B digital signature 307 without departing from the scope of the present disclosure.

Although an http_request 191b is depicted in FIG. 4a, other application data 112a could be written by device 101, read by RU 109b, and transmitted by RU 109b through wireless network 102 to server A 106 and server B 110a as well, such as an SMS, FTP file, MQTT message, SIP message, CoAP message, or simply an XML or JSON file. Likewise, although an http_response 192b is depicted in FIG. 4, other server B response 112b data could be written by RU 109b when received by RU 109b from wireless network 102 from server A 108 and server B 110a, using the exemplary protocols or data types from the previous sentence. Other possibilities exist as well for the protocol or format of application data 112b and server B response data 112b without departing from the scope of the present disclosure. In addition, although the use of a trigger library 245 for SRU 109 is depicted in FIG. 4a for a SRU 109 to detect that device 101 has written application data 112a for server B 110a in files 192x, RU 109b or SRU 109 could also use polling 232 as depicted in FIG. 2b to determine that application data 112a has been written by device 101 into files 191y.

Further, although the use of files 191y and 192y are described within FIG. 4a as the structure of data transferred between device 101 and RU 109b, in some embodiments the use of files could be omitted, and alternatively specified or mutually agreed memory addresses within shred nonvolatile memory 109h could be utilized as the location and structure for passing data between device 101 and RU 109b. In other words, a first specified range of memory 109h could comprise the location for application data 112a written by device 101, and a second specified range of memory 109h could comprise the location for server B response 112b data.

FIG. 4b

Figure 4B:
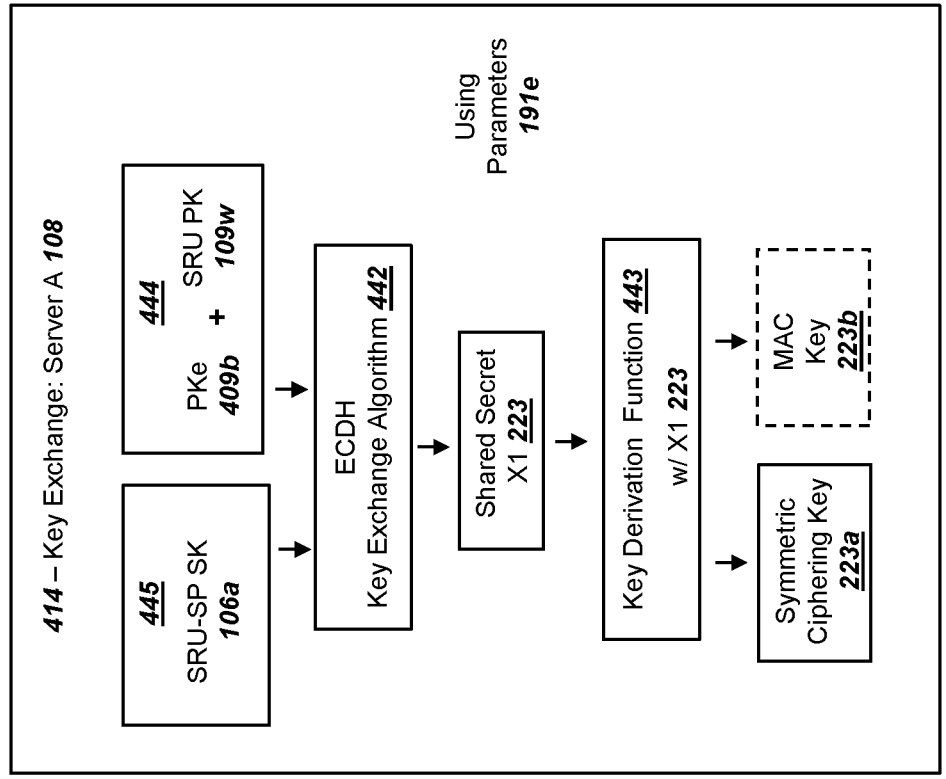
FIG. 4b is a flow chart illustrating exemplary steps for conducting a key exchange using PKI keys in order to derive a shared secret key and a symmetric ciphering key, in accordance with exemplary embodiments.
Figure 4B:
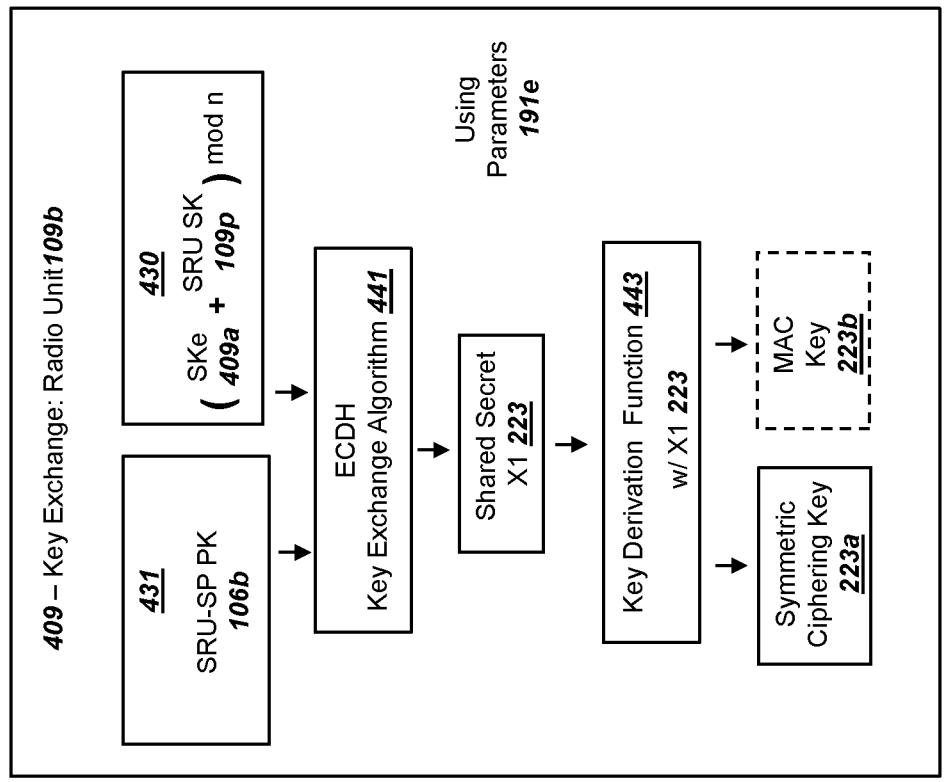

FIG. 4b is a flow chart illustrating exemplary steps for conducting a key exchange using PKI keys in order to derive a shared secret key and a symmetric ciphering key, in accordance with exemplary embodiments. A RU 109b or SRU 109 can conduct a key exchange step 409. At step 409, RU 109b can use a step 430 to calculate the sum of SRU static private key SRU SK 109p and the derived ephemeral private key SKe 409a, and then calculate the modulus of the sum using the value n, where the value n can be defined or determined based upon the selected set of cryptographic parameters 191e.

Note that in some exemplary embodiments, the use of a SRU PKI key pair comprising SRU SK 109p and SRU PK 109w could be omitted, and for these embodiments then the input into ECDH key exchange algorithm 443 for a step 409 can comprise the single value of SKe 409a. In other words, a key 223 can be calculated without requiring a SRU SK 109p key for these embodiments (where SRU public key 109w would also be omitted from key exchange calculations by server A in step 414), although the use of a SRU private key SRU SK 109p can be preferred for a step 409 in other embodiments. The selection for the use of SRU PKI key pair in ECDH key exchange algorithms 441 and 442 can be specified in a set of cryptographic parameters 191e.

At step 431, RU 109b can select and read SRU-SP PK 106b. Exemplary data for a step 430 and step 431 will be shown below for this FIG. 4b. The combination of output from step 430 and step 431 can be input can be input into an ECDH key exchange algorithm 441 using parameters 191e in order to calculate the shared secret 223.

A summary of ECDH as a key exchange algorithm 441 and 442 is included in the Wikipedia article titled "Elliptic Curve Diffie-Hellman" from Mar. 9, 2018, which is herein incorporated by reference. An exemplary embodiment of key exchange algorithm 441 and 442 could comprise a "One-Pass Diffie-Hellman, C(1, 1, ECC CDH)" algorithm as described in section 6.2.2.2 on page 81 of the National Institute of Standards and Technology (NIST) document "NIST SP 800-56A, Recommendation for Pair-Wise Key Establishment Schemes Using Discrete Logarithm Cryptography" from March, 2007 which is hereby incorporated by reference its entirety. Other key exchange algorithms in NIST SP 800-56A could be utilized as well for a key exchange algorithm 441 and 442 in FIG. 4b without departing from the scope of the present disclosure. Example calculations for an ECDH key exchange for a key exchange algorithm 441 are shown below. In exemplary embodiments, the key exchange algorithm 442 used by server A 108 can comprise the equivalent key exchange algorithm 441 used by RU 109b in a key exchange step 409.

Other algorithms to derive a secret keys using public keys and private keys may also be utilized in a key exchange algorithm 409, such as, but not limited to, the American National Standards Institute (ANSI) standard X-9.63. Cryptographic parameters 191e can also include information, values, or settings for conducting (i) a key exchange algorithm 441 in step 409 (and steps 442) and (ii) a key derivation function 443 in order to derive a commonly shared symmetric encryption key 223a. As contemplated herein, the terms "cryptographic settings 192e" and "cryptographic parameters 191e", and "parameters 191e" can be equivalent, and cryptographic settings 192e could be a subset of cryptographic parameters 191e, where the subset is selected by device 101.

Parameters 191e input into a key exchange algorithm 441 and 442 can include (i) a time-to-live for a shared secret 223 and symmetric ciphering key 223a that is derived, and (ii) a supported point formats extension, where the supported point formats extension could comprise uncompressed, compressed prime, or "compressed char2" formats, as specified in ANSI X-9.62 and related IETF standards. In other words, (i) an ECC PKI keys input into a key exchange algorithm 441 and 442 and (ii) shared secrets output from key exchange algorithm 441 and 442 may have several different formats and a set of parameters 191e can be useful to specify the format.

Exemplary data and numbers can be provided to demonstrate the calculations for (i) ECC point addition step 444, (ii) step 430 to combine private keys, and (iii) key exchange step 409. Parameters 191e can include the elliptic curve of "secp128r1" with key lengths of 128 bit long keys. Although the exemplary numbers for keys, points, and a named curve are provided, other values for keys, points, and named ECC curves could be utilized as well. Other example named curves and parameters 191e could comprise a different curve from IETF RFC 5480 or similar standards.

The ephemeral private key SKe 409a can comprise the exemplary following number, and can be stored in RU 109b after a key pair generation step at the beginning of a step 409 as described in FIG. 4a:

330225223315954763304200471137380016969

The SRU static private key SRU SK 109p can comprise the exemplary following number, and can be recorded in SRU 109 in PKI keys 109v before a step 409, such as during SRU manufacturing, SRU configuration, or SRU distribution (e.g. step 252 in FIG. 2f):

209122135174501513062984245101620420255

Note that the private keys SKe 409a and SRU SK 101p above correspond to the public keys (i) PKe 409b received by server A 108 in message 412 and (ii) SRU PK 109w recorded by a server A 108, as depicted in FIG. 1a. The public keys for server A 109 can also have the exemplary numeric values below for step 414 for the example numbers given above.

Note that the public key SRU-SP PK 106b corresponds to the private key SRU-SP SK 106a. The server static public key SRU PK 106b for a step 409 can comprise the following exemplary values with X and Y numbers (or "coordinates") of:

X: 319423829544285733939020505180109110187
Y: 242179187598040154943588326777101424083

RU 109b can conduct step 430 to calculate the sum of SRU static private key SRU SK 101p and the derived ephemeral private key SKe 409a, and then calculate the modulus of the sum using the value n, where the value n can be defined or determined based upon the selected set of cryptographic parameters 191e. For the exemplary values for keys above, when using the named elliptic curve secp128r1, the value of n can comprise the decimal number:

340282366762482138443322565580356624661

Consequently, the modulus of (i) the sum of private keys SRU SK 101p and SKe 409a and (ii) the value n above will equal the following number for a step 430:

199064991727974137923862150658643812563

An ECDH key exchange algorithm 441 in key exchange step 409 can input (i) the static public key for SRU-SP PK 106*b* and (ii) the value calculated from a step 430 (e.g. (SRU SK 101*p*+SKe 409*a*) mod n). The output of ECDH key exchange algorithm 441 in key exchange step 409 can be the secret value or point X1 223. Note that the secret X1 223 as derived by RU 109*b* in a key exchange step 409 equals or is the same numeric value as the secret X1 223 derived by server A 108 in a key exchange step 414 below. An exemplary point or value for secret X1 223 calculated by RU 109*b* using a key exchange step 409 using the above exemplary numeric values for SKe 409*a*, SRU SK 101*p*, and SRU-SP PK 106*b* would be:

X: 283470377637256529257925581999478035172
Y: 117395441238388206677723127104680679540

Note that the above exemplary value for X1 223 can also be derived through the operation of (SKe 409*a*\*SRU-SP PK 106*b*)+(SRU SK 101*p*\*SRU-SP PK 106*b*). In other words, the shared secret can be derived through either (i) an addition of secret keys 409*a* and 101*p* or (ii) an elliptic curve point addition using points, where the points are determined by at least secret keys 409*a* and 101*p*.

For a key exchange step 409, derived shared secret key X1 223 can be input into a key derivation function 443 where the key derivation function 443 can be equivalent to the key derivation function 443 below for a key derivation step 414 by server A 108. Note that for key derivation steps in the present disclosure, the X coordinate of a derived shared secret can be taken or used as input into the key derivation function 443. The output of a key derivation function 443 can comprise both (i) a symmetric ciphering key 223*a* and (ii) a MAC key 223*b*. MAC key 223*b* can be used with a symmetric ciphering algorithm in order to generate a MAC code, such that the other party using the same key 223*a* and MAC key 223*b* can process the ciphertext and calculate the same MAC code in order to verify message integrity. RU 109*a* can subsequently use keys 223*a* and 223*b* in an encryption step 411 and a decryption step 425 in FIG. 4*a* above.

Key derivation function 443 can use a secure hash algorithm such as, but not limited to, SHA-256, SHA-384, SHA-3, etc. and additional values such as a text string with secret X1 223. The specification of a secure hash algorithm and the text string for use with a key derivation function 443 could be commonly shared between server A 108 and RU 109*b* by commonly shared parameters 191*e*. The output of a secure hash algorithm within a key derivation function 443 could have a subset of bits selected or possibly a secure hash expanded in order to obtain the number of bits required for a symmetric key with a symmetric ciphering algorithm, such as key 223*a*. A key derivation function (KDF) 443 could comprise a KDF compatible with or specified by ANSI standards for "X9.63 Key Derivation Function". Other possibilities exist for a key derivation function 443 to convert a secret X1 223 into a symmetric ciphering key 223*a* and a MAC key 223*b* without departing from the scope of the present disclosure. As contemplated in the present disclosure, although an ECC public key such as secret X1 223 can comprise a coordinate with an X value and a Y value, in exemplary embodiments a single number comprising the X value can be selected and input into a key derivation function 443.

For a key exchange step 414 by server A 108, server A 108 can select the SRU PK 109*w* from for the specific SRU 109 and RU 109*b* using the identity SRU ID 109*i* received in message 412. For some exemplary embodiments, the identity SRU ID 109*i* can comprise a secure hash value over SRU PK 109*w*, and thus server A 108 could select the SRU PK 109*w* using the secure hash value over SRU PK 109*w* as the identity (where server A 108 could store the has values for all public keys SRU PK 109*w*). Server A 108 can also receive the ephemeral public key PKe 409*b* in message 412, possibly along with the set of cryptographic parameters 191*e*. Server A 108 could also record set of cryptographic parameters 191*e* associated with both PKe 409*b* and SRU PK 109*w* in a certificate for SRU PK 109*w*. RU 109*b* could also record a set of cryptographic parameters 191*e* in a certificate for SRU-SP PK 106*b*, and all of the PKI keys depicted in FIG. 4*b* could use the same set of cryptographic parameters as those specified in a certificate for SRU-SP PK 106*b* recorded by SRU 109. In other words, in exemplary embodiments, a certificate for SRU-SP PK 106*b* and a certificate for SRU PK 109*w* could use the same set of cryptographic parameters 191*e*, such as specifying the same named elliptic curve and same key lengths.

Key exchange step 414 for a sever A 108 depicted in FIG. 4*b* can correspond to key exchange 409 for RU 109*b*. Key exchange step 414 can comprise (i) inputting or using an ECC point addition operation 444 over PKe 409*b* and SRU PK 109*w*, and (ii) the server static private key SRU SK 106*a* with an ECDH key exchange algorithm 442, which can comprise the same or equivalent key exchange algorithm 441 depicted and described in connection with key exchange step 409 described above. Other elements or algorithms within a key exchange step 414 can be equivalent to a key exchange step 409 above, including the use of shared parameters 191*e*. The output of a key exchange algorithm 414 can comprise a secret key or value X1 223 as well as symmetric ciphering key 223*a* and MAC key 223*b*.

Server A 108 can conduct an ECC point addition step 444 in order to combine (i) SRU static public key SRU PK 109*w* recorded in a database for server A 108 with (ii) received ephemeral public key PKe 409*a* received in a message 412. Exemplary calculations for an ECC point addition 444 can comprise the calculations shown for point addition in the Wikipedia article for "Elliptic Curve Point Multiplication" dated May 15, 2018, which is herein incorporated by reference in its entirety. The output of an ECC point addition step 444 can be input into ECDH key exchange algorithm 442. An ECC point addition step 444 can be performed with a named elliptic curve from a selected set of parameters 191*e*, where the set of parameters 191*e* could be specified in a certificate for SRU PK 109*w*.

At step 445, server A 108 can select the static private key SRU-SP SK 106*a*. In exemplary embodiments, server A 108 could record a plurality of different private keys for SRU-SP, and server A 108 could select the private key SRU-SP SK 106*a* corresponding to the public key SRU-SP PK 106*b* recorded in SRU 109 based on the identity SRU ID 109*i* received in message 412. In this manner, by using a plurality of different keys SRU-SP SK 106*a* with different SRU 109, security can be increased, since the compromise of a single key SRU-SP SK 106*a* would affect only a subset of SRU 109. In other words, for exemplary embodiments, the security of an overall system 100 with a plurality of different units SRU 109 is increased by using different keys SRU-SP SK 106*a* with different SRU 109. For this embodiment, different SRU 109 would record different values for SRU-SP PK 106*b*. Mapping of SRU-SP SK 106*a* to different SRU 109 could be obtained by server A 109 associating the identity SRU ID 109*i* with different values of SRU-SP SK 106*a*.

Exemplary data and numbers can be provided to demonstrate the calculations for a key exchange step 414. Parameters 191*e* can comprise the named elliptic curve of "secp128r1" with key lengths of 128 bit long keys. Although the exemplary numbers for keys, points, and a named curve are provided, other values for keys, points, and named ECC curves could be utilized as well.

The server static private key SRU-SP SK 106*a* selected for SRU 109 in a step 445 based on the identity SRU ID 109*i* from message 412 can comprise the exemplary following number, and can be recorded by server A 108:

246768250079261690512638148137618184294

Note that the above value for SRU-SP SK 106*a* corresponds to the public key SRU-SP PK 106*b* in a step 431. The ephemeral public key PKe 409*b* received in message 412 can comprise the following exemplary values with X and Y numbers (or "coordinates") of:

X: 239356896551017663412726672579682627094
Y: 209570745539973929739512070961905802250

Note that the above ephemeral public key PKe 409*b* corresponds to the ephemeral private key SKe 409*a* above from step 409. The SRU static public key SRU PK 109*w* for a step 444 can comprise the following exemplary values with X and Y numbers (or "coordinates") of:

X: 203473426612520506812902270038827201196
Y: 64318327833120582836973711848343026891

Note that the above value for SRU PK 109*w* corresponds to the secret or private key for SRU SK 109*p* from a step 430. ECC point addition step 444 by server A 108 can combine the SRU static public key SRU-SP PK 109*w* and the ephemeral public key PKe 409*a* in order to output the following value for point calculated in a step 444:

X: 59121922812458579600446751790662160796
Y: 304934509235778268978955867170200917057

An ECDH key exchange algorithm 442 in key exchange step 414 can input (i) the static private key for SRU-SP SK 106*a* from a step 445 and (ii) the value calculated from the ECC point addition operation in step 444 (e.g. SRU PK 101*w*+PKe 409*b*) mod n). The output of ECDH key exchange algorithm 442 in key exchange step 414 can be the secret value or point X1 223. Note that the secret X1 223 as derived by RU 109*b* in a key exchange step 409 above equals or is the same numeric value as the secret X1 223 derived by server A 108 in a key derivation step 414. An exemplary number or value for secret X1 233 calculated by server A 108 using a key exchange step 414 using the above exemplary numeric values for PKe 409*a*, SRU PK 101*w*, and SRU-SP SK 106*a* would be:

X: 283470377637256529257925581999478035172
Y: 117395441238388206677723127104680679540

After conducting an ECDH key exchange algorithm 442 in a key exchange step 414, server A 108 can input the shared secret key X1 223 into a key derivation function 443. The key derivation function 443 can comprise the same key derivation function 443 used by a RU 109*b* in a step 409 above. The output of a key derivation function 443 can comprise both (i) a symmetric ciphering key 223*a* and (ii) a MAC key 223*b*. Symmetric ciphering key 223*a* and MAC key 223*b* can be subsequently used by server A 108 in a decryption step 415 and an encryption step 423 in FIG. 4*a* above. MAC key 223*b* can be used with a symmetric ciphering algorithm in order to generate a MAC code, such that the other party using the same key 223*a* and MAC key 223*b* can process the ciphertext and calculate the same MAC code in order to verify message integrity.

The value of shared secret X1 223 could also be computed by server A 108 by the following equivalent calculation: (SRU-SP SK 106*aPKe 409***e*)+(SRU-SP SK 106*aSRU PK 109***w*). In other words, the calculation or generation of shared secret X1 223 by server A 108 can comprise an elliptic curve point addition using at least the device or RU ephemeral public key 409*e* and the SRU static public key 109*w*.

FIG. 5*a*

Figure 5B:
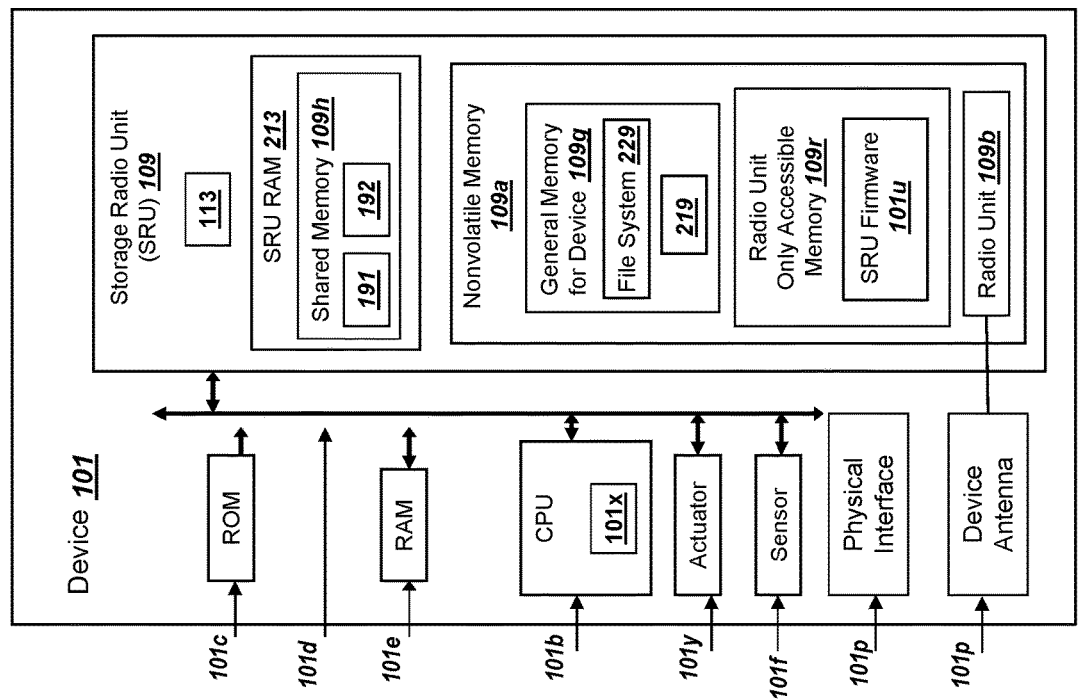
FIG. 5b is a flow chart illustrating exemplary steps for configuring a storage radio unit to communicate with a device using a shared nonvolatile memory interface in RAM, in accordance with exemplary embodiments.
Figure 5A:
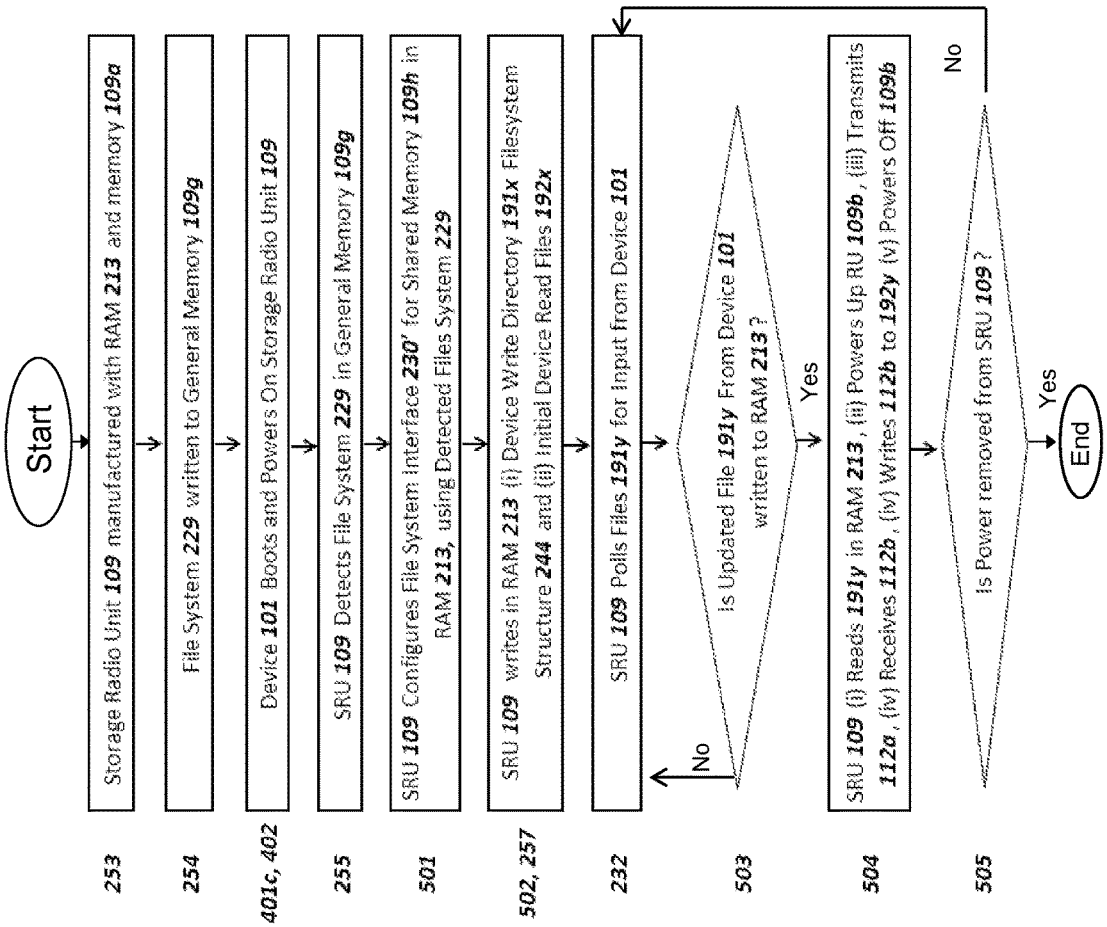
FIG. 5a is a graphical illustration of hardware, firmware, and software components for a device and a storage radio unit, including a shared memory interface operating in RAM for the storage radio unit, in accordance with exemplary embodiments.

FIG. 5*a* is a graphical illustration of hardware, firmware, and software components for a device and a storage radio unit, including a shared memory interface operating in RAM for the storage radio unit, in accordance with exemplary embodiments. A device 101 can include and operate a storage radio unit (SRU) 109. Although embodiments depicted above such as with FIG. 1*a*, FIG. 2*a*, etc. depict shared memory 109*h* for device 101 and SRU 109 as operating or within a nonvolatile memory 109*a* such as flash memory within SRU 109, for some exemplary embodiments a shared memory interface comprising device write memory 191 and RU write memory 192 can reside and operate within SRU RAM memory 213, as depicted in FIG. 5*a*. Shared memory 109*h* could also record and operate a shared filesystem interface 230' from FIG. 2*a*, FIG. 3*a*, FIG. 3*b*, and FIG. 3*c*, where the filesystem and files 191*y* and 192*y* are stored within volatile memory 213. In other words, (i) device write memory 191 (and RU read memory) in FIG. 5*a* within RAM 213 could store a directory 191*x* and files 191*y* as depicted in FIG. 3*a*, and (ii) RU write memory (and device read memory) 192 in FIG. 5*a* within RAM 213 could store a directory 192*x* and files 192*y* as depicted in FIG. 3*b*.

Memory processor 109*d* could include the logic, drivers, firmware, etc. to store configure, and operate the shared filesystem interface 230' within RAM 213. For example, the configuration process 231 could detect the filesystem 229 for nonvolatile memory 101*g* recorded for device 101 from FIG. 2*f*, and subsequently use libraries in SRU firmware 109*u* to write directory 191*x* in memory 191 and directory 192*x* in memory 192. The usage of memory 191 and memory 192 for recording files could comprise a RAM drive. Processor 109*d* in SRU 109 could operate and store a shared filesystem interface 230' in RAM 213 in a manner that (x) directories 191*x* and 192*x* appear to device 101 to operate within the same logical drive, partition, or storage unit as filesystem 229 within nonvolatile memory 109*g*, but (y) SRU 109 records the directories 191*x* and 192*x* in RAM 213. Or, in other embodiments, processor 109*d* in SRU 109 could operate and store a shared filesystem interface 230' in RAM 213 in a manner that directories 191*x* and 192*x* appear to device 101 to operate within a different or separate logical drive, partition, or storage unit as filesystem 229 within nonvolatile memory 109*g*.

Benefits for operating shared memory 109*h* in RAM 213 can be that read and write operations can be faster and utilize less energy. For standard computing components, read and write functions to RAM are faster and utilize less energy than read and write operations to nonvolatile memory such as flash memory. A tradeoff is that RAM 213 could be flushed or cleared of usable binary data when power is removed from SRU 109. For files 191*y* in memory 191 and files 192*y* in memory 192, volatile storage in RAM 213 could require that configuration process 231 for memory 109*h* in RAM 213 is conducted each time that SRU 109 is powered (as opposed to a single time or very occasionally for configuration process 231 operating on memory 109*h* in nonvolatile memory 109*a*)

However, for some exemplary embodiments, an SRU 109 could use persistent memory, known as nonvolatile RAM (NVRAM). NVRAM can use transistor gate technology recording binary states within memory cells when electrical power is removed from the memory. NVRAM for RAM 213 in SRU 109 could use a memory chip supporting the memory technology commercially available in the NVDIMM-P specifications as of 2018 (but not with the DIMM physical form and rather in a single chip or silicon area within SRU 109 with NVRAM capabilities). In exemplary embodiments, SRU 109 could use persistent memory or nonvolatile RAM memory in RAM 213 for shared memory 109h, and thus obtain the benefits of faster read and write times (with lower power consumption) while also having the benefits of nonvolatile storage, such that files 191y and 192y could continue to be recorded in RAM 213 in a shared nonvolatile memory 230 when power is removed from SRU 109.

Other than use of shared memory 191 and 192 in RAM 213 (which can comprise NVRAM or persistent memory), the components, firmware, and software for a device 101 and SRU 109 depicted in a FIG. 5a could be the same or equivalent those depicted in FIG. 1b, FIG. 2a, etc. Note that SRU firmware 109u in FIG. 5a is configured to support the operation of a shared memory interface 230 between device 101 and SRU 109 in RAM 213, which would be another difference for an SRU 109 in FIG. 2a and FIG. 5a. In exemplary embodiments, the same device 101 drivers 101g and libraries 101x can be used with either configuration of (i) files 191y and 192y operating in nonvolatile flash memory 109a within SRU 109, or (ii) files 191y and 192y operating in RAM 213 within SRU 109. In other words, the firmware of 109u can operate internal drivers and controlling software such that device 101 does not need to be aware of the location for storage and/or recording of files 191y and 192y within SRU 109. In addition, although the use of SR RAM 213 within SRU 109 in FIG. 5a, in some exemplary embodiments the RAM 213 could reside or operate outside of a SRU 109 and within device 101, such as a RAM 213 functioning equivalent to the memory 109h in FIG. 7 below.

FIG. 5b

FIG. 5b is a flow chart illustrating exemplary steps for configuring a storage radio unit to communicate with a device using a shared nonvolatile memory interface in RAM, in accordance with exemplary embodiments. Although embodiments depicted above such as with FIG. 1a, FIG. 2a, etc. depict shared memory 109h for device 101 and SRU 109 as operating or within a nonvolatile memory 109a such as flash memory within SRU 109, for some exemplary embodiments a shared memory interface comprising device write memory 191 and RU write memory 192 can reside and operate within SRU RAM memory 213, as depicted in FIG. 5a. FIG. 5b depicts exemplary steps for SRU 109 and RU 109b to use a shared memory interface 230 in RAM 213. A filesystem recorded in RAM 213 could comprise or be referred to as a flash drive. RAM memory 213 can also comprise persistent RAM or NVRAM, as described in FIG. 5a.

At step 253, SRU 109 can be manufactured with both RAM 213 and nonvolatile memory 109a. In exemplary embodiments, RAM 213 can comprise portions of both (i) volatile RAM such as SRAM or DRAM and (ii) persistent memory RAM, such as NVRAM. A shared memory interface 230 could use either volatile RAM or persistent RAM for the steps in FIG. 5a. At step 254, a filesystem 229 could be written to general memory 101g for device 101, and files for device 101 such as an OS 101h could be written as well. A step 254 could be conducted by a configuration unit 110d in FIG. 1a, or by device 101 (similar to a personal computer formatting a flash memory drive such as a USB memory stick). If a configuration unit 110d performs a step 254, then SRU 109 could be inserted inside device 101 after a step 254. At step 401c, device 101 can power SRU 109. SRU 109 can then conduct a boot process in step 402 conducted along with step 401c, at the conclusion of a step 401c, device 101 can mount filesystem 229. In exemplary embodiments, a power control unit 109e sets the power for RU 109b in a sleep state both (i) after RU 109b completes a boot process along with SRU 109 in a step 402 until (ii) device 101 writes data for RU 109b in files 191y. In other words, for some embodiments, a trigger 245 could wake RU 109b if data other than application data 112a is written to files 191y, such as, but not limited to, radio parameters input 191a, command script 191g, device date and time 191h, etc.

At step 255, SRU 109 detects the type of filesystem 229 recorded and operating with nonvolatile memory 109g as general device memory in nonvolatile memory 109a of SRU 109. A step 255 is also depicted and describe in connection with FIG. 2f above. SRU 109 can select a filesystem driver 242 from SRU firmware 109u that is compatible with the detected filesystem type for filesystem 229 in a step 255. Note that in exemplary embodiments, when either (a) RAM 213 comprises volatile memory or (b) a step 255 and subsequent steps are being conducted the first time with a NVRAM for RAM 213, then a directory 191x may not be present or readable for device 101. Consequently, SRU 109 after boot and detection of type of filesystem 229 in memory 109g, SRU 109 can in a step 501 conduct a configuration process 231 for SRU 109 to operate shared filesystem interface 230' for device 101 and SRU 109 in RAM 213. A step 501 can include SRU 109 selecting, loading, and operating drivers or packages from firmware 109u, including possibly kernel modules.

At step 502, SRU 109 can conduct a step 257 from FIG. 2f, where the actions can be performed for RAM memory 213 instead of nonvolatile flash memory 109a for a step 257 from FIG. 2f. At step 257 with a step 502, SRU 109 can write SRU 109 device write directory 191x to shared memory 109h in RAM 213 using the selected file system driver 242. SRU 109 can use (i) memory write libraries 217c from boot firmware and a RAM 213 memory interface in order to change transistor states, or memory blocks in order to write binary data to RAM 213, where the resulting binary data written can comprise a device write directory 191x for the file system 229. Device write directory 191x at step 257 with a step 502 can also include base data such as the exemplary files and data depicted in FIG. 3a above. At step 502, SRU 109 can also write RU write directory 192x and associated files for startup in shared memory interface 230 in RAM 213.

As mentioned above in FIG. 5a, the operation of a shared memory interface 230 in RAM 213 can be transparent to device 101, and directories 191x and 192x could be viewed and written to by CPU 101b under a collective root directory that includes all of 191x, 192x, and general files for device 101 in memory 109g. For example, a root directory of "l" in shared filesystem interface 230' can have directories of "/device-write/", "/ru-write/", and "/general/", where device 101 could write files that don't pertain to the operation of RU 109b in the "/general/" directory. After device 101 mounts filesystem 229, the directory 191x and 192x can appear within the filesystem 229. In exemplary embodiments with shared filesystem interface 230' in either RAM 213 or nonvolatile memory 109g, SRU 109 can operate and control the shared filesystem interface 230' so that directory 191x and directory 192x appear to reside within filesystem 229, although directory 191x and directory 192x operate or are stored in shared memory 109h, which could be in RAM 213.

SRU 109 using processor 109d can begin polling 232 RAM 213 for changes or updates written by device 101, in order to detect data written and ready to be processed by RU 109. Note that either processor 109c or processor 109d could conduct a polling 232. Or, a trigger library 245 operating in a processor 109d could be used instead of polling 232, since memory processor 109d normally processes all data communicated with device 101 through bus 202. A polling process 232 or trigger library 245 could be integrated with a step 503, such that the polling process 232 or trigger library 245 conducts a step 503 to determine if device 101 has written files 191y or data to directory 191x.

At step 503, SRU 109 using processor 109d could determine if device 101 has written files 191y or data to directory 191x. If no data or files 191y are written, then SRU 109 could continue (i) the polling 232 process as depicted in FIG. 5b, or (ii) monitoring of directory 191x via trigger library 245. Note that processor 109d could continue to operate separately as a memory controller for device nonvolatile memory 109g during step 232 and step 503, such that device 101 could read and write files to memory 109g for other purposes than communicating with RU 109b, such as device 101 logging data or reading files for device 101 in memory 109g. Trigger library 245 could be activated when device 101 writes data for a memory address that resides in shared memory 109h operating in RAM 213.

SRU 109 upon determining that at least one file 191y for directory 191x has been written to shared memory 109h could proceed to a step 504. At step 504, SRU 109 using processor 109d could (i) read file 191y in RAM 213 written by device 101 in a step 313, (ii) use power control unit 109e to power up RU 109b or change RU 109b from an off or sleep state to an active state, (iii) instruct or provide data for RU 109b through internal bus 212 to transmit data from files 191y, which could comprise application data 112a. In a sub-steps (iv) of step 504, RU 109b could receive server B response data 112b for the application data 112a transmitted in sub-step (iii), RU 109b in conjunction with SRU 109 could write the server B response data 112b to 192y, and (v) power control unit 109e could either power off RU 109b or return RU 109b to a sleep state. In exemplary embodiments, after a sub-step (v), the power down of RU 109b could comprise RU 109b entering a sleep or deep sleep state, where RU 109b continues to accept wake signaling through internal bus 212 and from a power control unit 109e. In other words, RU 109b does not need to conduct a boot process in order to return to an active state and subsequently read or receive data from files 191y.

At step 505, SRU 109 can continue operating until device 101 disconnects SRU 109 from electrical power, such as when device 101 shuts down or enters a deep sleep state where SRU 109 is no longer powered. If power is continued to be provided to SRU 109, then SRU 109 could continue to step 232 in FIG. 5b, where SRU 109 continues to monitor directory 191x and files 191x for data input from device 101, and then subsequent take the steps depicted in order to process and transmit the data, as well as receive and record a response from a server B 110a.

FIG. 6a

Figure 6A:
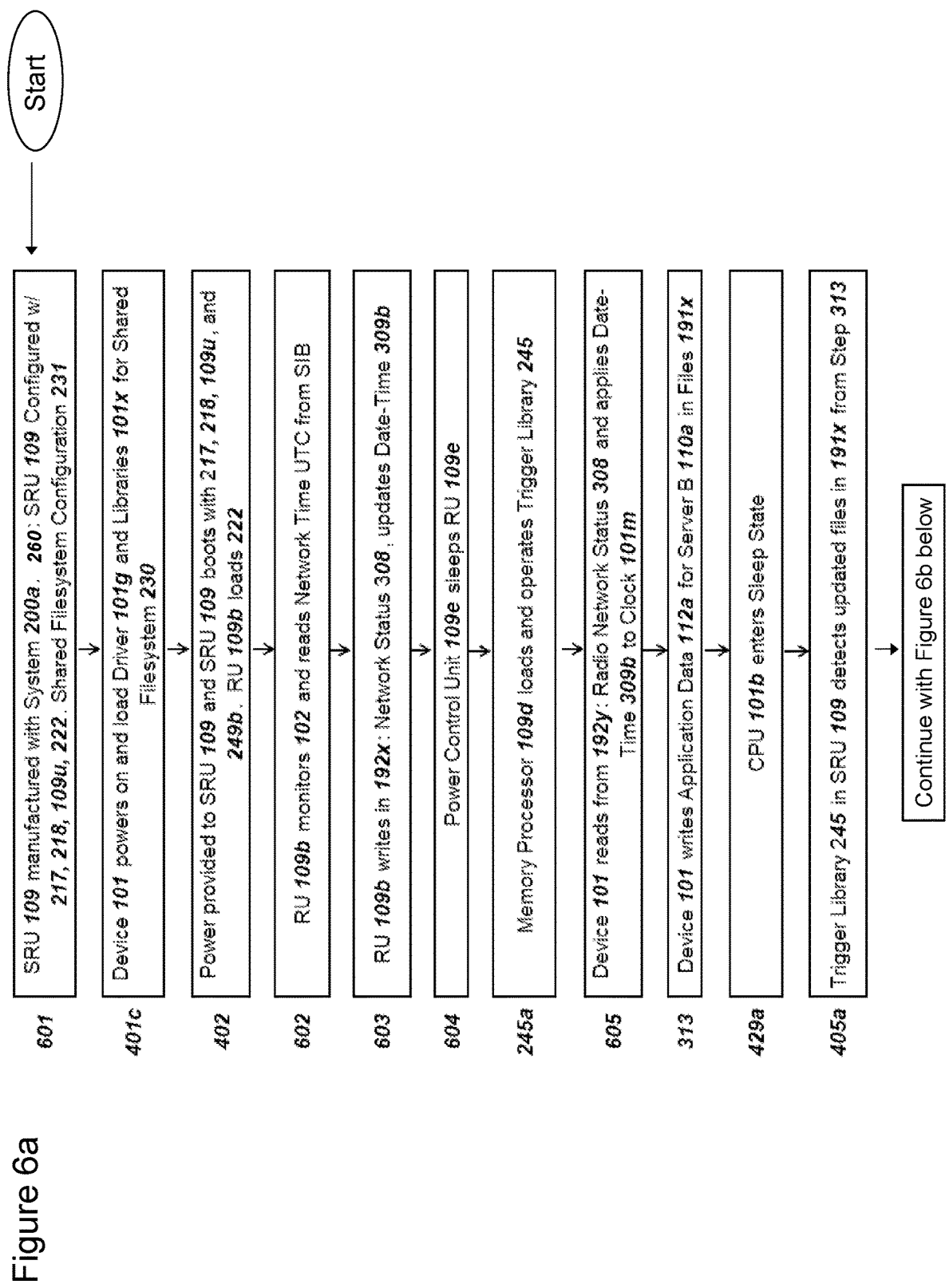
FIG. 6a is a flow chart illustrating exemplary steps for storage radio unit to communicate with a device using a shared nonvolatile memory interface, in accordance with exemplary embodiments.

FIG. 6a is a flow chart illustrating exemplary steps for storage radio unit to communicate with a device using a shared nonvolatile memory interface, in accordance with exemplary embodiments. FIG. 6a depicts exemplary steps for an SRU 109 to communicate with device 101, the steps depicted in FIG. 6a also continue with FIG. 6b below. In the FIG. 6b below, SRU 109 uses application data 112a received from device 101 in FIG. 6a to operate a radio unit (RU) 109b to transmit the application data 112a and receive a server B response 112a. The steps for SRU 109 in FIG. 6a include steps previously depicted and described, as well as providing additional details for the operation of a SRU 109 and device 101.

At step 601 SRU 109 can complete manufacturing and configuration for use with a device 101. SRU 109 can be manufactured with the components from a system 200a. SRU 109 can also undergo a step 260 from FIG. 2f, where SRU 109 is configured with boot firmware 217, a boot configuration 218, SRU firmware 109u, and radio unit firmware 222. A file system 229 for device memory 109g can also be written and formatted into the nonvolatile memory 109a of SRU 109. SRU 109 can also conduct a shared filesystem configuration 231 step. Note that the use of a shared filesystem configuration step 231 could omit the use of a particular file system, and an SRU 109 and device 101 could communicate through shared memory 191 and 192 using pre-agreed memory addresses in a shared memory 101h for SRU firmware 109u and device driver 101g for SRU 109. A step 601 can include distribution of SRU 109 and also insertion of SRU 109 into device 101.

At step 401c, device 101 powers on and load device driver 101g for SRU 109 and libraries 101x for in order to for device 101 to communicate using device driver 101g using shared filesystem 230'. Libraries 101x can include the logic, instructions for CPU 101b, or machine executable code for device 101 to write data such as application data 112a to a directory 191x within shared memory 109g in the form of a file 191y. Libraries 101x can include the logic, instructions for CPU 101b, or machine executable code for device 101 to read data such as server B response 112b data to from directory 192x in the form of a file 192y. A step 401c is also depicted and described in connection with FIG. 4a. A step 401c can also comprise OS 101h for device 101 mounting a "drive" for memory 109f, where memory 109f from FIG. 1c can include both device general memory 109g and shared memory 109h. Memory 109f can include a filesystem 229.

At step 402, device 101 can provide power to SRU 109 via pins 109x. SRU 109 can boot with boot firmware 217, boot configuration 218, where the boot firmware and configuration loads SRU firmware 109u, and an SRU operating configuration 249b. SRU 109 can power RU 109b and RU 109b can also boot and load radio unit firmware 222. An eUICC 113 can also boot up in a step 403 and load and operate firmware for the eUICC in a step 402. Upon power up of SRU 109, power control unit 109e can power RU 109b. At the conclusion of a boot process in step 402 and steps 602 and 603 below, power control unit 109e can command RU 109b to enter a sleep or deep sleep state, such that waking RU 109b does not require a full boot process for RU 109b.

At step 602, RU 109b can monitor wireless network 102 and read or receive a value for network time UTC from a system information block (SIB) broadcast by wireless network 102.

At step 603, RU 109b can write in 192x values or files 192y for network status 308, also update network date-time 309b. As mentioned above, the steps for RU 109b to write files 192y in directory 192x could comprise RU 109b sending data to processor 109d via an internal bus 212, and processor 109d using libraries 246 can write the data to directory 192x on behalf of RU 109b. Note that other startup data for device 101 to read can be written in a step 602 as well, such as files 192y for radio parameters 192a, a log file 306, power control settings 192g, cryptographic parameters available or operating 192e, and other exemplary data depicted or described in FIG. 3b. Although not depicted for files 192y written by RU 109b, RU 109b could also obtain geographical coordinates or information from in a step 602 and write the coordinates or location data to files 192y.

Network status 308 in a step 603 can indicate which wireless network 102 is available to RU 109b as well as signal strength for RF signals received from wireless network 102. Note that SRU 109 could also record and use network date-time 309b. SRU 109 could use the network date-time 309b with RF clock 205 and PLL 211 going forward to properly track time. In exemplary embodiments, the date/time values 304a (from FIG. 3a) can be recorded by SRU 109 using the system time for SRU 109 which can be initially set with network date-time 309b from RU 109b in a step 602.

After RU 109b records files 192y from a step 603, in a step 604 power control unit 109e can sleep RU 109b, such that RU 109b is no longer in an active state and powering RF front end 203 (excluding RF clock 205 which can be used to drive processor 109d). SRU 109 can then instruct memory processor 109d to load and operate with a trigger library 245 in a step 245a, where trigger library 245 can detect when device 101 writes files 191y to directory 191x. Trigger library 245 can operate in a continuous manner while processor 109d is in an active state. For embodiments where processor 109d enters a sleep state, then trigger library 245 can resume operation upon change of processor 109d back to an active state.

At step 605, device 101 can read from 192y the radio network status 308 and network date-time 309b, and device 101 can also apply network date-time 309b to clock 101m. In this manner, clock 101m for device 101 can be synchronized with network date and time broadcast by wireless network 102. Device 101 could use a device polling 233 with either driver 101g or library 101x to determine when data is written to files 192y. Device 101 can then proceed with normal operation, such as collecting data from a sensor 101f for operating an actuator 101y. Device 101 can then process application data 112a for transmission to server B 110a. The application data 112a can comprise any of the exemplary application data 112a described in FIG. 1a or FIG. 3a.

At step 313, device 101 can write the application data 112a for server B 110a in files 191y. The use of a step 313 by device 101 is also depicted and described in connection with FIG. 3c above. At step 429a, device 101 can enter CPU 101b in a sleep state, where step 429a is also depicted and described in connection with FIG. 4a above. At step 405a trigger library 245 with memory processor 109d in SRU 109 can detect updated files 191y with application data 112a in directory 191x from Step 313. Note that data for files 191y can normally pass through processor 109d since processor 109d controls both (i) external bus 202 to receive the application data 112a and (ii) memory core interface 109m in order to write the data to memory 109h. Consequently, trigger library 245 in processor 109d can detect when data is written to memory addresses or files 109y allocated to memory 109h from a configuration step 231.

Figure 6B:
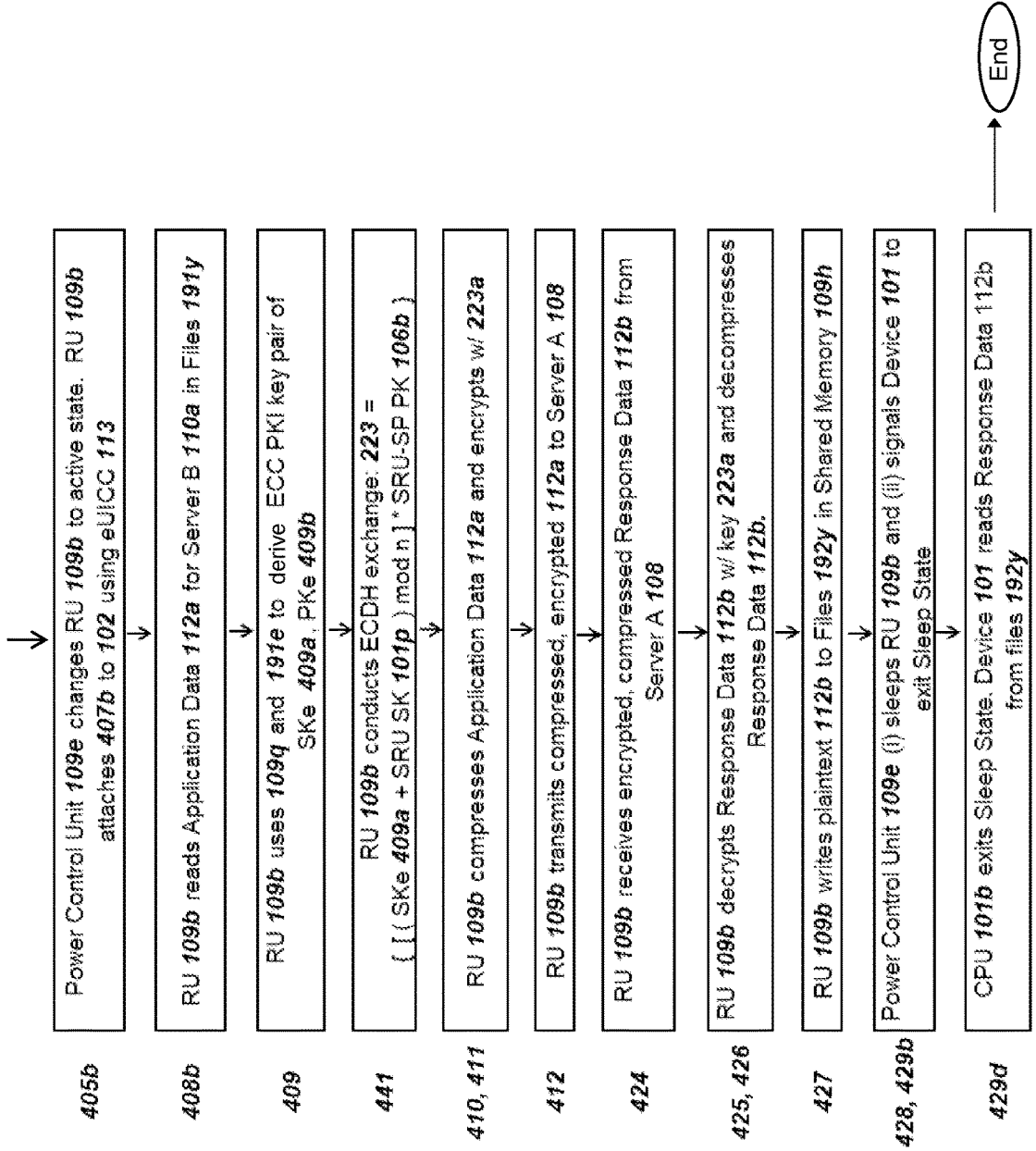
FIG. 6b is a flow chart illustrating exemplary steps for a storage radio unit to operate a radio unit and a shared nonvolatile memory interface, in accordance with exemplary embodiments.

Other possibilities for the operation and function of a trigger library 245 exist as well, without departing from the scope of the present disclosure. At the conclusion of the step 405a, SRU 109 has received application data 112a from device 101 and can subsequently take steps for RU 109b to transmit the data. The subsequent steps are depicted in FIG. 6b below. For some embodiments, SRU 109 could omit the use of a trigger library 245 and trigger process or step to detect when device 101 writes application data 112a to files 191x and instead RU 109b with processor 109c could conduct a polling step 232 as depicted in FIG. 2b above in order to detect when device 101 writes application data 112a to files 191x.

FIG. 6b

FIG. 6b is a flow chart illustrating exemplary steps for a storage radio unit to operate a radio unit and a shared nonvolatile memory interface, in accordance with exemplary embodiments. FIG. 6b depicts exemplary steps for an SRU 109 to operate an RU 109b to send and receive data, and also continues from FIG. 6a above, where SRU 109 receives application data 112a from device 101. In FIG. 6b, SRU 109 can operate a radio unit (RU) 109b to transmit the application data 112a and receive a server B response 112a. The steps for SRU 109 in FIG. 6b include steps previously depicted and described, as well as providing additional details for the operation of a SRU 109 and RU 109b.

At step 405b, power control unit 109e can receive a signal from trigger library 245 that files 191y or data is available for RU 109b. Power control unit 109e can comprise a module or library operating within memory processor 109d. Power control unit 109e can change RU 109b to an active state from a sleep state entered in a step 604 above. Note that RU 109b can remain continuously in a sleep state after a step 604 until a step 405b, which is a sleep state for RU 109b until device 101 has written application data 112a. RU 109b can conduct an attach step 407b to connect and register with wireless network 102 using eUICC 113. Attach step 407b can use network access credentials and network parameters recorded with an operational profile 113d in eUICC 113. For some embodiments, the use of an eUICC 113 is not required, and RU 109b could connect with wireless network 102 without an eUICC 113, such as connecting to a WiFi network using a pre-shared key or EAP-TLS for the WiFi network.

For a step 405b, power control unit 109e can also optionally temporarily disable the write or erase function of device 101 for memory 101g or memory 101h when either (a) RU 109b is in a transmitting or attached state with wireless network 102, or (b) when RU 109b is in a transmitting state and drawing a current above a threshold, such as an exemplary 100 mA. This exemplary functionality for a power control unit 109e to disable write or erase functionality for device 101 can be used by power control unit 109e any time that RU 109b transmits, and not just in a step 405b.

At step 408b, RU 109b can read application data 112a for server B 110a from files 191y. Note that memory processor 109d could read the data from memory 109h and write the data to RU 109b via internal bus 212. In other words, for some embodiments, memory processor 109d could read the data on behalf of RU 109b. The use of (a) a step 408b and memory 109h to store application data 112a supports (b) RU 109b and CPU 101b in device 101 separately using sleep states, such that both RU 109b and processor 101b do not have to be active or in active states at the same time, in order to communicate data between CPU 101b and RU 109b. If data is passed directly between CPU 101b in device 101 and RU 109b (such as with AT commands and related conventional technology), then both CPU 101b and RU 109b would normally need to be in active states at the same time. In exemplary embodiments and through the use of separate and independent sleep states for RU 109b and CPU 101b, overall power consumption for device 101 can be reduced and a maximum current draw on battery 101n for device 101 could also be reduced, thereby extending the battery life (e.g. battery life can be longer when maximum current draw is lower).

At step 409 in FIG. 6b, RU 109b can use cryptographic algorithms 109q and a set of cryptographic parameters 191e (or cryptographic_settings) to derive an ephemeral ECC PKI key pair comprising SKe 409a and PKe 409b. Note that cryptographic parameters 191e could be written to files 191y by device 101, or SRU 109 could record the cryptographic parameters 191e without using or requiring a file 191y. RU 109b can use a random number generated and information entropy accessible to RU 109b (including via RF clock 205 and RF front end 203) in order to generate a random number to process a number for SK 409a. RU 109b can then conduct a sub-step 441 of a step 409, as depicted and described in connection with a key exchange step 409 in FIG. 4b above. In a sub-step 411, RU 109b can conduct an ECDH exchange using recorded or stored PKI keys. RU 109b can calculate a secret shared key 223 as equal to {[(SKe 409a+SRU SK 101p) mod n]*SRU-SP PK 106b}. Exemplary values for an ECDH key exchange in step 441 are depicted and described in connection with FIG. 4b. A step 441 could also use a set of cryptographic parameters 191e, such as values of A, B, Q, and n for a named ECC curve associated with all of the PKI keys used in a step 441.

Although not depicted in FIG. 6b, RU 109b could then also conduct a key derivation function step 443 using the secret shared key 223 in order to calculate a symmetric ciphering key 223a and MAC key 223b. SRU 109 could store the resulting keys 223a and 223b in protected memory 109r, and re-use the keys 223a and 223b at a later time until parameters 191e specify key rotation. In other words, (i) an RU 109b does not need to conduct a step 409 and 441 each time application data 112a is received by SRU 109 for RU 109b, but rather (ii) a step 409 and 441 may be conducted only periodically, such as an exemplary time of once a day, or once a week, and other possibilities exist as well for the periodic timing of conducting a step 409 and 441 without departing from the scope of the present disclosure. For times when a step 409 and 441 are skipped, then RU 101b could read the keys 223a and 223b from protected memory 109r. The need or use of a rotated key 223a could be signaled to server A 108 via the use of a new, different ephemeral public key 409b in a message 412 in FIG. 4a. Omission of key 409b or re-use of the same key 409b in a message 412 (depicted in FIG. 4a) can indicate to server A 108 that a previously calculated symmetric key 223a is used to encrypt data.

As noted above in connection with FIG. 4a, for some exemplary embodiments a step 409 and step 441 could also be omitted, and RU 109b could use a recorded or stored shared secret symmetric ciphering key 127b instead of a derived key 223a as an encryption key for subsequent steps. Server A 108 could also record the shared secret key 127b, and select key 127b using an SRU identity 109i from a message 412 in FIG. 4a.

At step 410, RU 109b can compress application data 112a with standard compression libraries, and the name or identifier of a compression library could be included with parameters 191e. At step 411, RU 109b also encrypts the compressed application data 112a with symmetric ciphering key 223a and a symmetric ciphering algorithm such as AES-128 from a set of cryptographic algorithms 109q. In some exemplary embodiments, steps 409, 441, and 411 could be omitted, if device 101 performs the compression and encryption, and in these cases application data 112a received by SRU 109 from device 101 could be in the form of a ciphertext. For these embodiments, device 101 could specify that encryption by RU 109b is omitted using values or fields set in cryptographic parameters 191e, which could be written by device in files 191y.

At step 412, RU 109b can transmit the compressed, encrypted application data 112a through wireless network 102 to server A 108. A step or message 412 is also depicted and described in connection with FIG. 4a. Although not depicted in FIG. 6b (but depicted and described in connection with FIG. 4a), server A 108 could also send a response or confirmation that message 412 has been received by server A 108. Server A 108 and server B 110a can then conduct the series of steps and messages to transfer the application data 112a to server B 110a and also for server A 108 to receive server B response 112b data from server B 110a. Server A 108 can then use IP network 111 (which was used by server A 108 to receive application data 112a from RU 109b) to send the server B response 112b data to RU 109a via wireless network 102.

At step 424, RU 109b can receive encrypted, compressed server B response data 112b from Server A 108 via wireless network 102. At step 425, RU 109b can decrypt response data 112b with the mutually derived symmetric ciphering key 223a, where decryption can use the same symmetric ciphering algorithm used in a step 411. A step 411 and step 425, RU 109b can also use MAC key 223b in order to confirm message and data integrity within transmitted or received. At step 426, RU 109b can decompresses server B response data 112b. At step 427, RU 109b can write the plaintext data for server B response data 112b to files 192y in shared memory 109h. Writing data for RU 109b to shared memory 109b can comprise RU 109b passing the data via internal bus 212 to processor 109d, and processor 109d could physically write the server B response data 112b to shared memory 109h. For some exemplary embodiments, SRU 109 and processor 109d could conduct the steps 425, 426, and 427 instead of RU 109b.

At step 428, after a step 427, power control unit 109e could instruct RU 109b to enter a sleep state. In exemplary embodiments, a trigger library 245 could also monitor or detect when RU 109b writes server B response 112b data to memory 109h, and trigger library could signal power control unit 109e to sleep RU 109b. Or, RU 109b could be programmed to detach from wireless network 102, or enter a long discontinuous reception (DRX) state, and enter a sleep state after writing server B response 112b data to memory 109h, which could comprise a file 192y written for server B response 112b data. Trigger library 245 could continue to detect if new data is written by device 101 to files 191y, where SRU 109 could return to step 405a depicted in FIG. 6b.

At step 429b, power control unit 109e or SRU 109 could signal device 101 or CPU 101b that CPU 101b should exit a sleep state entered at step 429a (in FIG. 6a and FIG. 4a above). Or, (i) if CPU 101b exited a sleep state after 429a and then re-entered a sleep state or (ii) or if CPU 101b comprises a sleep state at step 429b, then power control unit 109e or SRU 109 could signal device 101 that CPU 101b should exit the sleep state in order to receive server B response 112b data. A signal 429c to device 101 for a step 429b is also depicted and described in connection with FIG. 4a above. At step 429d, CPU 101b or device 101 could receive the message or signal 429c to wake and read sever B response 112b data written by SRU 109 to files 192y.

Although not depicted in FIG. 6b, device 101 could use polling 233 (from FIG. 2b) during periodic wake states for CPU 101b to read the server B response 112b data written by SRU 109 in files 192y. In other words, a continuous sleep for CPU 101b from a step 429a to until a step 429d is not required, and for some embodiments a CPU 101b could periodically wake and poll 233 files 192y for server B response data 112*b*. For these embodiments, if no new files 192*b* for device 101 are detected, then CPU 101*b* could return to a sleep state and then later wake and poll 233 again for files 192*s*.

Device 101 could process the server B response 112*b* data with a device program 101*i* using a step 429*e* from FIG. 4*a*. In addition, although not depicted in FIG. 6*b*, a step 425 could include RU 109*b* receiving a server B digital signature 307 for the server B response 112*a* data. RU 109*b* could also write the server B digital signature 307 to files 192*y*, which is also depicted and described in connection with FIG. 3*b* and FIG. 4*a* above. Device 101 could use a certificate for server B 110 such as a public key in certificate 110*c* in order to verify the received server B digital signature 307.

FIG. 7

FIG. 7 is a graphical illustration of hardware, firmware, and software components for a device, in accordance with exemplary embodiments. A device 101 could operate a shared memory interface 109*h* for the device 101 and RU 109*b* without requiring a separate radio storage unit. In other words, the benefits of a shared nonvolatile memory 109*h* could be obtained for a device where nonvolatile memory 109*h* operates within a separate housing or package than radio unit 109*b*. Thus, for some exemplary embodiments, the components and logic for a storage radio unit 109 could be utilized in a device 101 without device 101 operating the components inside a storage radio unit 109 with an enclosure, package, or housing 227 (as depicted in FIG. 2*a*).

Device 101 for embodiments depicted in FIG. 7 could use components depicted and describe in connection with FIG. 1*b*, including CPU 101*b*, device bus 101*d*, RAM 101*e*, an antenna 101*t*, a power control unit 109*e*, and a WiFi radio or system 101*z*. Device 101 for embodiments depicted in FIG. 7 could also include radio unit (RU) 109*b*, and nonvolatile memory 101*q*. Radio unit 109*b* could be connected to bus 101*d* instead of residing or operating within a SRU 109. Nonvolatile memory 101*q* could comprise nonvolatile memory such as flash memory that is operated by device 101 and connected to bus 101*d*. Nonvolatile memory 101*q* could also comprise nonvolatile RAM or persistent RAM. Transducer 701 for device 101 could include a sensor 101*f* and/or an actuator 101*y* depicted and described in connection with FIG. 1*b*. Nonvolatile memory 101*q* can be similar to nonvolatile memory 109*a* for SRU 109 in FIG. 1*c*, but nonvolatile memory 101*q* could be operated by CPU 101*b* or controlled by CPU 101*b* instead of an SRU 109.

Benefits of the present disclosure can be achieved through the use of operating shared memory interface 109*h* in device nonvolatile memory 101*q*. For example, the benefits of sending data between CPU 101*b* and radio unit 109*b* through a shared memory interface 109*h* in nonvolatile memory 101*q* can include the previously noted benefits where CPU 101*b* and RU 109*b* can operate with separate and independent sleep states, and both CPU 101*b* and RU 109*b* do not have to both be in or operate with active states in order to pass data between the two units. A benefit from transferring the data via shared nonvolatile memory 109*h* is that the (x) data output from either CPU 101*b* or RU 109*b* can be recorded in shared memory 109*h* at any point in time (when the writing unit is active), and (y) the receiving or reading component for the data can be in sleep states. Trigger library 245 operated by CPU 101*b* can control the power of RU 109*b* (e.g. deep sleep, sleep, active, attached to wireless network 102, etc.) in conjunction with a power control unit 109*e*. Other benefits of the use of a shared memory interface 109*h* operated by device 101 in a nonvolatile memory 101*q* for device 101 can be obtained as well, without departing from the scope of the present disclosure.

A shared memory 109*h* in FIG. 7 can comprise a portion of nonvolatile memory nonvolatile memory 109*h*. Or, a shared memory 109*h* could operate in RAM 101*e* for some embodiments, such as those depicted and described in connection with FIG. 5*a* and FIG. 5*b*. Shared memory 109*h* when operating in RAM 101*e* could also be recorded in persistent RAM memory or nonvolatile RAM memory such as NVRAM depicted and described in connection with FIG. 5*a* above. Shared memory 109*h* could store or record a shared filesystem interface 230'. For some embodiments, the use of a shared filesystem interface 230' could be omitted and data for device write memory 191 and RU write memory 192 be recorded using memory addresses instead of file names 305*a* (from FIG. 3*a*) and 305*b* (from FIG. 3*b*) and directories 191*x* and 192*x*. Drivers 101*g* (in FIG. 1*b*) and RU firmware 222 (in FIG. 2*e*) could operate in order for CPU 101*b* and RU 109*b* to communicate through shared memory 109*h* via bus 101*d*. In some preferred exemplary embodiments, drivers 101*g* and RU firmware 222 can utilize a shared filesystem interface 230' operating in shared memory 109*h*.

A device 101 in FIG. 7 could use the steps for an SRU 109 to send and receive data from RU 109*b* through shared memory 109*h*. For these embodiments, CPU 101*b* could perform the steps of memory processor 109*d* for an SRU 109. Shared memory 109*h* could undergo a configuration process 231 in order to allocate shared memory 109*h* to (i) device write and RU read memory 191 and (ii) RU write and device read memory 192. A configuration unit 110*d* for device service provider 110 could conduct the configuration process 231 in order to format and structure memory 109*g*. Or, CPU 101*b* could operate with firmware to conduct the configuration process 231 before CPU 101*b* communicates with RU 109*b* through shared memory 231.

After a configuration process 231, device write memory 191 and RU write memory 192 could be structured with addresses and/or directories to store or record (i) data from CPU 101*b* for RU 109*b* and (ii) data from RU 109*b* for CPU 101*b*. Memory 191 and memory 192 are depicted and described in connection with FIG. 2*b* above. In exemplary embodiments a file system could be written to memory 191 and memory 192, and (i) memory 191 could record directory 191*x* and store files 191*y* (as in FIG. 3*a*) and (ii) memory 192 could record directory 192*x* and store files 192*y* (as in FIG. 3*b*). Exemplary data for files 191*y* are depicted and described in connection with FIG. 3*a* and exemplary data for files 192*y* are depicted and described in connection with FIG. 3*b*. Or, for embodiments where a file system is not used in memory 109*h*, then the data for files 191*y* could be recorded at memory addresses in memory 191 and the data for files 192*y* could be recorded in memory addresses in memory 192 (without the file structures depicted in FIG. 3*a* and FIG. 3*b*).

For exemplary embodiments depicted in FIG. 7, CPU 101*b* can perform the steps for a memory processor 109*d* depicted in Figures above, such as, but not limited to, (i) a step 405 in FIG. 4*a* and FIG. 6*a* (with separate steps 405*a* and 405*b* depicted in FIG. 6*a*), (ii) sending message 406*a* or commands to RU 109*b* using a message 406*a* in FIG. 4*a*, (iii) writing a command_script 191*g* from FIG. 3*a* to memory 191 for RU 109*b* to subsequently read, (iii) operating a trigger library 245 in a step 245*a* in FIG. 6*a*, and (iv) controlling a power control unit 109*e* for changing state of RU 109*b*, and (v) conducting a shared nonvolatile memory 109h configuration process 231. CPU 101b can perform other actions and steps for a processor 109d depicted and described for a processor 109d in SRU 109 without departing from the scope of the present disclosure. In exemplary embodiments for FIG. 7, clock 101m (in a device 101 from FIG. 1c) could comprise RF clock 205, where clock 101m drives both CPU 101b and RU 109b. Clock 101m could be connected to a PLL 211 to convert the frequency from clock 101m to a driving clock frequency for CPU 101b.

In summary, a CPU 101b and RU 109b within a device 101 could communicate through a shared nonvolatile memory 109h storing a shared nonvolatile memory interface 230 and achieve various benefits described herein to address needs in the art identified above. Benefits can include independent sleep states for CPU 101b and RU 109b (e.g. they don't have to be active at the same time to transfer control data such as 191g or application data 112a or server B response data 112b). Benefits also include transferring data between CPU 109b and RU 109b in a nonvolatile state, such that the data in memory 191 and memory 192 is available to both CPU 101b and RU 109b immediately after transitioning from a sleep state to an active state (thereby allowing time in an active state to be reduced and consequently conserve power or energy). Other benefits are provided as well, and these benefits are exemplary as opposed to being limiting.

In addition, although an RU 109b is depicted and described in FIG. 4a and FIG. 4b as conducting cryptographic operations such conducting an ECDH key exchange 409 and encrypting application data 112a with a symmetric ciphering key 223a, a CPU 101b in device 101 as depicted in FIG. 7 could conduct the those and related steps (such as data compression 410, data decompression 426, data decryption 425, etc.) In other words, although a SRU 109 with RU 109b may conduct steps 409, 410, 426, 425, etc. for some embodiments, for other embodiments without an SRU 109 then CPU 101b could conduct the steps.

FIG. 8

FIG. 8 is a graphical illustration of hardware, firmware, and software components for a device, in accordance with exemplary embodiments. A device 101 could operate a shared memory interface 109h for the device 101 and radio components without requiring a separate storage radio unit and a separate radio unit. In other words, the benefits of a shared nonvolatile memory 109h for storing application data 112a for transmission to a wireless network 102 could be obtained where device 101 operates components a "system on a chip" 801. For some exemplary embodiments, the components and logic for a storage radio unit 109 could be utilized with a "system on a chip" 801 for a device 101 without device 101 operating (i) the components inside a storage radio unit 109 with an enclosure, package, or housing 227 (from FIG. 2a), and (ii) a separate housing or package for a radio unit RU 109b. For example, the RU 109b' could comprise a wafer level chip scale package for a RU 109b within a system on a chip 801, or RU 109b' could comprise circuits for performing the functions of a RU 109b within the system on a chip 801.

Device 101 in FIG. 8 and include a system on a chip 801, a bus 101d, a transducer 701, an antenna 101t, and an RF front end 203. Bus 101d can be equivalent to bus 101d depicted and described in connection with FIG. 1b, and bus 101d can connect components external to the system on a chip 801 to the system on a chip 801. Transducer 701 can comprise a sensor 101f and/or an actuator 101y (as depicted and described in connection with FIG. 1b), as well as comprising a plurality of sensors and actuators. Antenna 101t can comprise an internal antenna within the housing of device 101 or a connection to an external antenna. RF front end 203 can comprise an RF front end as depicted and described in connection with FIG. 2a. RF front end 203 can include a power amplifier 203b in order to amplify RF signals transmitted, such as providing an exemplary gain of 30 dB for transmit signals input from system on a chip 801, up to reasonable maximum transmit power of an exemplary 30 dBm. Other values could be used as the gain and maximum transmit power of PA 203b without departing from the scope of the present disclosure, such as a maximum exemplary transmit power of 23 dBm, which would support NB-IoT networking technology 104 according to 3GPP Releases 13, 14, and 15.

The system on a chip 801 can include CPU 101b', an iUICC 113', nonvolatile memory 101q, a system bus 802, nonvolatile RAM memory 101e', regular RAM 101e, radio unit 109b', and transducer interface 803. A "system on a chip" 801 could also be referred to as a system 801 or chip 801 or an integrated circuit 801. The "system on a chip" 801 could also be referred to as a module. CPU 101b' can be similar to CPU 101b for device 101 in FIG. 1b. Note that CPU 101b' in FIG. 8 could operate with multiple cores, and CPU 101b' could include functionality of processor 109d for an SRU 109 and processor 109c for an RU 109b from Figures above, such as FIG. 1c and FIG. 2a. The system on a chip 801 can include an integrated universal integrated circuit card (iUICC) 113', which could be equivalent to an eUICC 113 depicted above, but iUICC 113' could be operated within system on a chip 801. Regular RAM 101e could comprise a standard RAM memory such as SRAM or DRAM. RU 109b' in chip 801 can comprise an RU 109b as depicted in FIG. 2a, with the exception that RF front end 203 could operate within device 101 instead of chip 801. Or, in other exemplary embodiments RF front end 203 could be integrated onto chip 801 as well.

Nonvolatile memory 101q could comprise flash memory for system 801 and include general nonvolatile memory 109g for device 101, such as operating firmware for device 101 (similar to SRU firmware 109u in FIG. 2e). A radio baseband unit 206 and RF transceiver 204 can be operated by the radio unit 109b', similar to those depicted and described in connection with FIG. 2a above. Transducer interface 803 can comprise an electrical connection plus signaling or control logic for connection to transducer 701. System bus 802 can comprise a plurality of internal busses within chip 801 in order to connect the various internal components. System bus 802 can be similar to bus 101d, except operating within chip 801.

Integrated circuit 801 can include a nonvolatile RAM (NVRAM) memory 101e'. NVRAM memory 101e can be similar to RAM 101e depicted and described in connection with FIG. 1b, except that NVRAM can comprise persistent memory, such that data recorded in NVRAM 101e' is recorded when device 101 is in a deep sleep state or connected to a battery 101n. Some versions of NVRAM could support battery 101n being removed or completely drained. NVRAM 101e' can be different than flash memory 101q, where flash memory 101q typically has a more limited number of write cycles, and NVRAM 101e' has a less limited number of write cycles. Further, write operations to flash memory 101q typically take longer and require more power, while write operations to NVRAM 101e' require less power and are faster. NVRAM 101e' typically costs more per byte than flash memory for nonvolatile memory 101q. Further, data in nonvolatile memory 101q can remain stored in device 101 when a battery 101n is disconnected or essentially completely drained, while data in NVRAM 101e' could be erased if battery 101n is removed for extended periods.

Consequently, some less frequently changing data such as an operating system 101h for device 101 can be stored in memory 101q, while a smaller set of data such as application data 112a and server B response data 112b can be stored in NVRAM 101e'. NVRAM 101e' can also be referred to as a "persistent memory" RAM device. NVRAM 101e' could also simply be a portion of RAM 101e that receives power from battery 101n when integrated circuit 801 comprises a sleep or deep sleep state (such as requiring less than an exemplary microamp of current).

NVRAM 101e' can include shared nonvolatile memory 109h. Although shared nonvolatile memory 109h is depicted within NVRAM 101e' for the system on a chip 801, memory 109h could be recorded in memory 101q or in a volatile state in RAM 101e. As depicted in FIG. 8, NVRAM 101e can store or record a shared memory interface 230 within shared nonvolatile memory 109h. Shared nonvolatile memory 109h can include a shared memory interface 230, such as that depicted and described in connection with FIG. 2b. Shared memory interface 230 could operate as a filesystem interface between radio unit 109b and CPU 101b'. Shared nonvolatile memory interface 230 does not require a file system and can use memory addresses for (i) device write and radio unit read memory 191 and (ii) radio unit write and device read memory 192, where memory 191 and memory 192 are depicted and described in connection with FIG. 2b. For embodiments that do use a filesystem within shared nonvolatile memory interface 230, then memory 191 could include a directory 191x with files 191y as depicted and described in connection with FIG. 3a. For embodiments that do use a filesystem within shared nonvolatile memory interface 230, then memory 192 could include a directory 192x with files 192y as depicted and described in connection with FIG. 3b.

For exemplary embodiments depicted in FIG. 8, CPU 101b' can perform the steps for a memory processor 109d depicted in Figures above, such as, but not limited to, (i) a step 405 in FIG. 4a and FIG. 6a (with separate steps 405a and 405b depicted in FIG. 6a), (ii) sending message 406a or commands to RU 109b using a message 406a in FIG. 4a, (iii) writing a command_script 191g from FIG. 3a to memory 191 for RU 109b to subsequently read, (iii) operating a trigger library 245 in a step 245a in FIG. 6a, and (iv) controlling a power control unit 109e for changing state of RU 109b, and (v) conducting a shared nonvolatile memory 109h configuration process 231. CPU 101b can perform other actions and steps for a processor 109d depicted and described for a processor 109d in SRU 109 without departing from the scope of the present disclosure. In exemplary embodiments for FIG. 8, a clock 101m (in a device 101 from FIG. 1c) could comprise RF clock 205, where clock 101m drives both CPU 101b' and RU 109b. Clock 101m could be connected to a PLL 211 to convert the frequency from clock 101m to a driving clock frequency for CPU 101b'.

In summary, a CPU 101b' and RU 109b' within a system on a chip or integrated circuit 801 could communicate through a shared nonvolatile memory 109h storing a shared nonvolatile memory interface 230 and achieve various benefits described herein to address needs in the art identified above. Benefits can include independent sleep states for CPU 101b' and RU 109b' (e.g. they don't have to be active at the same time to transfer control data such as 191g or application data 112a or server B response data 112b). Benefits also include transferring data between CPU 109b' and RU 109b' in a nonvolatile state, such that the data in memory 191 and memory 192 is available to both CPU 101b' and RU 109b immediately after transitioning from a sleep state to an active state (thereby allowing time in an active state to be reduced and consequently conserve power or energy). Other benefits are provided as well, and these benefits are exemplary as opposed to being limiting.

CONCLUSION

Various exemplary embodiments have been described above. Those skilled in the art will understand, however, that changes and modifications may be made to those examples without departing from the scope of the claims.

The invention claimed is:

1. A method for a device to operate with a wireless network, the method performed by the device, the method comprising:
communicating, by a storage radio unit (SRU) in the device, with the wireless network, the SRU comprising:
a nonvolatile memory comprising (i) a shared memory for the device and the SRU, (ii) a general memory for the device, wherein the general memory stores a filesystem, and (iii) a protected memory for the SRU, wherein the protected memory stores a firmware for the SRU, network access credentials, and a symmetric ciphering key;
a processor configured to conduct a filesystem detection step from the firmware to detect a type of the filesystem, configured to conduct a configuration process, wherein the configuration process writes (i) the detected type of the filesystem to the shared memory and (ii) a device write directory and a radio unit write directory in the shared memory, and configured to generate a trigger to detect when application data from the device is written to the device write directory;
an external bus configured to receive the application data from the device as a file for the device write directory and configured to send a response to the device from the radio unit write directory, wherein the response is received by the SRU from a server;
an internal bus connected to the shared memory configured to store the application data in the device write directory and configured to store the response in the radio unit write directory;
a radio unit configured to read the application data from the device write directory via the internal bus, configured to connect to a wireless network using the network access credentials, configured to encrypt the application data using the symmetric ciphering key, configured to transmit (i) the encrypted application data to the wireless network, configured to receive the response to the transmitted application data, and configured to write the response to the radio unit write directory via the internal bus; and
a power control unit configured to receive the trigger for waking the radio unit after the processor writes the application data to the device write directory, and configured to sleep the radio unit after the radio unit writes the response to the radio unit write directory.

2. The method of claim 1, wherein the SRU further comprises an embedded universal integrated circuit card (eUICC) configured to record an operational profile, wherein the operational profile includes the network access credentials for the wireless network.

3. The method of claim 1, wherein the device is configured to periodically poll the radio unit write directory for the response.

4. The method of claim 1, wherein the device write directory comprises at least one file for a radio parameters input, a http request, a mobile originated SMS, an upload file, a command script for the SRU, power control settings for the SRU, a device identity for the device, cryptographic parameters for the SRU, and a time value for device current time.

5. The method of claim 1, wherein the radio unit write directory comprises at least one file for radio parameters loaded, a http response, a mobile terminated SMS, a download file, a log file for the SRU, a digital signature from the server, power control settings for the SRU, cryptographic parameters for the SRU, a radio network status, an error log, and a time value from the wireless network.

6. The method of claim 1, wherein the device writes to the shared memory an elliptic curve cryptography (ECC) server public key, wherein the radio unit (i) derives an ephemeral ECC private key, (ii) conducts an elliptic curve Diffie-Hellman (ECDH) key exchange with the ECC server public key and the ephemeral ECC private key in order to derive the symmetric ciphering key.

7. The method of claim 1, wherein the SRU further comprises a configuration unit configured to write the firmware and the symmetric ciphering key to the protected memory before the device is received by an end user.

8. The method of claim 1, wherein the device configures the general memory by writing the filesystem before the SRU conducts the configuration process, and wherein the type of the filesystem comprises one of FAT16, FAT32, exFAT, NTFS, Ext2, Ext3, Ext4, UDF, ISO-9660, HFX+, HFSX, Apple, UFS, XFS, JFS, YAFFS, JFFS2, and UBIFS.

9. The method of claim 1, wherein the firmware includes a filesystem driver for the type of the filesystem, and wherein the SRU is configured to select the filesystem driver based on the detected type of filesystem in the general memory.

10. The method of claim 1, wherein the firmware includes an interface driver for the external bus, and wherein the external bus comprises one of a serial peripheral interface (SPI) bus, a Peripheral Component Interconnect (PCI) bus, a Peripheral Component Interconnect Express (PCIe) bus, a SD bus, an I2C bus, a USB bus, and a serial bus.

11. The method of claim 1, wherein the SRU further comprises a memory controller, wherein the memory controller is connected to the internal bus and the nonvolatile memory, and wherein the memory controller prevents the device from reading and writing to the protected memory.

* * * * *